(12) United States Patent
Radulescu

(10) Patent No.: US 8,416,812 B2
(45) Date of Patent: Apr. 9, 2013

(54) NETWORK TIMING SYNCHRONIZATION SYSTEMS

(76) Inventor: Codrut Radu Radulescu, South Orange, NJ (US)

( * ) Notice: Subject to any disclaimer, the term of this patent is extended or adjusted under 35 U.S.C. 154(b) by 459 days.

(21) Appl. No.: 12/586,321

(22) Filed: Sep. 21, 2009

(65) Prior Publication Data

US 2010/0118895 A1    May 13, 2010

Related U.S. Application Data

(60) Provisional application No. 61/192,804, filed on Sep. 22, 2008.

(51) Int. Cl.
*H04J 3/06* (2006.01)
*H04L 7/00* (2006.01)

(52) U.S. Cl.
USPC .......................... 370/503; 375/354

(58) Field of Classification Search .......... 370/503, 370/507, 508, 516; 375/354–356, 371, 372
See application file for complete search history.

(56) References Cited

U.S. PATENT DOCUMENTS

| | | | |
|---|---|---|---|
| 6,313,834 B1 | 11/2001 | Lau et al. | 715/803 |
| 6,373,834 B1 | 4/2002 | Lundh et al. | 370/350 |
| 6,438,702 B1 | 8/2002 | Hodge | 713/400 |
| 7,649,925 B2 * | 1/2010 | Fullerton et al. | 375/145 |
| 2005/0207451 A1 | 9/2005 | Partyka | 370/503 |
| 2006/0056563 A1 | 3/2006 | Aweya et al. | 375/376 |
| 2007/0260906 A1 | 11/2007 | Corredoura | 713/400 |
| 2008/0069150 A1 | 3/2008 | Badt et al. | 370/503 |
| 2008/0080567 A1 | 4/2008 | Radulescu | 370/516 |

OTHER PUBLICATIONS

"A Statistical Method for Time Synchronization of computer Clocks with Precisely Frequency-synchronized Oscillators," by Yamashita et al., published in "Proceedings of the 18$^{th}$ International Conference on Distrubuted Computing Systems, May 26-29, 1998, Amsterdam".
IEEE 1588 Overview—IEEE Unplugged—An Introduction to IEEE 1588, http://www.rtaautomation.com/ieee1588/.

* cited by examiner

*Primary Examiner* — Kerri Rose

(57) ABSTRACT

A method and means synchronize timing of a follower system to a reference system. A Hierarchical CFF function ("HCFF") is applied to a set of Correction Factor Functions types ("CFFs") or a set of other HCFF. Each CFF type uses the same input data set specific to that type and generates at least one Correction Factor Solution ("CFS") for each of the CFF, wherein the CFS consists of only CF or the CFS consists of both i) CF and ii) a SACF. The HCFF takes as input a set of CFS and generates at least one CFS, wherein the CFS consist of only the CF, or the CFS consists of both the i) CF and ii) a SACF.

60 Claims, 24 Drawing Sheets

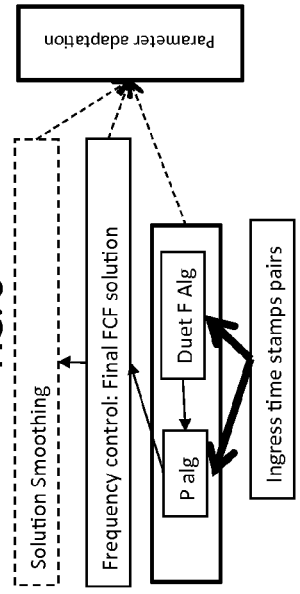
FIG. 7
FIG. 8
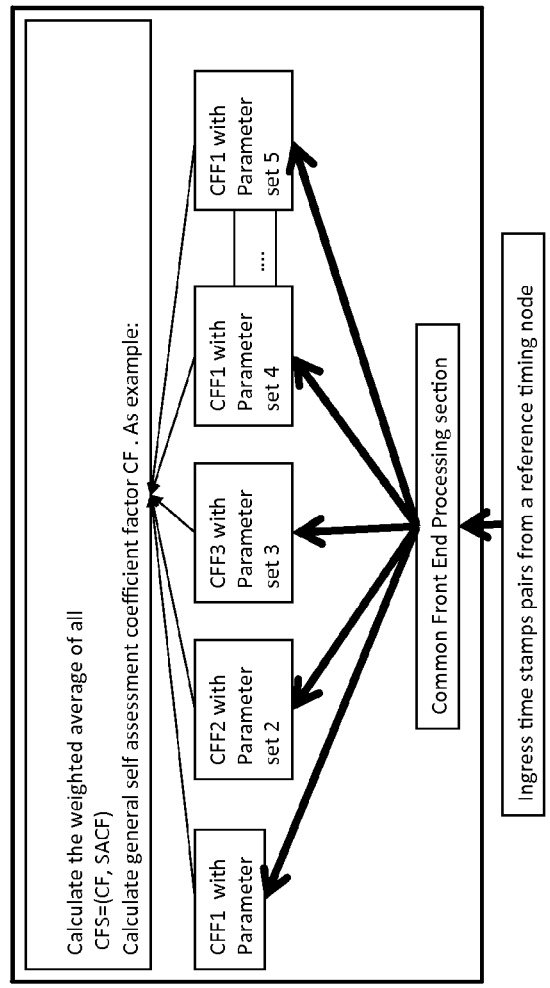
FIG. 9
Example of F Alg Sub-methods

Phase Process Example – unidirectional direct flow Master to Follower (level 1 B)

Multiple slave synchronization with multiple independent time source masters using one common network arrival time stamp port. The kNCO with the best MTIE indicates the best timing source.

FIG. 22

Proprietary Test System for Slave Time recovery Performance Evaluation

PDV collection methods

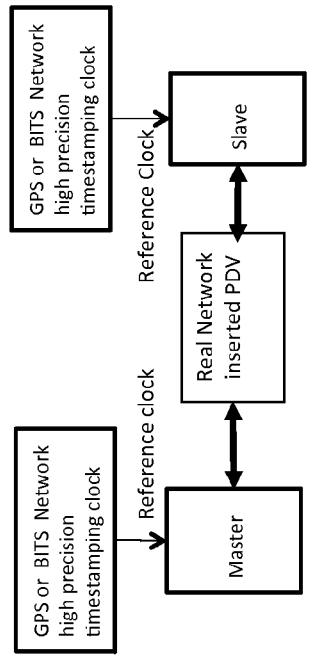

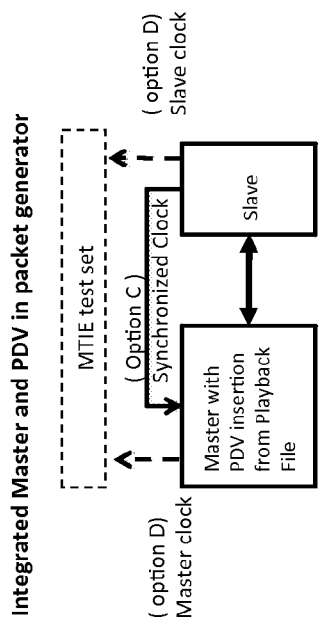

PDV collection method 1 for Lab bench using external independent source (Option A) or providing the internal master clock to the Slave (Option B)

PDV collection method 2 for Field Test (master is distant from slave)

Integrated Master and PDV in packet generator

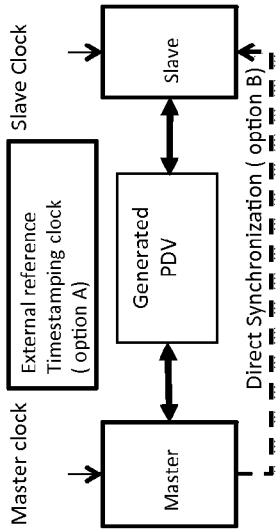

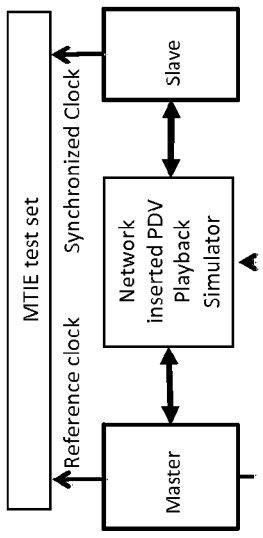

Traditional PDV simulation & test requires both a Master and a Network PDV simulator equipment synchronized out of band. External MTIE instrument is necessary for performance measurement.

Integration of the Master and the PDV simulator reduces the complexity and cost.

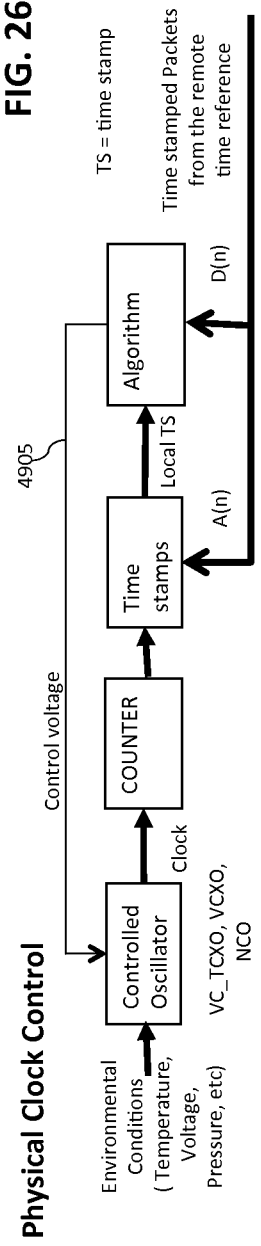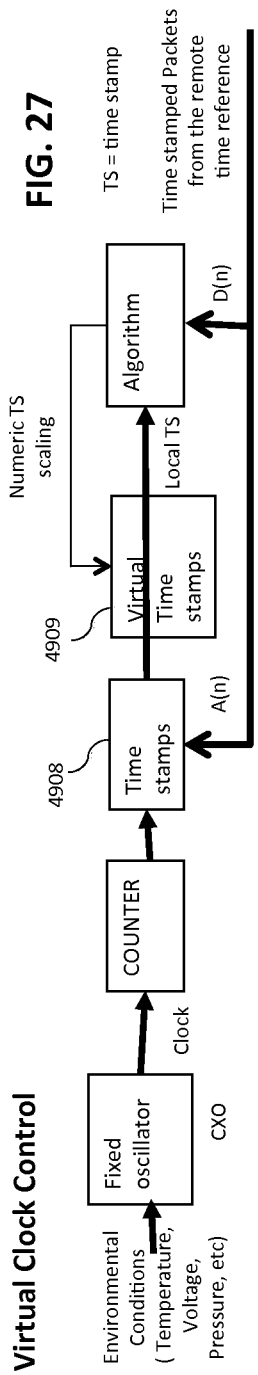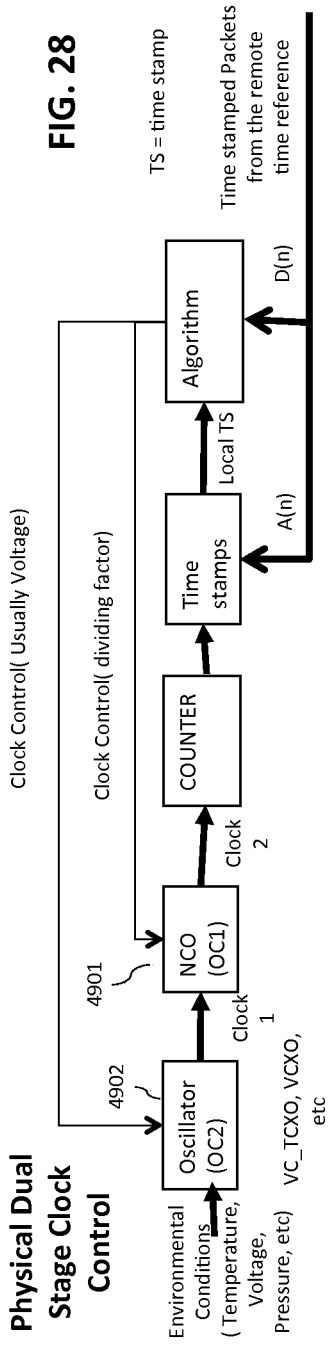

Virtual NCO1.
(In this example the average frequency correction = 0 while the average of NCO2 frequency correction is the difference between the local free running frequency and the reference frequency)

Physical NCO2 controlled with average of the corrections.

NETWORK TIMING SYNCHRONIZATION SYSTEMS

This application claims the benefit of provisional application No. 61/192,804, filed Sep. 22, 2008, the disclosure of which is incorporated in its entirety by reference thereto.

BACKGROUND OF THE INVENTION

1. Field of the Invention

The present invention relates to timing synchronization across a network with one or more timing reference nodes; more particularly to a system that provides precision timing reference through a variety of links to a plurality of follower network nodes.

2. Description of the Prior Art

Synchronization of clocks between computers can be effected anywhere on, above or within, the planet, or in fact anywhere within the Universe. Timing synchronization includes clock synchronization for Frequency, Phase and Time of Day.

Many extant protocols/methodologies, and implementations thereof, exist regarding the field of clock synchronization. For example, Network Time Protocol (NTP), GPS Protocol and Precision Time Protocol (IEEE (1588) are all public time protocols. NTP sets out a hierarchical system of clock strata, the highest of which are devices like atomic clocks and GPS clocks, and employs time stamps to achieve synchronization. NTP itself does not set out a specific method to achieve synchronization. Operational models of NTP can be found in other protocols such as RFC 778, NTPv4, and SNTP.

Rather than sending information back and forth between a master clock and a slave clock, the GPS protocol uses the GPS system to adjust both the master and slave clocks. By doing so, the GPS protocol avoids very complicated synchronization algorithms.

In the IEEE 1588 protocol, the master clock sends a time stamped packet to a slave clock, which then sends another time stamped packet back to the master. The delays of transport of both packets, which are assumed to be constant, can then be determined and used to calculate the phase difference of the two clocks. The master clock then sends a synchronization message to the slave, which can then be synchronized with the information from the master.

U.S. Pat. No. 6,373,834 works similarly to IEEE 1588. In order to determine synchronization adjustment value, one clock sends a message to another clock, which then sends a response message back to the first clock. Both messages contain timing information. Accordingly, the system disclosed by the '834 patent can also be considered a bidirectional synchronization method.

U.S. Pat. No. 6,438,702 discloses a concept that is similar to that of IEEE 1588 and U.S. Pat. No. 6,313,834. A customer equipment clock sends a request for time service to a network timeserver. The server then responds by sending operation, administration and maintenance information back to the customer equipment clock. Such information is immediately sent back to the server, and is used to calculate packet delay time and to synchronize the customer equipment clock. Accordingly, the concept disclosed by the '702 patent can also be considered a bidirectional synchronization method.

U.S. Patent Application Publication 2007/0260906 attempts to overcome some deficiencies of the original IEEE 1588 protocol. It discloses a belief that the limit cycle of IEEE 1588 provides intrinsic inaccuracy due to phase offset between the clocks. For example, if a master and a slave clock operate at the same frequency, but were out of phase by 180 degrees, they would have been deemed synchronized. Furthermore, because the relay of synchronization in formation occurs relatively infrequently, a significant number of clock cycles can pass with the clock out of synchronization. This problem is overcome by adding a number of controllers and an accumulator between the master and the slave clock to trace the clocking differences between the clocks and synchronize the clocks at proper time points at a higher accuracy. The concept disclosed by the '906 published application can still be considered a bidirectional method.

The art disclosed in references 1588, U.S. Pat. Nos. 6,373,834 and 6,438,702, U.S. Patent Application 2007/0260906 only work well in close to ideal situations where there exist minimum propagation delay variation and the delays are symmetrical between both directions. In the real world, especially when the network traffic is high, packets have to wait at intermediate nodes for an available time slot. The wait, which is the major cause of propagation delay during transport, can be long and random so that the variation of the delays is high, and can be several magnitudes higher than the phase differences between the clocks. Therefore, the assumption that such delays are constant and symmetrical will result in inaccurate synchronization. To summarize, none of the protocols or algorithms disclosed by these prior art workers can be effectively used to synchronize clocks during heavy network traffic.

"A Statistical Method for Time Synchronization of Computer Clocks with Precisely Frequency-synchronized Oscillators" by Yamashita et al. and published in the "*Proceedings of the 18th International Conference on Distributed Computing Systems,* 26-29 May, 1998, Amsterdam" discloses a method which considers propagation delay variations and uses a statistical approach to tackle the problem. By collecting a number of time stamped packets, the published algorithm estimates the means of propagation delays and calculates a confidence interval of the measured time offsets. These statistical approaches can be used to estimate the average propagation delay, which can then be used to adjust the clocks. When the means vary a lot between sets of collected intervals, a statistical method can predict that the network traffic is heavy and defer to a different time for synchronization. The effectiveness of such statistical approaches can be limited, especially considering that the level of propagation delays can be a few magnitudes higher than that of the clock phase differences. Consequently, a small estimation error will result in an error in synchronization.

U.S. Patent Application Publication 2008/0080567 provides a unidirectional approach to synchronize clocks over a network. The approach does not require the slave clock to send messages back to the server clock. Instead, the slave clock selects a plurality of consecutive intervals of time stamped packets with certain criteria, so that each of these intervals has the same or very similar propagation delays, i.e. there is a minimum or no propagation delay variation. By using these intervals, frequency differences can be accurately estimated.

Notwithstanding the considerable efforts by prior art workers, there exists a need in the art for time synchronization methodologies, apparatus, systems and protocols that can inexpensively, quickly and accurately synchronize clocks under actual network load conditions.

BRIEF SUMMARY OF THE INVENTION

The present invention provides, in one aspect, a method and means for synchronizing the timing of a follower system to a reference system. The method comprises applying a Hierarchical CFF function ("HCFF") to a set of Correction Factor Functions types ("CFFs") or a set of other HCFFs. Each CFF type uses the same input data set specific to that type, and generates at least one Correction Factor Solution ("CFS") for each of the CFFs, wherein the CFS consists of only CF, or the CFS consists of both i) CF and ii) a SACF. The HCFF takes as input a set of CFS and generates at least one CFS. This CFS consists of only the CF, or of both the i) CF and ii) a SACF. Thereafter, the CFS is used to synchronize timing.

In another aspect, the invention provides a method and means for measuring environmental conditions ("EC"). An exemplary embodiment of a system for measuring environmental conditions includes a device for transmitting messages ("TxSensor") containing the departure time stamp of the massages. The time stamp is a reading of a counter at the time the message is transmitted. The counter has sufficient stages to prevent wraparound in between transmission time. A clock is provided by a local oscillator whose frequency fluctuates mostly due to the measured environmental condition. Also included is a device ("RxBase") that receives the time stamped messages and further time stamps the arrival time of the messages with a high frequency stability clock. This second timestamp is the reading of a counter driven by the clock at the moment the packet is received. Additionally, the counter also has sufficient stages to prevent wraparound in between the receive events. Means are provided for measuring the frequency offset between the TxSensor and the RxBase. Also provided are means to extract the EC by interpreting the frequency offset.

In still another aspect, the present invention provides a method and means for correcting the frequency of a free running oscillator. The method comprises sampling the environmental conditions ("EC") at a rate sufficient to capture measurable changes that will determine modifications of the frequency. An interpolated value CF(EC) corresponding to the environmental conditions sample EC from a CF(EEC(k−1)) and a CF(EEC(k)) is calculated. The CF(EEC(k−1)) and CF(EEC(k)) are elements of a multidimensional array of correction factors CF indexed on equivalent environmental conditions EEC (ECOCA). The EEC(k−1) is the closest index in the ECOCA array that is smaller than EC. The EEC(k) is the closest index in the ECOCA array that is greater than EC. The t(n) is the time of measurement of the EC. There is also included the step of applying the CF(EC) correction to the oscillator.

In a further aspect, the invention provides apparatus, systems and methods that implement method steps for network simulation. One exemplary embodiment of an apparatus used for this purpose includes a high stability frequency oscillator. A logic unit is configured to perform the functions of at least one Timing Reference Node ("Master") running a timing synchronization protocol ("TSP"). The apparatus time stamps the TSP packets. It provides sequences of propagation delay values ("PD") equivalent with the PD experienced by the TSP packets for the network configurations that are emulated. The apparatus modifies the time stamp of the TSP packets generated by each Master. This modification comprises the addition or the subtraction of a PD associated with the propagation path between each reference node and the equipment under test.

Yet another aspect of the invention provides an apparatus, systems and method that implements a telecommunications protocol for timing synchronization with identical message structure for both directions. Generally stated, the method comprises sending from an end point of a communication path between two nodes i) an arrival time stamp A(n) and an associated sequence ID from a protocol packet received from the opposite end; ii) departure time stamp information D(m) of the previously transmitted packet; and iii) departure sequence ID. The sequence ID of the packets transmitted by the follower node are only odd numbers, and the sequence ID transmitted by the reference node are only even numbers.

Embodiments of the present invention provide for many advantages. Synchronization over PSN is attained under real levels of network propagation while meeting the stringent 50 ppb accuracy requirements of the telecommunications industry. Solutions, in accordance with the present invention, can easily be compiled into any network processor or FPGA chips that usually already exist in most telecom hardware, significantly decreasing upgrade costs and upgrade time for legacy systems.

Other embodiments can provide inexpensive and ubiquitous precision timing synchronization to virtually every system connected to a digital network. This is in contrast with current technology, where true precision timing is only achievable using expensive hardware-based systems, and which inhibits the advancement of low-cost technologies that might require precision timing.

Embodiments of the invention can also be applied to problems outside those of synchronization in telecommunications. For example, such embodiments can be applied to solve problems extant with systems where weak information signals are engulfed in disruptive noise. Such applications include the synchronization of radio telescope antenna arrays utilized in deep space exploration. Information exchange among global climate monitoring sensors can benefit from certain embodiments of the present invention. Data fusion for sensor networks and actuator timing in automated industrial manufacturing processes would benefit from embodiments of the present invention. Even tracking and positioning problems that arise in inventory control systems could be solved, in part, by the application of embodiments of the present invention.

The advantages specifically listed herein should not be construed as an exhaustive list of the advantages afforded by embodiments of the present invention. Additional advantages will become apparent after review of the disclosure herein.

BRIEF DESCRIPTION OF DRAWINGS

The invention will be more fully understood and further advantages will become apparent when reference is had to the following detailed description of the preferred embodiments and the accompanying drawings, in which:

FIG. 20a is a block diagram depicting an exemplary embodiment, in accordance with the present invention, an implementation of the architecture depicted in FIG. 19;

FIG. 27 is a flow chart depicting an exemplary embodiment of a unidirectional Phase Process in accordance with the present invention;

FIG. 36 is a graph depicting and exemplary embodiment of an extracted slope selection through a peak density window methodology in accordance with the present invention;

FIG. 38 is a block diagram depicting an exemplary embodiment of a flexible computing distribution among network elements in accordance with the present invention;

FIG. 39 is a block diagram depicting and exemplary embodiment of an application for CBR traffic without time stamps (SaTop) in accordance with the present invention;

FIG. 40 is a graph depicting an exemplary extrapolation of an arrival time stamp for multiple NCOs located in accordance with the present invention;

FIG. 41 and FIG. 42 are block diagrams depicting an exemplary embodiment of a test system collapsing Master and PDV generator into one box, in accordance with the present invention;

FIG. 44 is a block diagram depicting an exemplary embodiment of a PDV removing Protocol deployment for old switches in accordance with the present invention;

FIG. 48 is a block diagram depicting an exemplary embodiment of a High Stability Oscillator methodology used in a dual stage clock in accordance with the present invention;

FIG. 49 is a block diagram depicting an exemplary embodiment of a Physical Clock Control methodology in accordance with the present invention;

FIG. 50 is a block diagram depicting an exemplary embodiment of a Virtual Clock Control methodology in accordance with the present invention;

FIG. 51 is a block diagram depicting an exemplary embodiment of a Dual Stage Clock methodology—averaging Controlled Oscillator and dynamic Controlled Oscillator in accordance with the present invention;

FIG. 52 is a flow chart depicting an exemplary embodiment of a Dual Stage Clock Control, with a high stability stage, and a high dynamics stage, in accordance with the present invention;

FIG. 53 is a flow chart depicting in exemplary embodiment of a Physical NCO controlled by the averaging function in accordance with the present invention;

FIG. 54 is a block diagram depicting a description of a typically possible network topology for PNTP in accordance with the present invention;

FIG. 55 is a block diagram depicting is an exemplary embodiment of a more complex network and link topology for PNTP in accordance with the present invention;

FIG. 56 is a block diagram depicting an exemplary embodiment of a PNTP properties illustration in accordance with the present invention; and FIG. 60 is a graph depicting simulation results of a constructed PDV file using NTTE technology.

DETAILED DESCRIPTION OF PREFERRED EMBODIMENTS

Glossary of Terms

The following terms, as used herein throughout the specification and claims, shall have the meanings set forth below:

| | |
|---|---|
| A(n): = | $A_n$ = Arrival time stamp n. Equivalent notation Sn when arrival is the Follower or Slave node. |
| Absolute correction: | Correction factor of the free running oscillator, a number in vicinity of 1. |
| AE: | Accepted error interval for selection of constant PDV events. |
| | Acceptance threshold expressed in ppB (vicinity of 0). Used to select the Valid Teons and associated CFn. It is a multiple of the specified sought precision of synchronization that considers the quatization error, PDV status and load of the link. Ex: if precision sought for synchronization is 10 ppB, link load 99%, AT0 could be determined to be 10 * ((K/1%) + 2) = 120, where K = 10. |
| AT0: | In other embodiment, AT0 fluctuates inverse proportion with SACF, for example, such that AT0 = 10 * (Max_SACF- SACF). |
| $AT_0$: | Acceptable Threshold for CF preselection expressed in ppB (vicinity of 0). |
| AT1: | acceptance threshold expressed as a ratio (vicinity of 1) AT1 = 1 + AT0/1000000000. |
| $AT_1$: | Acceptable Threshold for CF preselection expressed as a quotient in 1's vicinity. |
| CE | Communication event. Propagation between transmit node and receive node where the departure and arrival time is determined my measurement with the local time reference. |
| CF: | --Correction Factor-- a solution provided by different functions that comprise of the synchronization methodology. Indicates the relative change of a specific variable resulting from multiplication of CF and the variable. The variable can be frequency (FCF), UTC (UTC_CF), Phase (PCF), Slope (SCF). CF and can be expressed in relative numbers in vicinity of 1 or in vicinity of 0 indicating the difference CF − 1. For instance Frequency CF can indicate how much to change the NCOupd which is the correction of the FROF. The equation would be CF[1] * NCOupd[1] * free_running_frequency = updated_frequency. CFcan be expressed in ppB = CF[0] in the vicinity of zero or as a ratio CF[1] in the vicinity of 1. CF[0]/1000000000 + 1 = CF[1]. |
| CFn | A correction factor generated from a VTs. The totality of CFn generated during a SUI, together with the eventual SACFn creates a set of raw solutions. |
| CFF: | Correction Factor Function generates a solution CFS. Input is different. Layer 1 CFF functions take TSPs as |

-continued

Figure 10:
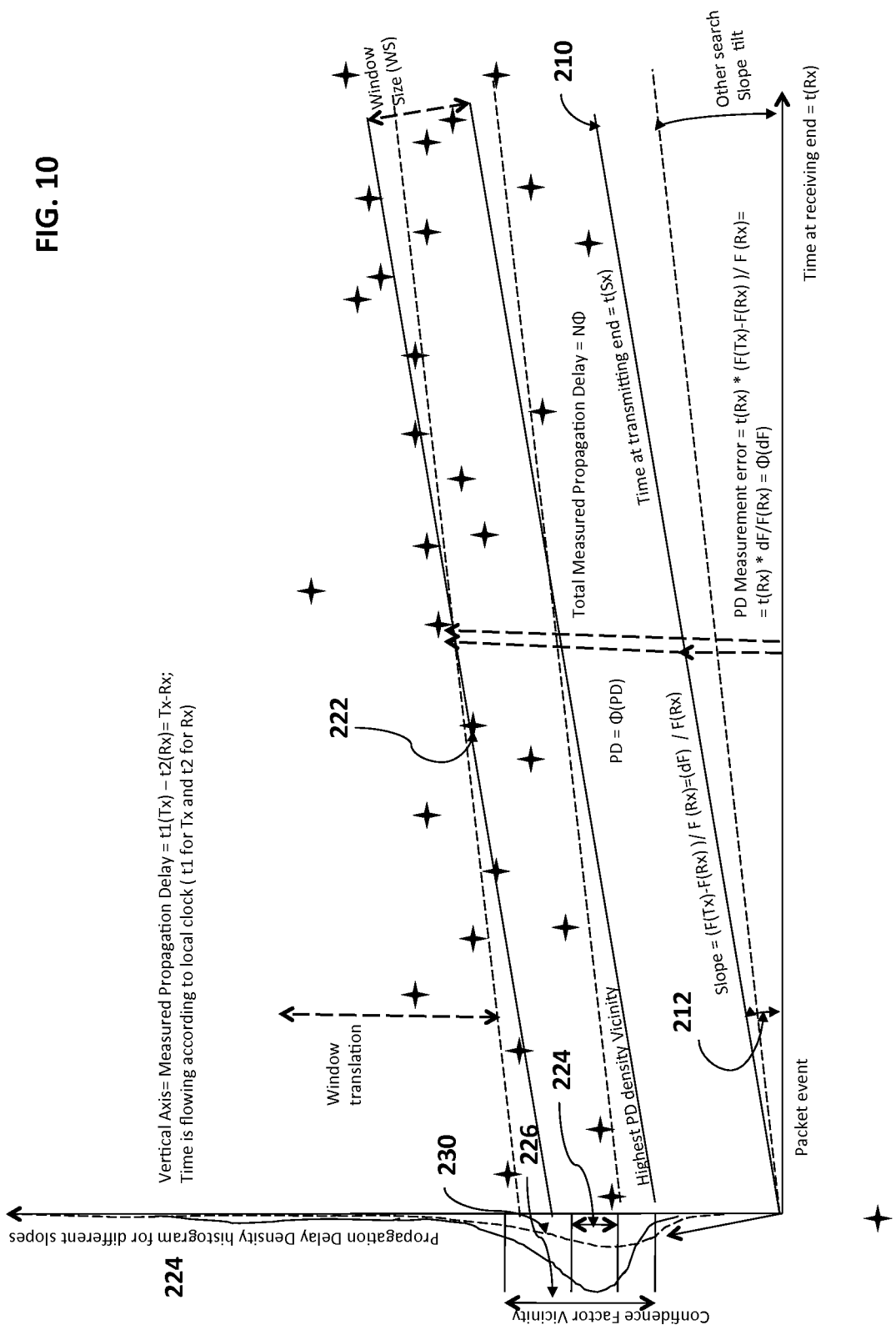
Figure 11:
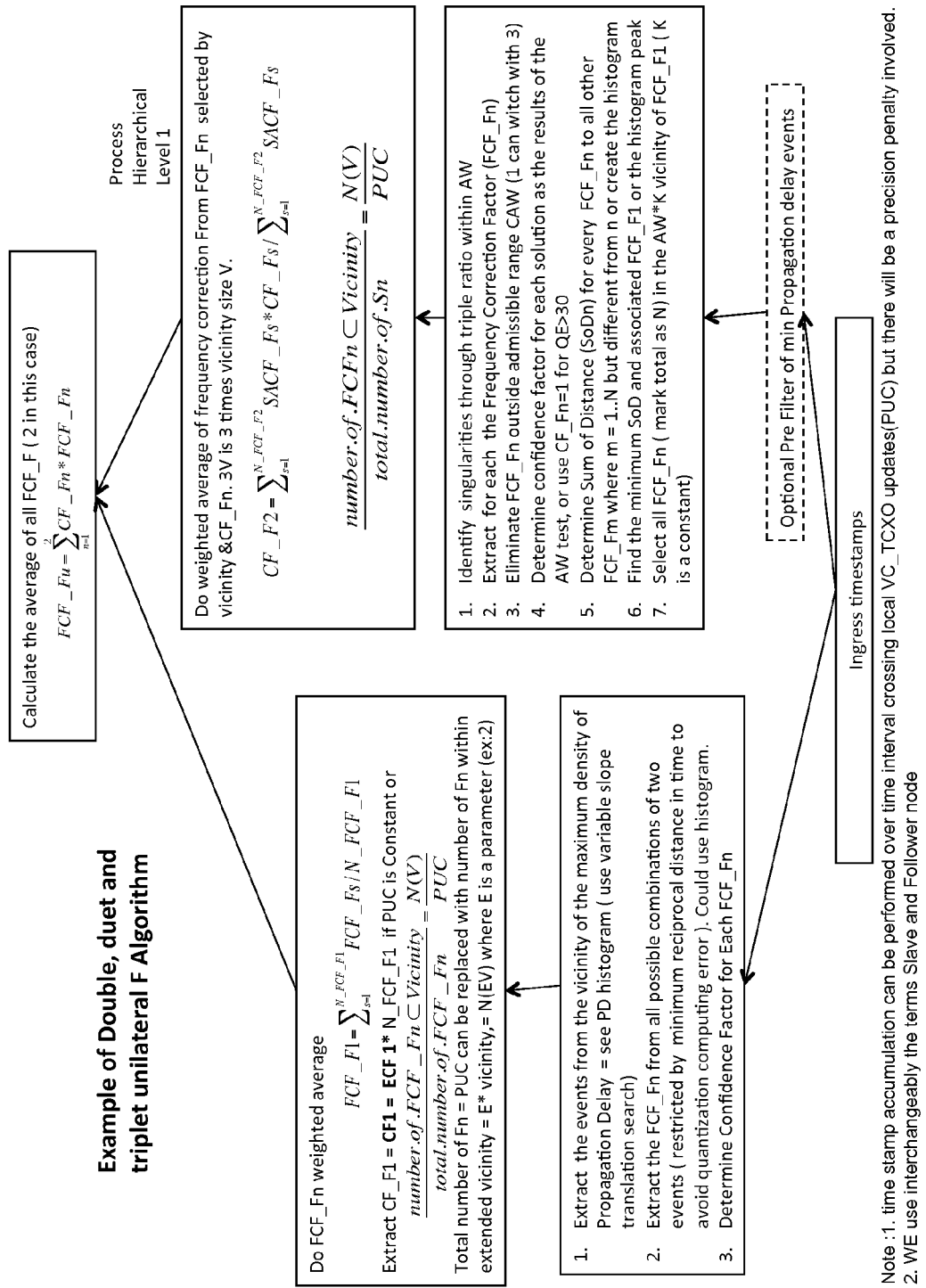
FIG. 11 is a schematic diagram of exemplary embodiment, in accordance with the present invention, of an architecture for the simulation system used to develop the code.
Figure 12:
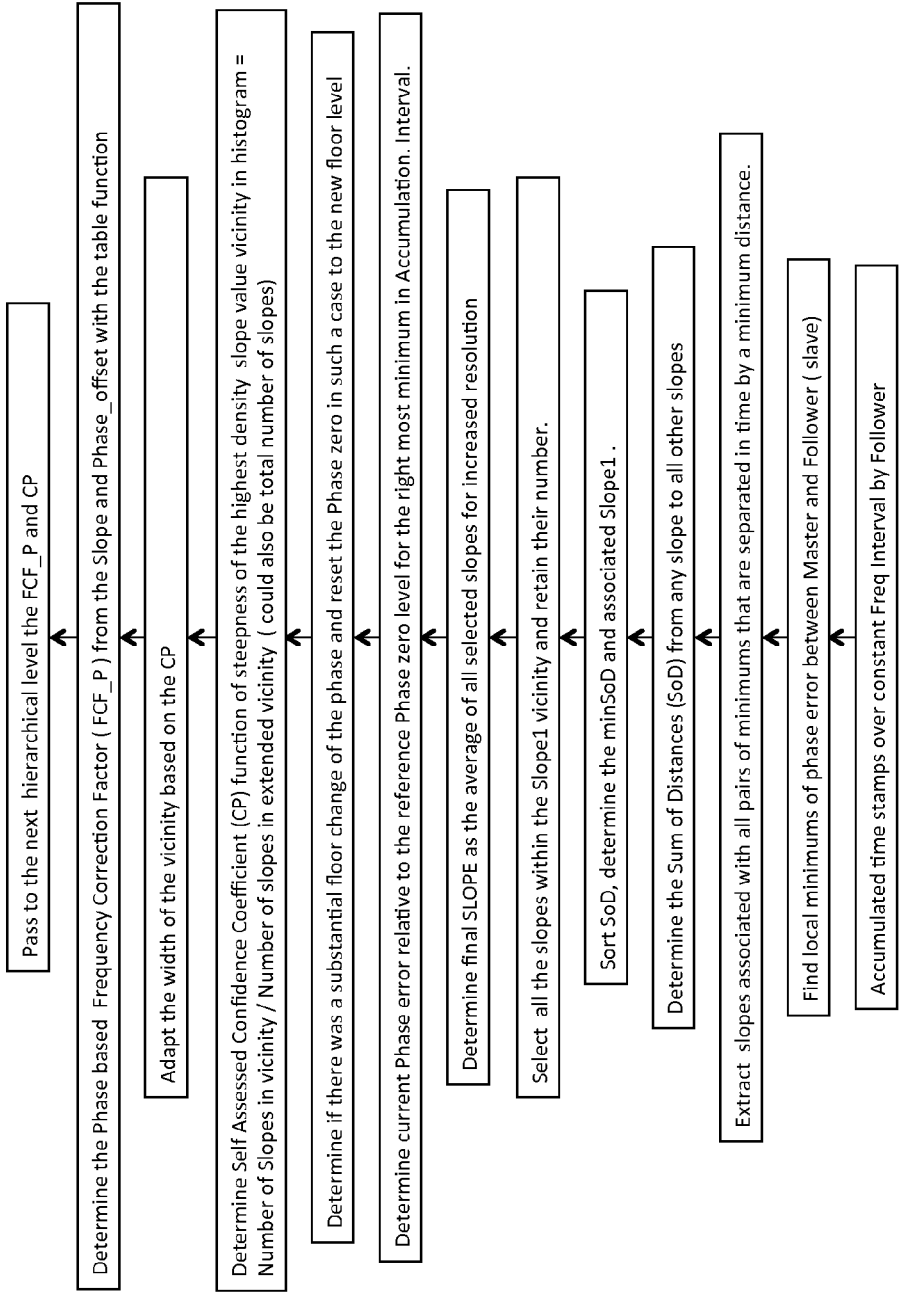
Figure 13:
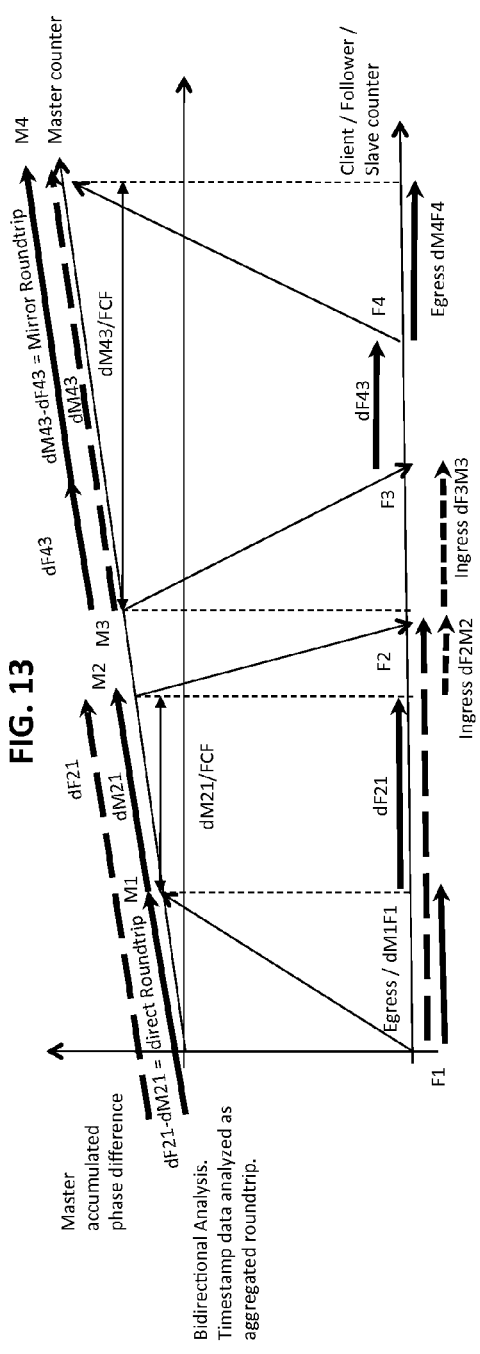
Figure 14:
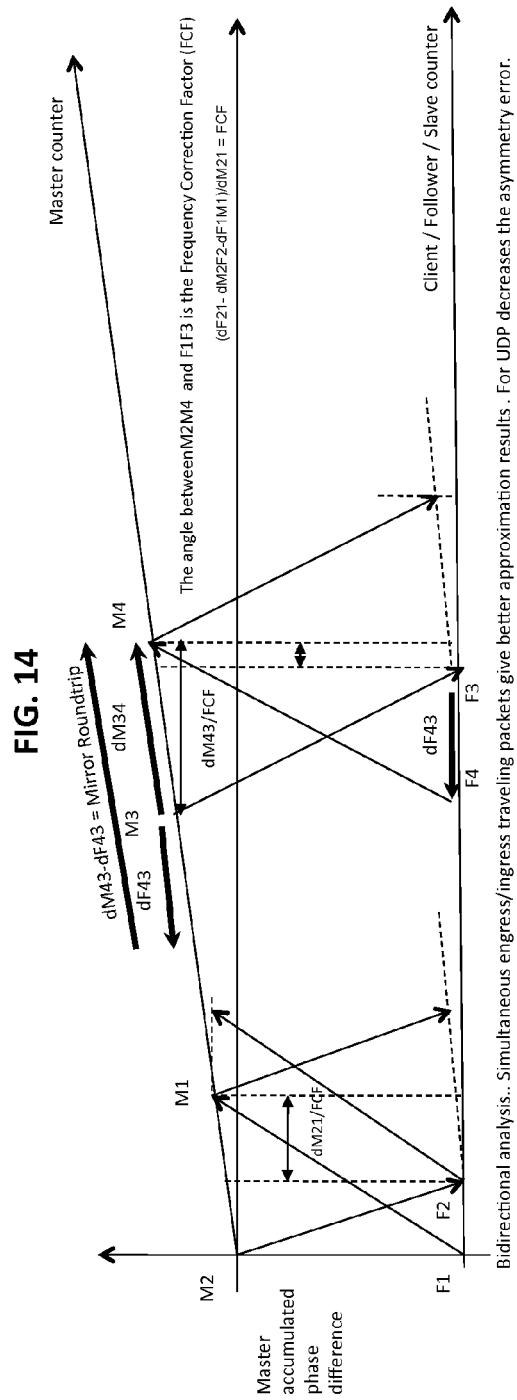
Figure 15:
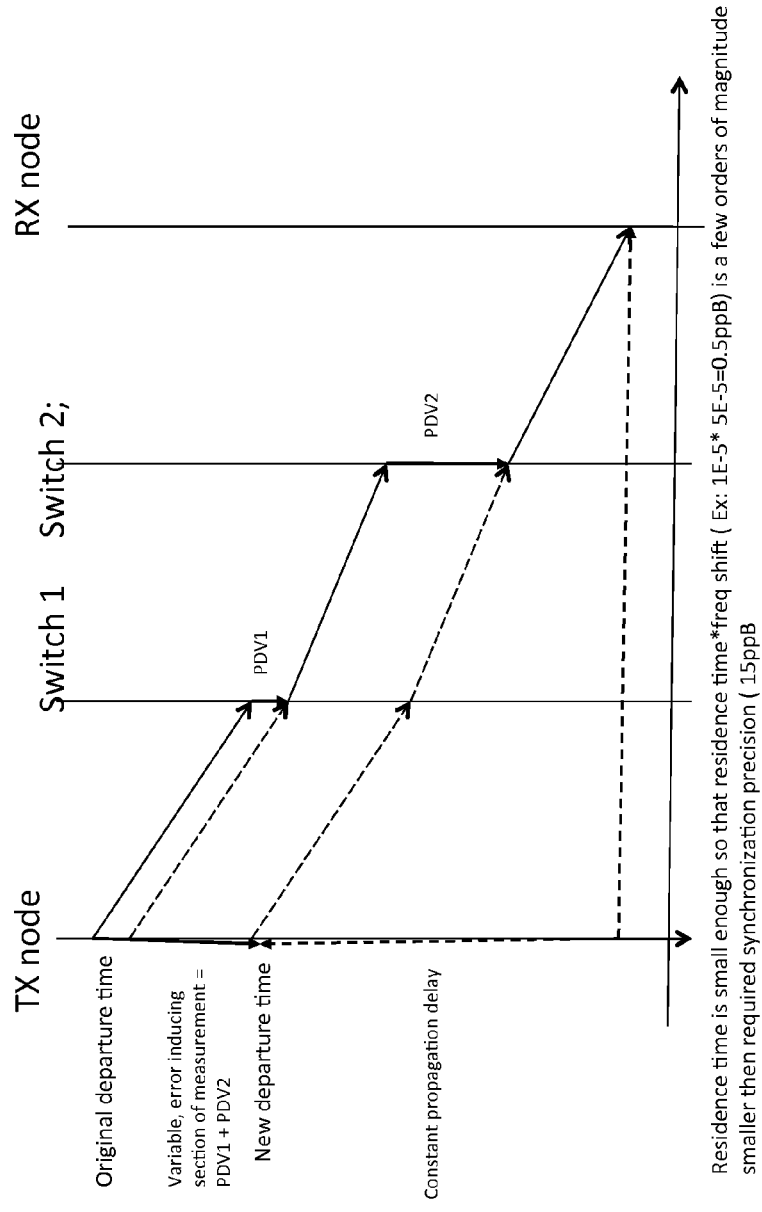
Figure 16:
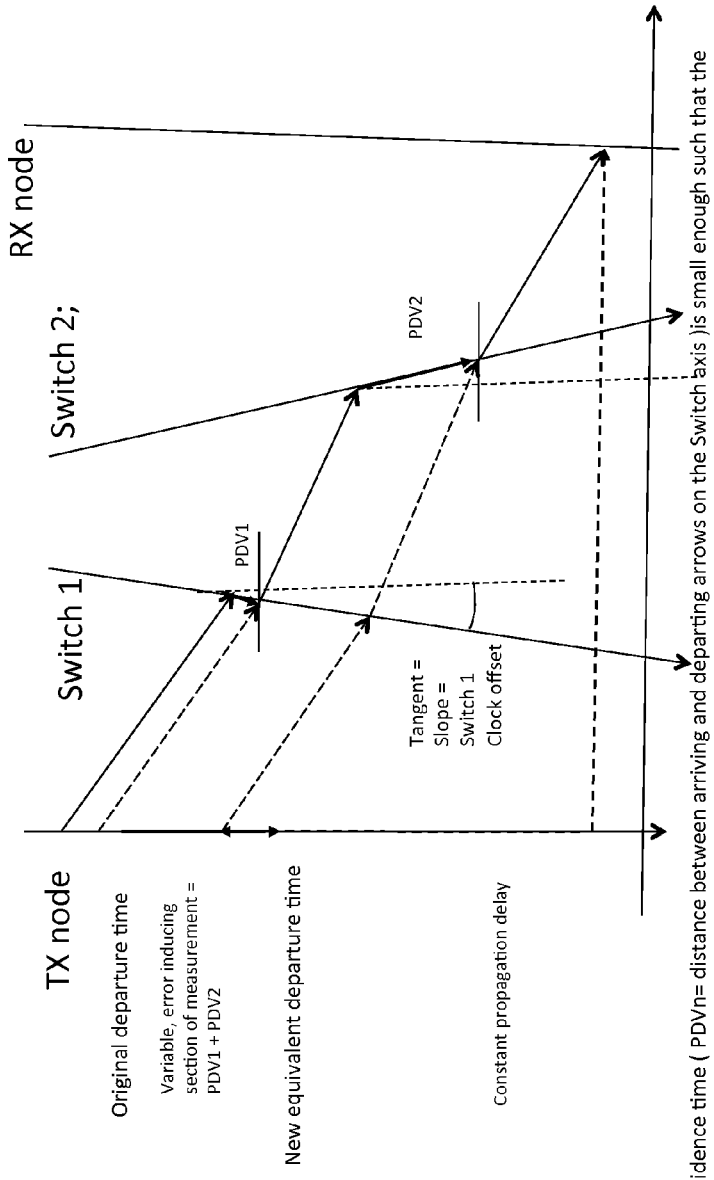
Figure 17:
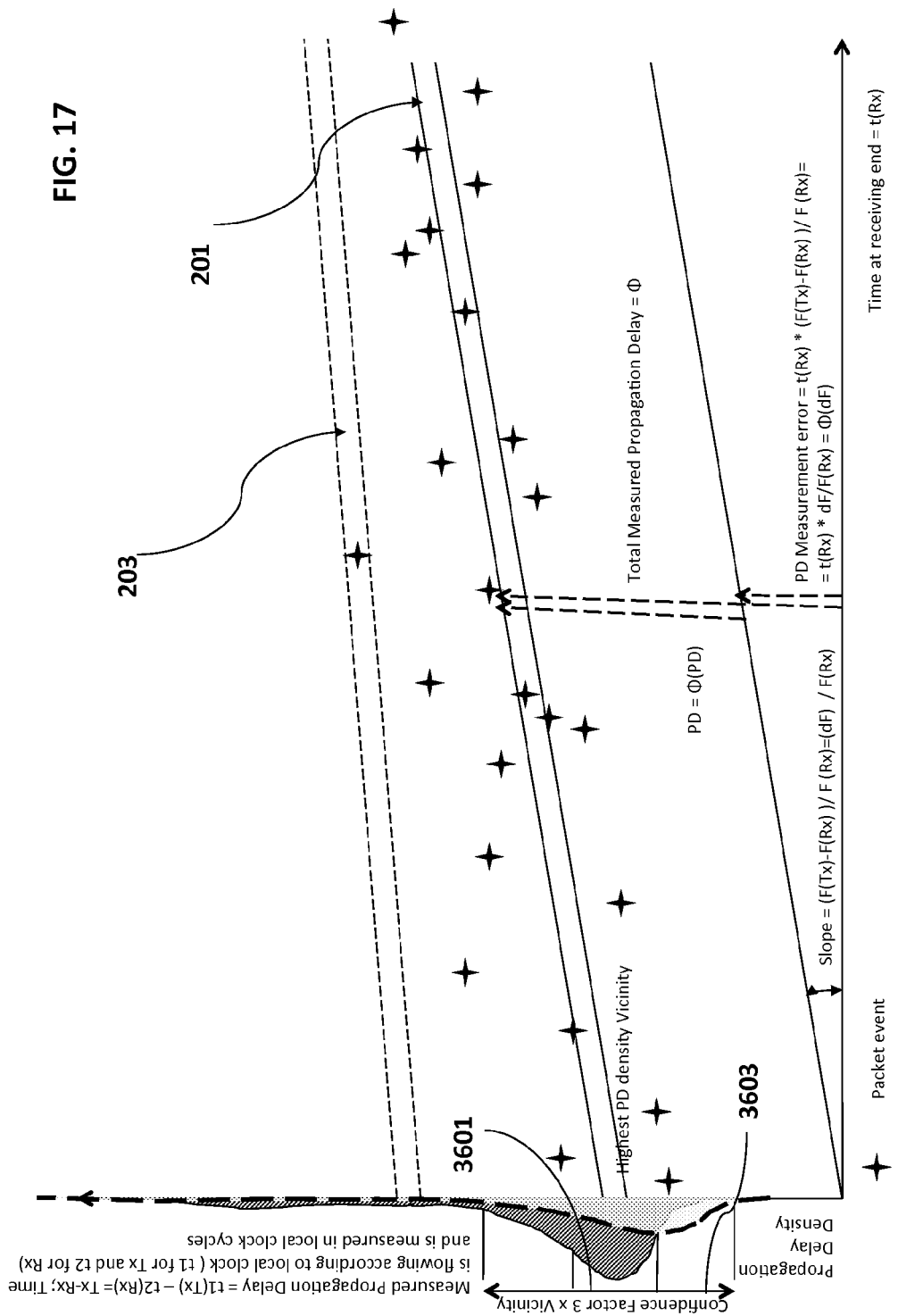
FIG. 17 is a graph depicting an exemplary embodiment, in accordance with the present invention, of a determination of the minimum dDA=dRS, R pairs inside LW and RW windows.

| | |
|---|---|
| | inputs. Upper layer CFF functions, also called hierarchical CFF (HCFF), take multiple CFS as inputs. CFFs can also be classified based on type of solution (See CF). CFF performance is controlled through a set of status parameters that are specific to each type. Plural of CFS is CFFs. |
| CFS: | --Correction Factor Solution-- the vector solution of the Correction Factor Function. One embodiment uses CFS = (CF, SACF). Another embodiment uses CFS = (CF). Plural of CFS is CFSs. |
| D(n): = | $D_n$ = departure time of an event n. Equivalent notations = Sn or Mn when departure node is the Reference or the Master. |
| E(X): | Average of the variable X. |
| EC | Environment conditions. Physical conditions like temperature and voltage that influence the free running frequency of an oscillator. |
| ECOCA: | --Environment Condition Offset Coefficients Array-- a table indicating the calculated drift of the free running local oscillator from the ideal frequency at the specifically mentioned value of the environment condition (temperature for example) that are search keys in the table. |
| EEC | Equivalent Environment Conditions. Used as index in ECOCA. Can be a set of one or several variables and accordingly ECOCA is a one dimension or multi dimension array. The granularity of the indexes depends on the precision of the measurement, the available memory space and the covered range of fluctuation. |
| EET: | Equivalent Environment Temperature. |
| EV (Extended Vicinity) | A vicinity that extents to the right and the left of the solution vicinity (SV) by an interval usually equal or proportional with the SV interval. |
| FCF | Frequency Correction Factor. |
| FCF_SACF: | --Frequency Correction Self-Assessed Confidence Factor-- This is the final result based on methodologies that are in accordance with the present invention. |
| Feon: | A subclass of Teons where relations are specific to F functions. |
| FLR: | A follower. |
| Follower port: | A synchronized port. |
| Frequency Characteristic | The frequency characteristic of an oscillator (OFC) is the set of vectors defined as (CF, EC), where CF = (ideally synchronized frequency)/(oscillator frequency under current EC measured in its immediate proximity), where immediate proximity is as close as technically and reasonably feasible and where EC are the environmental conditions taken in consideration for the purpose of the characteristic. Some OFC can show only Temperature dependency in 2D graph, some other can show temperature and voltage dependency as a 3D surface by connecting the representation of the vectors. |
| FROF: | Free Running Oscillator Frequency |
| Functional Layer (FL): | Set of functions that take the same input and provide the same output. |
| HCC: | High confidence correction - Synchronization methodology self assessed that the current proportional correction of the local oscillator is accurate enough to be used for update on the EOCT |
| Inbound | Direction toward the time reference node. Outbound is the opposed direction. |
| Ingress | Direction entering into the referred node. Opposed to egress. |
| Master node (also use interchangeable with the term Server and term Reference): | The node that posses an accurate time reference and exchanging timed events with the follower. |
| Max_SACF | Normalized maximum value. In a preferred embodiment is 16 and is used only for scaling to the same value range for comparison. |
| min_dist: | The minimum time interval or sequence ID interval between Time Stamps generated at the same end point of the link that are further used in the synchronization methodology. |
| NCOupd: | The normalized solution indicating the relative correction required to adjusts the local free running oscillator to match the precision reference. If it is expressed a factor, takes value in a narrow vicinity of 1 and we can express it as NCOupd[1] = 1 + NCOupd[0] where NCOupd[0] is expressed in ppB and is located in a narrow vicinity of 0, |
| OCXO: | |
| PDV: | Propagation delay variation = Fluctuations of the travel time an event experiences between departure port and arrival port. |
| Peons: | Subclass of Teons where relations Rk are specific to Phase functions. |
| Process: | Method to determine from the Time Stamp data, the corrections of the timing parameters to be synchronized (F, P, UTC) |
| PUC: | Number of samples in between corrections of the synchronized timing during SUI, which the synchronization methodology uses in its computing of correction. (can be variable of fixed). |
| reference timing: | A source of accurate and stable time that is used by other nodes to synchronize with. |
| raw solution | Any CFn or (CFn, SACFn) determined during SUI. CF can be one of multiple types: frequency FCF, frequency NCO, slope, phase, UTC. |
| Relative correction: | Correction relative to the latest absolute correction. |
| SACF | Self Assessed Confidence Factor is a measure of the self-awareness of accuracy of computed results. It provides a comparison measure against a discard threshold for the associated CF solution or as a weight for averaging multiple CFs. It is not mandatory for the synchronization methodology. Some versions will dispose its calculation and perform plain averaging optionally combined with discard. The Self Assessed Confidence Factor is generally normalized. |
| $SACF_k$HT | $SACF_k$_hierarchical_threshold is a limit below which the upper hierarchical layer will discard the associated solution $CFS_k$. In one embodiment $SACF_k$_hierarchical_threshold = min_HT = Max_SACF/8 = 2, where min_HT is the minimum threshold value used by HCFF. |
| $SACF_n$ | Raw self assessed confidence factor. Indicates the probability of raw CFn to be correct. It is added to the histogram's bin that includes the value of CFn. Some embodiments do not generate $SACF_n$, in which case every bin that covers the CFn range will have its content incremented by one. |
| Set | Our set interpretation is identical with the mathematical definition of a set. |
| Slave (also used interchangeably with the term Client = Follower): | The node that uses the protocol to get messages from the Master nodes and synchronize its local timing. |
| Slope | Tangent of the angle of the phase error accumulation = (D(n) − A(n))/A(n)(212, FIG. 10). |
| CFn space of solutions | The CFn generated historically during several SUI cycles |
| Smoothing | Applying an IIR filtering or a long term averaging. Some embodiments use adaptive smoothing where the depth depends on SACF. Example: SUM_NCOupd = (SUM_NCOupd − (SACF + 1 − Max_SACF) * SUM_NCOupd/$2^k$ + SACF * NCOupd)/(Max_SACF). smoothed_NCOupd = SUM_NCOupd/$2^k$. |
| SoD: | Sum of distances is the minimum of all distances between a point and all the other points in a set. |
| ST: | Selection threshold used to select Valid Teons with more than two dimensions. |
| SV | Solution vicinity = an interval in the vicinity of highest density peak of the CFn histogram (SV) that contains the bins summing the SACFn_bin of the raw correction factors CFn_bin. falling within bin range. The average of the bin_CF index weighted with the associated bin_SACF will generate the CF solution; See 3601 FIG. 24. Where each raw solution has an SACFn = ATx − ATx_SACFn and x is either 0 or 1. A preferred embodiment used SV = 40 bins which bins could get a minimum width of ¼ ppB. Other preferred embodiment could use SV = 80 bins. |
| Synchronization update interval | The intervals between two consecutive corrections of frequency of the free running oscillator performed by the |

-continued

| | |
|---|---|
| (SUI) | synchronization methodology. During this interval other correction to compensate EC impact on the free running oscillator are permitted and possible. Can be defined as a time interval or in the number of received TSPs. Can be fixed or variable. If variable, the SUI cycle will be closed when the system accumulated sufficient CFn raw solution, where this number is for example eight. |
| Synchronized port: | A time slave that is synchronized to a reference timing source from the network using a protocol, an algorithm and a local reference clock. |
| TSP | Timing synchronization protocol. Example IEEE 1588, NTP, PNTP. |
| T_SACF: | Temperature stability self assessed confidence factor. |
| T_SACF: | Temperature self assessed confidence factor. |
| t1: | Departure time stamp from the time reference node. |
| t2: | Arrival time stamp to the follower node. |
| t3: | Departure time stamp from the follower node. |
| t4: | Rival time stamp to the reference node. |
| Teon dimension: | Number of TSP in the Teon group. |
| Teon: | A group S of n time stamp elements TS1 ... TSn collected in any order during a synchronization update interval. The number of elements of a Teon determines the dimension of a Teon. Example: A three dimensions Teon has three TSs. Each Teon can generate at least one CFn. The higher the dimension of the Teon, the more solutions can be generated. |
| Time reference node: | Node that has a precise time reference as frequency or UTC and that provides time events with a known departure time that are received by the follower. |
| TS: | Time stamp. A pair of departure local time and the arrival local time of a propagation event. Ex: D(n), A(n) |
| Vicinity of X | A bounded interval that includes the element X. The size of the interval is defined as a functional parameter of the system |
| TSP: | Time stamp pair (departure time stamp, arrival time stamp) = (Dn, An) of an event. The time stamp can be explicit or constructed. Instances of constructed time stamps are CBR T1 services over PSN can have the departure time constructed according to the payload, if the circuit emulation equipment ensures stable packetizing timing. |
| VT | Valid Teon. A Teon that generates a valid raw CFn solution that is further used in the determination of the final CFS solution. A valid N dimensional Teon (Neon) is a Teon with the property that each of the N elements satisfy a set of relations and each TS1 is directly used to generate a CFn solution that satisfies a set of relations R[1] ... R[m]. Example: a N = 4 Teon named Quatron has TS1 ... TS4 elements and generates a minimum 3 CFn solutions. First the TSk need to be at a minimum distance from each other, k = 1, 2, 3, 4. Using R[1], a commutative relation, at least CFn(1, 2)•R[1]•CFn(2, 3), CFn(2, 3)R[1]•CFn(3, 4). Any other combination of intervals like {CFn(1, 4)•R[1]•CFn(3, 4), CFn(2, 3)R[1]•CFn(3, 4)} or {CFn(3, 4)•R[1]• CFn(1, 3), CFn(2, 3)R[1]•CFn(1, 4).} would be sufficient to validate the teon and the valid raw solution. For our timing synchronization application R is generally symmetrical: TS1•R[k]•TS2 = TS2•R[k]•TS21 and not transitive. In our notation x•R•y indicates that x is in relation R with y. Also CFn(x, y) = CFn(y, x). |

Exemplary embodiments, in accordance with the present invention, include a systemic approach for Timing Synchronization, comprising a set of technologies that can be used either i) independently as elements of existing systems or ii) combined as a total end to end solution.

Applications of Network Timing Synchronization:

The present system will allow Internet-based precision timing distribution having equivalent or better precision then GPS at a fraction of the cost, with greater reliability and with a reduced ecological impact. The high precision clock and time of day will be ubiquitously available over virtually any network for the benefit of traditional systems that require precision synchronization, from cellular networks to radio-telescope arrays and will open the door to many unforeseen and novel applications.

Other immediate applications include the cell tower, femtocell and cell phones synchronization, the transport of synchronous T1/E1 links over PSN and other wireless communications requiring accurate RF leading to more efficient use of the spectrum and battery power. The Process can measure network congestion and quality of service through the SACF.

Security applications. The process of this invention can be used to identify the origin location of time stamped messages through accurate propagation delay and PDV signature, indicating local fluctuations of the environmental conditions. A time synchronization signature identification could be used to test the location and identity of any element of the network.

The invention can be used in high quality HDTV, AVB and media broadcast quality communications to reduce buffering size, equipment cost and the delay that compromises the quality of interactive communication. The capability to detect the slightest thermal gradient can further be used to detect over temperature and dangerous conditions like fire or freezing. The invention can be used to monitor efficiency of a home heating system and the existence of fraud for utility companies.

Operations Monitoring: Having the context of many slave nodes in the same physical location, an abnormal temperature shift can identify malfunction or dangerous situations.

Precision timing is the essential element of positioning. The wireless nodes accurately synchronized in time could perform as a local GPS system. Moving inventory inside or outside storage areas can be precisely located. House security systems can detect intrusion and hazard conditions.

The algorithm process is applicable to all similar situations where intermitted perturbations of the same nature as the transported information corrupt the transported information (in our case this information is time).

It is to be understood that the present invention may be implemented in various forms of hardware, software, firmware, special purpose processors, or a combination thereof. In one embodiment, the present application may be implemented in software as an application program tangibly embodied on a program storage device. The application program may be uploaded to and executed by a machine comprising any suitable architecture. The various processes and functions described herein may be either i) part of the micro instruction code or ii) part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present application is programmed. Given the teachings of the present application provided herein, one of ordinary skill in the related art will be able to contemplate these and similar implementations or configurations of the present invention.

Exemplary embodiments, in accordance with the presently disclosed invention, provide synchronization systems, methods and apparatus that seamlessly that can be used with either i) the methodologies described herein or ii) standard protocol. Some of these exemplary embodiments of the precision network timing protocol (PNTP), as disclosed herein, are fully symmetrical relative to the reference and the follower, and almost identical for all the ports. This, in part simplifies significantly the implementation. There are less packets crossing the network for the equivalent returned information, using fewer bits in the representation of time stamps, covering more functional situations and transitions of the nodes and having a full separation between the management and the synchronization planes.

Timing Synchronization Methodology

Exemplary embodiments, in accordance with the present invention provide, in part, systems, methods and apparatus that process time stamps related to propagation events between reference and follower nodes, and determine the necessary corrections required to obtain the synchronization of the local oscillator and the local time of the day. Different embodiments of the method can have one or more functions that address, individually, or in combination, the Frequency, Phase and Time of Day synchronization. Exemplary embodiments of these methods can use multiple precision time reference nodes for increased reliability and accuracy. These embodiments use a self assessment mechanism to evaluate the "trustfulness" i.e., the accuracy, of the solution they return.

Exemplary embodiments, in accordance with the present invention, include the use of multiple horizontal (parallel) and vertical (hierarchical) methodologies in achieving synchronization. These methodologies include the analysis of a certain combination of events, called Teons. The Teon concept facilitates transformation from the analysis in a temporary space to analysis into a correction factor space, which is a space of solutions. The conversion translates a one dimensional time axis into a multi dimensional space. Embodiments seeking accurate solutions test the Teons against a defined set of criteria or relations. The passing ones are considered Valid Teons and are used to calculate the correction solutions required for synchronization. Each VT can generate at least one solution. The higher the dimension of the Teon, the more solutions can be generated.

Some exemplary embodiments, which are in accordance with the present invention, use a self cognitive approach in determination of synchronization parameters. For example, at certain times a window of opportunity can open in between end nodes that will allow the quasi undisturbed propagation of a packet. Such packets carry the best information that can be used for synchronization. However, one of the problems to be overcome is how such rare events can be identified, out of the noise due to the permanent fluctuations of propagation delay. The self awareness functionality tunes the parameters of the CFFs to generate better solutions by assessing their probability of success and selecting ones providing higher reliability according to the external operating conditions. Exemplary embodiments of the present invention include several independent methods that address each of the three aspects of the timing synchronization: frequency, phase and time of day (UTC).

Figure 19:
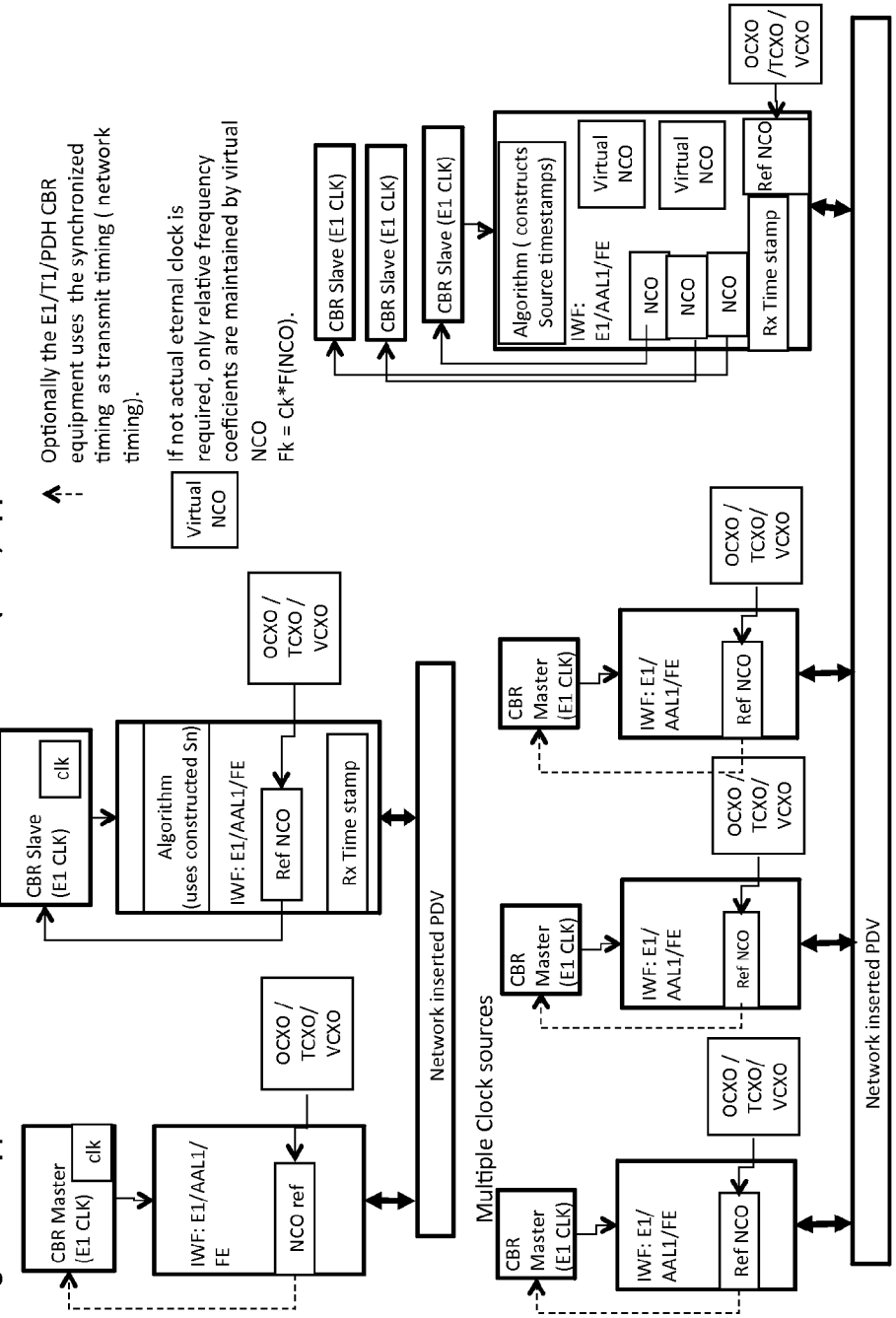
FIG. 19 is a block diagram depicting an exemplary embodiment, in accordance with the present invention, of a Functional Architecture for an embodiment of the Hierarchical Multi Layer Process for computing FCF from locally or remote collected time stamps in accordance with the present invention.
Figure 20:
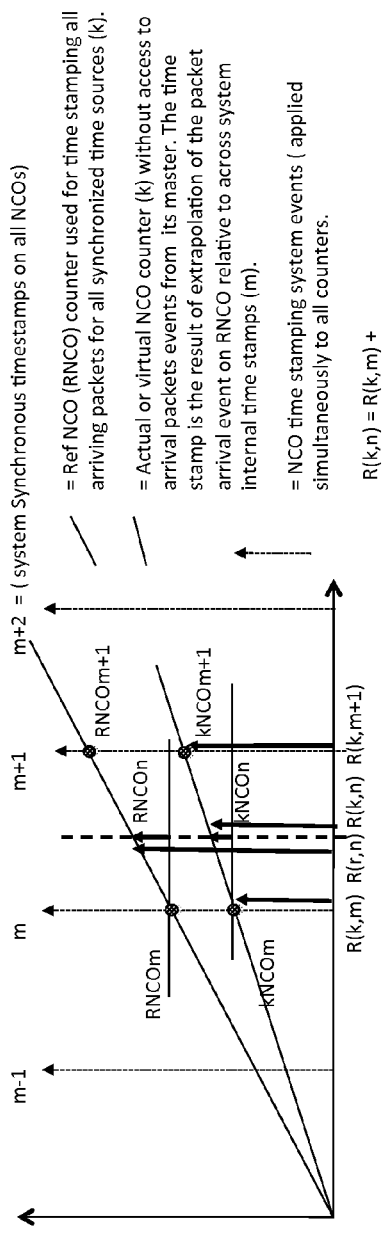
FIG. 20 is a block diagram depicting an exemplary embodiment, in accordance with the present invention, of a minimal implementation of the architecture depicted in FIG. 19.

FIGS. 19, 20 and 20A depict Functional Block Diagrams of exemplary methodologies, in accordance with the present invention; these methodologies can be implemented by systems, methods and apparatus, all of which are also in accordance with the present invention, The synchronization methodology addresses the problem of Propagation Delay Variation (PDV), conflicting requirements from different precision timing applications and holdover stability. The reciprocal dependency (Frequency is the derivative of Phase) may result in undesired effects when adjusting either i) frequency, ii) phase, or iii) time of day. Applications requiring frequency synchronization, for example, femtocells or Base Stations have tighter limits for frequency fluctuations, while the accumulation of the phase error relatively tolerant. In contrast, the Circuit Emulation or Pseudo Wire (PWE) functions limit the maximum allowable phase error through the Maximum Time Interval Error (MTIE) template in order to preserve data integrity.

Another example of conflicting requirements that can be addressed by embodiments of the present invention, for example the methodology in FIG. 19, is when a significant change of the propagation delay occurs, raising the floor of the PDV and generating a jump in the phase measured by the algorithm. A process focused on frequency synchronization (locked process (FIG. 20) should remain unresponsive to such floor transitions. However, a phased locked process (FIG. 20A) (targeting data integrity by maintaining a constant level in a FIFO buffer), will try to compensate for the change either i) through an abrupt readjustment of locked phase value (compensating for the difference in propagation delay) or ii) through a frequency offset that gradually absorbs the phase jump. For PWE applications, sudden propagation delay transitions impact the data buffer levels and lead to starvation or overflow. To preserve data integrity, the compensation in frequency that would correct the data buffer levels should be smooth enough to match the standard G.823 template. Other wireless applications require UTC in addition to the frequency adjustment. Abrupt UTC adjustments within certain limits could be appropriate in a case by cases situation.

Exemplary synchronization methodologies are a scalable hierarchy of decisions (FIG. 19) which can comprise up to 4 processing layers labeled as layers 1, 2, 3, 4 (FIG. 19, 121, 122,123,124). The simplest implementation which can run with only one CFF of layer 1 as depicted by the functional block diagram 2000 depicted in FIG. 20. Additional CFFs can be added in as parallel as horizontal processes within the same layer and/or also as vertical layers doing solution processing. Referring back to FIG. 19 each of the CFF (110, 111) at layer 1 can have different functional relations or can only differ through the parameters of the same function (see FIG. 21). Each would be better fit and provide better CF solutions under certain network conditions. The associated SACF would indicate when the CF is reliable or not. The immediate upper layer would decide which CFS to use and how to generate its own CFS to be passed to the next hierarchical level. The output interface of each layer 1-4 is generally the same consisting of a Correction Factor Solution (CFS) that includes the Correction Factor (CF) and the self assessed confidence factor (SACF) for that solution. CFS=(CF, SACF). This vector is passed to the next hierarchical layer. This process of going to each higher layer is shaped like a pyramid. Information may be exchanged across hierarchical structures for instance between the parallel CFF in the same layer (as the example between the Frequency and Phase CFF see FIG. 20 A) and in between layers 1 and 3.

Description of a more general implementation is described in Example 2 (FIG. 19).

Layer one (L1) receives time stamped pairs (TSP) from the ingress and egress directions of the link to the reference timing node. The CFF processes could be F, P, M and UTC using three modes of operation: unidirectional direct, unidirectional mirrored and bidirectional. CFF extracts CFn from a subset or all the possible combinations of events. Then extracts the final CF from the CFn set. SACF could also be computed. Layer 2 (L2) processes selects the best solution out of each pair of unidirectional CFS of a link. If both directions have close SACF (for example within twice the value) then it is calculating a weighted average of the CF based on SACF. L2 generates one CFS for each unidirectional CFS.

Layer 3 (L3) generates one CFS for each reference node. It takes as input the CFS from a plurality of CFSs from L2 that are generated from the link to that Reference. The solution is similarly determined by doing a SACFn weighted average of CFn where n indicates the CFS solution.

Layer 4 (L4) gathers all available CFSs from L3 and performs the weighted average for the final solution. Multiple layer 4 instances can exist that could use different combinations of Reference timing according to the various synchronization contracts.

If the system uses multiple cascaded physical or virtual oscillators (See FIG. 49, 50, 51, 52, 53) simple additional processing is performed on CFS as indicated infra.

The hierarchical methodology of FIG. 19 provides both frequency and UTC synchronization. Generally, only the frequency is actively corrected during normal operation. UTC needs to be updated rarely, mainly at startup, during the astronomic clock updates and after major failures. The decision to update UTC through a step change versus an indirect update thorough modifications of local frequency, considers several factors like the magnitude and the dynamics of the offset that differentiated between the abrupt and continuous slide of UTC.

A linear smoothing layer can be added to stabilize the final solution or any intermediate solution especially in cases of nonlinear functions. See 125 of FIG. 19.

System Adaptive Structure

As discussed earlier some embodiments, in accordance with the present invention, in another exemplary embodiment the blocks depicted in FIG. 19, or the internal block parameters, may be removed or inserted, during runtime by self assessment decisions made by the systems, methods and apparatus in accord with the present invention. In other exemplary embodiments can be pre-configured as required by each invention. As depicted in FIG. 20 and exemplary minimal implementation in accordance with the present invention can comprise only one of the layer 1 blocks. Such a minimal implementation can eventually simplify CFS and provide only the CF without SACF. In another exemplary embodiment of synchronization methodology in accordance with the present invention Layer 4 (124 FIG. 19) can dynamically add or drop the use of solutions from some Reference nodes R[n] as a result of worsened link to conditions to the time reference master, that impacts on the quality of the associated solutions.

The system processing capacity, the response time and the required accuracy of the solution determine the number of parallel CFFs instances. CFFs may be identical but use different internal parameters or the same CFF is executed iteratively with optimizing internal parameters for the best solution. The CFFs adapt the internal functional parameter as a function of the stability and quality of the solution analyzed over time periods, the network load, the PDV nature and range. Parameters are updated at the end of computing iteration or the end of the cycle (synchronization update interval) when Frequency and UTC solutions are generated and transferred to HW to change the local oscillator frequency or time counter values.

As example, during a cycle a number of TSPs are collected and processed. This number is knows as the program update counter (PUC). The number can be fixed according to certain application requirements or can fluctuate as the algorithms can shorten the cycle if it achieves the desired result (for instance the minimum number of VTs). Also the synchronization methodology can adapt its functional parameters according to the network conditions and available computing resources. For instance under PDV conditions there may not be sufficient VTs found during a regular search PUC. Instead of terminating the cycle and getting a doubtful solution the algorithm can extend its cycle by sliding the SUI interval of collecting TSPs until it identifies the minimum VTs. Other internal CFF parameters change as the precision and stability of synchronization (self estimated by the system) fluctuates. For instance an overloaded network may have high PDV resulting in very few instances of valid Teons. The ratio between the valid and invalid Teons can control the SACF that in turn impacts on the averaging depth for the smoothed solutions. When the SACF increases the smoothing depth is decreased to give greater weight to the good solutions and faster pulling into better synchronization. Also the selection criteria for Valid Teons used in both frequency and Slope CFFs is relaxed up to certain saturation limits to maintain a minimum selected instances. AT0 can increase inverse proportional with the number of VT. A more restrictive VT selection process increases precision and narrows the expected range of CF that allows elimination of aberrant solutions. After power up a quick rougher approximation of the clock is could be performed, that can use shorter cycles and lower threshold for the Valid Teons. Once the corrections show to stabilize within a certain interval proportional with the sought synchronization precision, the lock status is declared and the cycle time can be increased for increased precision as an alternative embodiment for the flexible duration cycles. One implication would be lowering the Saturation Threshold Max_Sat_ATx, x=0 or 1 as indicated infra for increases precision. Another option is to have the best CF stored and used at power up to provide the first correction. Yet another approach using the High stability oscillator methodology provides very accurate power up and holdover timing.

Functions can adapt during runtime their methods. For instance finding the frequency CFS from a small number of Valid Teons will better utilize SoD function, while for a large number the histogram method is better fit. (A threshold could be for instance 8).

Self Awareness Nature of the Process

The process evaluates the degree of confidence in the solution it produces. The dependency could be determined from the internal algorithm intermediate processing results (as example the ratio of valid and invalid Teons), the nature of the input data (for instance the range and distribution of PDV), the stability of solutions, the values of the internal adaptive parameters or other factors. Self assessed confidence factors (SACF) are the numerical representation of the self awareness. SACF are normalized to range between Max_SACF and 0 for the relative comparison. For instance the proportion of low PDV TSPs events relative to the total number of TSPs would indicate the confidence of the result. The sharp concentration of CFn solutions around a certain value will also indicate a high degree of confidence in that solution. Each layer can have multiple functions taking same input and providing same type of solution using different approaches that are more or less fit to the current network conditions. SACF will indicate which function provides the best solution at specific point in time. SACF need to be normalized to a common range of values for all CFSs to allow comparison by using normalizing factors. As an example the normalized value can be an integer between 0 and 16. For purpose of illustration the SACF could be=24*[(instances within vicinity)/(instances in the extended vicinity)−⅓).

Some systems may decide not to implement the SACF functionality which case is equivalent with setting all SACF=1 in our equations.

Histogram Smoothing Techniques

The L1 spatial solution smoothing reduces CF associated errors due to PDV noise at the histogram level. Even if the process is not as efficient as smoothing the final solution, some systems would pronounced nonlinearities would have to use this approach.

The Layer 1 Frequency and Slope CFFs generate from every Valid Teon at least one correction factor CFn. The final frequency CF solution of the synchronization methodology is a direct, absolute correction factor (expressed in ppB or as 1 vicinity ratio), relative to the free running frequency oscillator, NCO~=CF+NCOupd (approximation possible due to the values of the variables narrowly located in a vicinity of 1) where NCOupd(n) is the current normalized correction factor that was applied to the local free running oscillator during present cycle. Accordingly the solutions generated from VTs can be represented as NCOn~=CFn+NCOupd histograms for the NCOupd(n) values are created. The bin size for NCOupd(n) is normalized to a standard interval, that in an embodiment example could be $=\frac{1}{4}$ ppB. Bins are identified by the NCOupd(n) value, either at the center of the bin or at the left boundary. Each bin content is averaged with past values of the bin content weighted with the associated past SACF of the CFS associated with the histogram. The depth of the average could be adaptive (adaptive_depth). As example adaptive_depth=(AT0>>2) and saturated at 128 (adaptive_depth. LT 128). Generally $AT0=2^k$. Alternatively instead of storing a number of past bins equal with the adaptive_depth parameter, we can do an DR filtering and use only one SUM variable for each bin: SUM_NCOupd(n)=(SUM_NCOupd(n)−(SACF+1−Max_SACF)*SUM_NCOupd(n)/$2^k$+SACF*NCOupd(n)])/(Max_SACF). The Adaptive_Depth increases for lower SACF and decreased when SACF is higher. Each SUM_NCOupd(n) needs to be multiplied by the factor changing the Adaptiv_Depth. If this is a power of 2 shift one clock operations can replace much more complex division and multiplication operations. The process is repeated in both embodiments for each bin and a smoothed histogram is produced. Then a solution is calculated from the smoothed histogram using the same window method as in the regular histogram case. The smoothed histogram can be directly applied to Slope(n) solution extracted from Valid Teon (n) by first converting the Slope to a CF representation. Same procedure applies further to the UTC CF S. The histogram needs to represent absolute not differential values.

The Linear L4 Solution Smoothing

The final CF solution can be filtered using the same adaptive depth mechanism depending on SACF, identical with the one applied for each individual bins of the histogram or a generic IIR filter. (see FIG. 19, 125).

For example assume NCO~=CF+NCOupd where NCOupd is the current correction applied to the synchronized oscillator. SUM_NCOupd=(SUM_NCOupd−(SACF+1−Max_SACF)*SUM_NCOupd/$2^k$+SACF*NCOupd)/(Max_SACF).

Adaptive_Depth increases for lower SACF and decreases immediately when SACF is higher. Each SUM_NCOupd(n) needs to be multiplied by the same factor that changed the Adaptiv_Depth. The Smoothed_NCO solution is SUM_NCOupd(n)/$2^k$.

The Smoothed_NCO can directly control the NCO2 in a dual stage oscillator configuration (4902 in FIG. 48, 49,50, 51, 52, 53), while NCO1 can be loaded with NCO−Smoothed_NCO value (4901 in FIG. 48, 49, 50, 51, 52, 53).

Layer 1 Frequency (F) Unidirectional Process

The unidirectional process performs frequency synchronization and can maintain relative phase lock up to an unknown constant determined by the absolute propagation delay.

Teonic CFF

Figure 1:
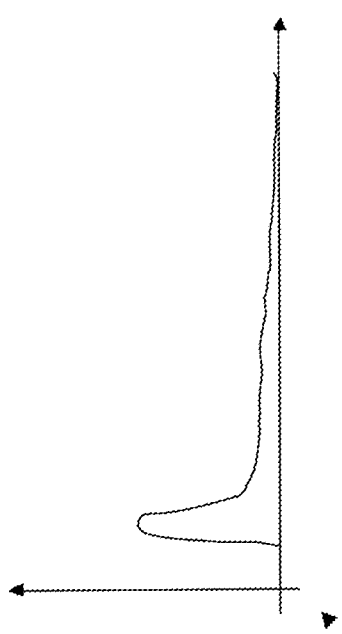
FIG. 1 is a graph depicting propagation delay density fluctuations under low network load conditions.
Figure 2:
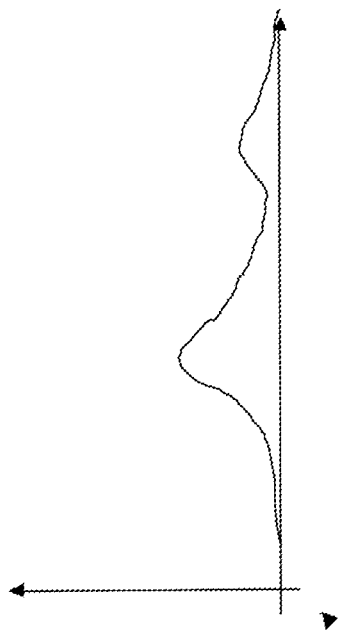
FIG. 2 is a graph depicting propagation delay under high load condition.
Figure 3:
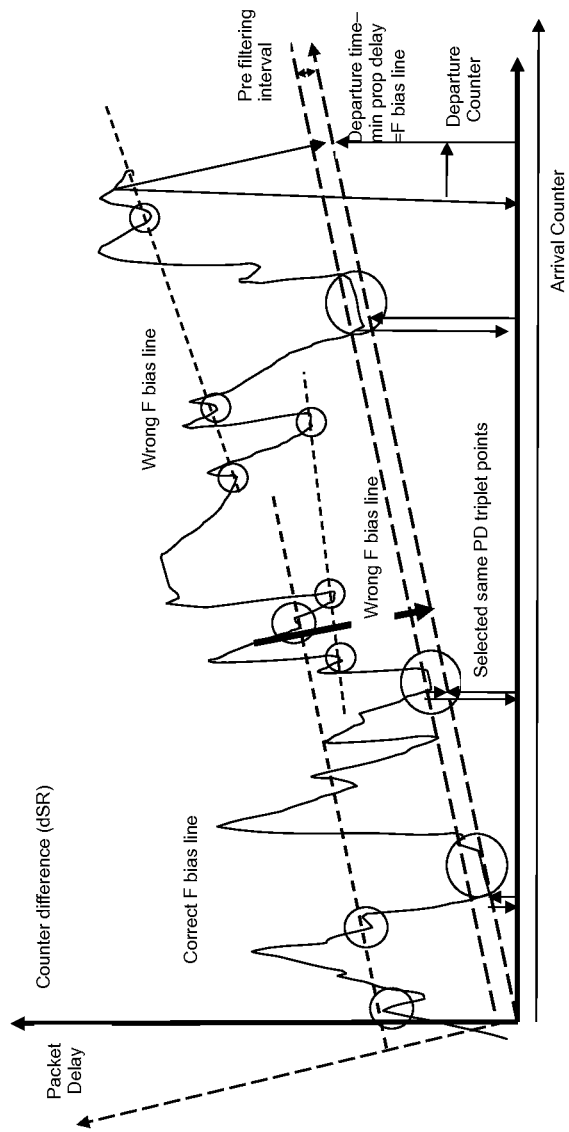
Figure 4:
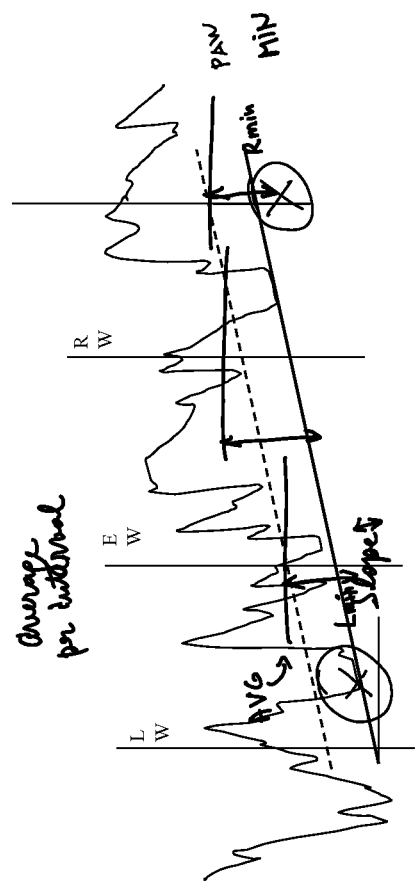
Figure 5:
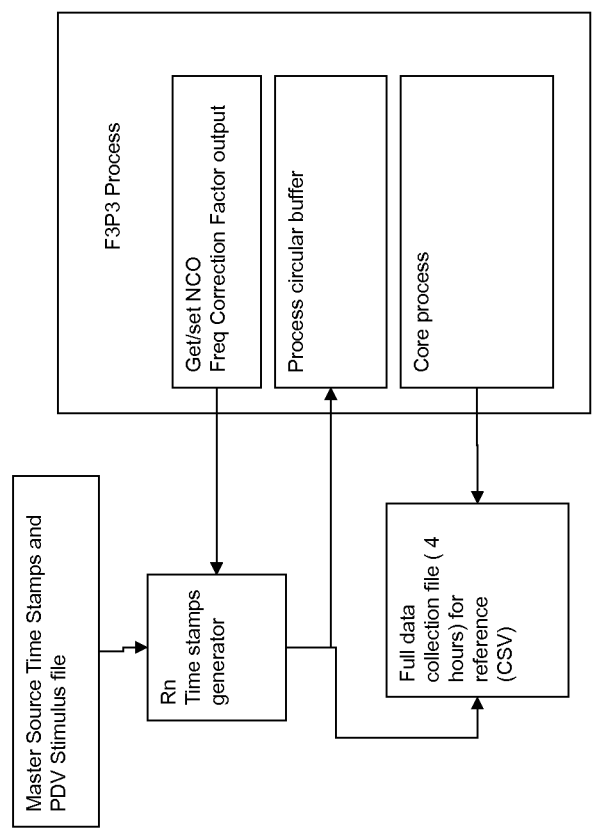
FIG. 5 is a graph depicting the extraction of slopes from triplets and their relation to the tilt generated by clock shift.
Figure 6:
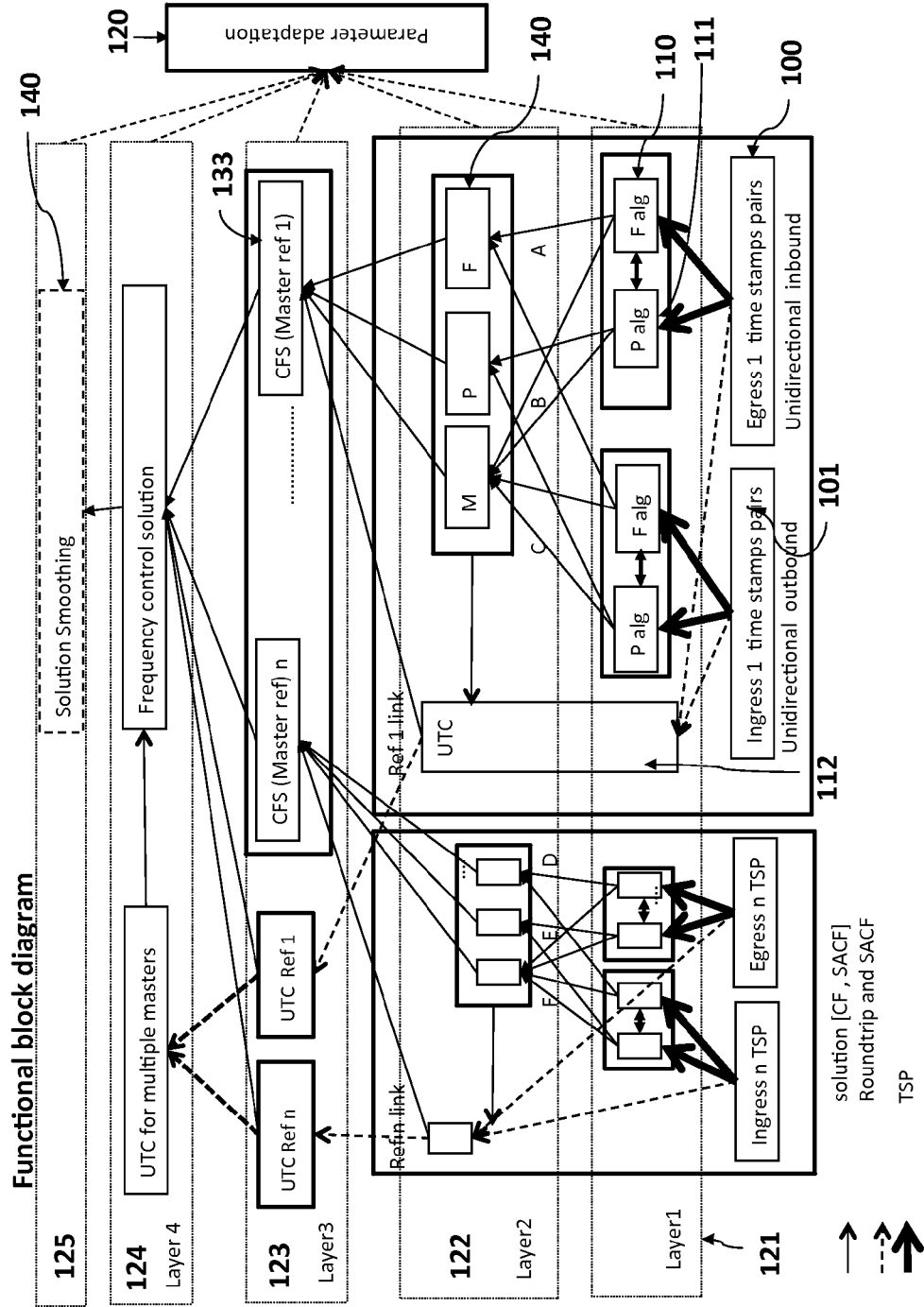

In one embodiment, each CFF process constructs N dimension Teons (N could be the same or different in between CFFs) from available TSPs and generates corrections factors (CFn). Other embodiment will only preserves the valid CFn associated with the VT identified through certain relations. Both embodiments will further determine the densest CFn vicinity and use it to extract the CF solution. Yet other embodiment would further determine the SACF as the ratio of VTs over total Teons, or another embodiment calculate SACF as the ration between the number of Teons inside the would of the total Teons indicates the likelihood that the CF solution will be correct. Generally VTs must occur unless there is a special reason for them not to occur. The frequency of such occurrences depends on certain specific conditions on the network. The Process takes advantage or the nature of the PDV that depends on the network load. Certain windows open in time when the propagation delay is constant and most likely equal with the minimum propagation delay. This is possible because asynchronous networks are engineered such that 100% loads do not last for an indefinite time period. Such a window of opportunity happens when all the intermediate nodes are free of congestion which is a certain probability that is inverse proportional with the network load. The TS of a VT need not be in the same constant propagation delay window. For instance, if TS of a VT are located in minimum propagation delay periods of times that are separated by variable PD, the algorithm will be able to identify the constant PD for all the TSs and retrieve the CF. A similar constant propagation delay events may happen when switches have a constant load over a period of time. A relative minimum delay for short period of time is constant propagation delay. The law of large numbers indicates the potential of an almost constant propagation delay path through big capacity switches which situation is also identified and used for CFS. The minimum propagation delay either relative or absolute will have a higher density or concentration of VTs as the other variable delay events will have other Teons spread over a significant range of delay values. See FIGS. 1 and 2. The accumulation in time of distribution in FIG. 1 that translates on the time axes, and stabilizes for longer or shorter periods in certain locations results in the graph of FIG. 2. The F process would select the TSP within the window capturing the peek density (3601, 3603 FIG. 35, 36). Both the F and P unidirectional processes and in the roundtrip process are selecting highest density vicinities from the CF codomain.

Valid Frequency Duet Teons need to satisfy the relation defined by the inequality $dD(x,y)/dA(x,y)=(D(x)-D(y))/(A(x)-A(y))<AT1$ Where AT1 is the acceptance threshold located in vicinity of 1, x and y are the packet Id number, under assumption that within the same Synchronization Update Interval (SUI) and there is no double instance of the same packet ID.

Without losing from generality we use the indexes $x1, \ldots xn$ for Ntuplet Teons consisting of time stamps: $(D(x1), A(x1)), \ldots, (D(xn), A(xn))$ that satisfy the condition xdA(xk, xi)>min_distance for any k,j combination. The relation that establishes the validity criteria is to have for each of the xk at least one other xj time stamp, that satisfies the inequality: $dD(xk,xj)/dA(xk,xi)<AT1$ where each k takes all the values from 1 to n and j can have any of the values 1 to n and j is different from k. Other embodiment may have a similar but more stringent condition requiring that all the xk,xj combinations satisfy the inequality. Yet another embodiment may require a subset of all xk, xj combinations to satisfy the inequality. AT1 is adaptive. One embodiment could consider AT1=1+((Max_AT1−1)*(K_VT/total_number_ValidTeons).

In this embodiment K_VT is a constant equal with 10 and Max_AT1 is a parameter equal with 1.00000004. Max_AT1 can be increased up to the saturation value=Sat_Max_AT1=256 until total_number_Valid-Teons>8.

Valid Duons used in Slope CF solutions need to pass the inequality $$|(dA(x,y)-dD(x,y))/dA(x,y)|=|((A(x)-A(y))-(D(x)-D(y))/(A(x)-A(y))|<AT0//$$

Where AT0 is the acceptance threshold located in vicinity of 0, x and y are the TSP Id number, under assumption that within the same SUI there is no double instance of the same packet ID.

Without departing from generality, we use the indexes x1, . . . xn for Ntuplet Teons consisting of time stamps: (D(x1), A(x1)), . . . , (D(xn), A(xn)) that satisfy the condition dA(xk,xi)>min_distance for any k,j combination. The validity criteria is to have for each of the xk at least one other xj time stamp, that satisfies the inequality: $|(dA(x,y)-dD(x,y))/dA(x,y)|<AT0$ where each k takes all the values from 1 to n and j can have any of the values 1 to n and j is different from k. Other embodiment may have a similar but more stringent condition requiring that all the xk,xj combinations satisfy the inequality. Yet another embodiment may require a subset of all xk, xj combinations to satisfy the inequality. AT0 is adaptive. One embodiment could consider AT0=((Max_AT0)*(K_VT/total_number_ValidTeons). In this embodiment K_VT is a constant equal with 10 and Max_AT0 is a parameter equal with 0.00000004=40 ppB. Max_AT0 can be increase up to the saturation value=Sat_Max_AT0=256/1 ppB until total_number_ValidTeons>8.

Under intense PDV there will be very few VTs. Additionally there is a small probability of aliasing VTs especially due to constant and persistent pseudo Doppler effects. Such biased Teons that will infer a wrong frequency correction (aliasing corrections). Usually such aliases are significantly off the accepted range of correction so they can be easily filtered out after lock.

The process using Teons can run in either variable cycles that delivers the solution once a certain number of Teons was observed or can have fixed SUI duration cycles. One of the factors that could be included in the SACF is the ratio of the number of VT of total number of Teons.

Pre Filtering

The time stamped events can be pre filtered by retaining only the TSP associated with a minimum PD range. This reduces the overhead of searching Teons that are far from being acceptable. As a prefiltering process example the SUI is divided into segments (which can be in the 0.1 S range or can contain for instance 8 to 16 time stamps depending on the frequency of time stamped events). The size of the interval depends on the accuracy of the frequency synchronization because too large intervals would accumulate drift errors that would overlap the PD. The absolute PD minimum is determined in every segment. Values within a certain PAW interval above the absolute minimum are selected as part of the minimum PD range, where PAW parameter is for instance 50 nS.

Teon Combinations and Valid Teon Search Process

Teons are not restricted to sequential TSP combinations. They are in fact any combination of TSP events located anywhere in the time interval of the cycle. Increasing the combinations of TSPs being tested would increase the chances to find Valid Teons. As example an extensive Duon search embodiment over a 128 events cycle can generate combinations in the range of 10E4 while a Quatron search would test combinations in the range of 10E8.

Figure 21:
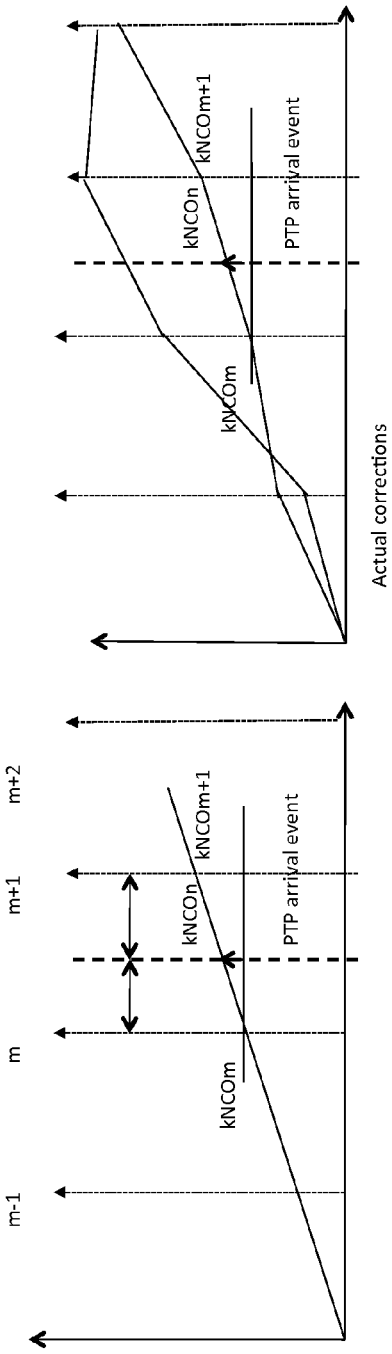
FIG. 21 is a block diagram depicting an exemplary embodiment, in accordance with the present invention, of a Parallel subsystem (internal hierarchy) for an F algorithm.

The CFFs included in the F process at layer 1 (110 FIG. 19) search for Valid Teons with different dimensions 2 (duet), 3 (triplet), 4(quartet) or n (Ntet) (FIG. 21). The search could be done incrementally for every newly received TSP following the minimum accumulated TSPs which is computed as: (N−1)*min_interval/T, where N is the Teon dimension used by a certain CFF, T is the nominal period between TS packets (example 1/128 ppS) and min_interval is the minimum time interval between TS of a Teon. Other operational parameters may differ in between CFFs like for instance the adaptation curves and saturation values for AT0.

Window Based Method for Duet VT Search

Figure 23:
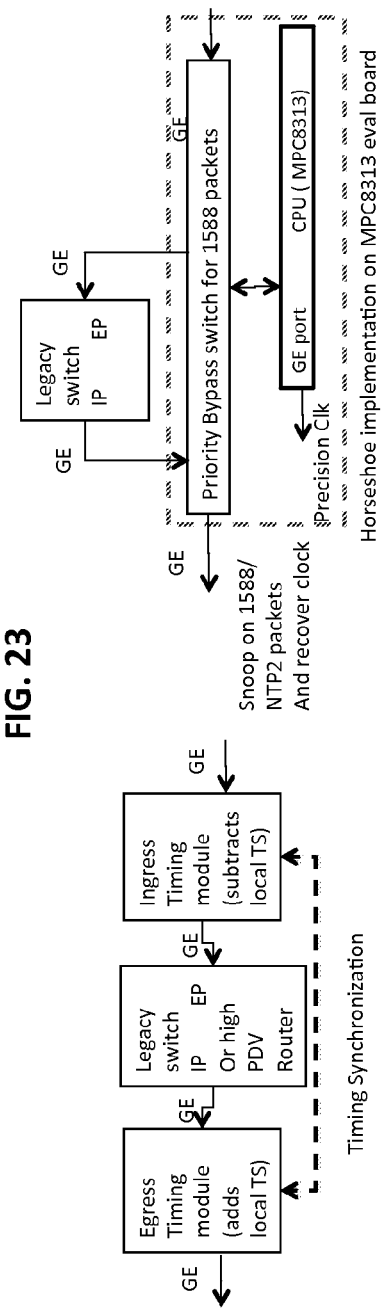
FIG. 23 is a graph depicting an exemplary embodiment of calculating the highest event density area selection through slide and tilt stripe, in accordance with the present invention.

This method uses the Duon (2 dimensional Teon) as the basic element of analysis. Consider a two dimensional reference system consisting of the vertical axis representing the a quasi propagation delay=D(n)−A(n) with Origin indicating an arbitrary unknown minimum propagation delay constant and the horizontal axis representing the time at the follower node where observation is made. The tilted axis 210 in FIG. 23 is the time at the timing reference node. The "Slope" 212 is the tangent of the tilt angle and it is equal with the Reference frequency−Follower frequency divided by the Follower frequency.

Determination of the Local Frequency Correction Factor CF_F for Using Duet Frequency Teons (Duon Structures) Example.

Consider Dn=departure time of an event and An=arrival time of the same event.

The CFF determines Frequency Correction Factor with the formula CF_Fn=(dDn−dDm)/(An−Am)=dDmn/dAmn from the TSPn and TSPm. Then identifies the VT that satisfy the relation CF_Fn<AT1, place VTs in a histogram and select the most probable CF_F by using methods like highest density histogram window or minimum Sum of Distances.

Ntuplets Search Method

A generalized expression of the process for N dimensional Teons would retain all the TSP Ntuplets that satisfy at least N−1 relations: $|dD(mn)/dA(mn)-dD(pq)/dA(pq)|<AT0$ where m is different from n, p is different from q, and (either p is different from (m or n) or q is different from (m or n)) and each TS of the Ntuplet is presented in at least one formula. The 4 indexes m,n,p,q are indicating one of the TSPs part of the Teon. N can be any integer bigger or equal with 2 (representing a Treon).

Additional relation that can be used to find more Ntuplet VT is $$QE<|dD(mn)/dA(mn)-dD(pq)/dA(pq)|<AT0+QE$$

Next, the highest density window of VTs values, 224 FIG. 23, is determined and the CF solution is calculated by applying methods like zooming histogram or minimum Sum of Distances. The SACF is determined through the same methods. SACF=K*(Sum(TSPs inside 224)/Sum(TSPs inside 226)−⅓), where k=24 for normalization.

Duet CFF Embodiment Example 1.2

Figure 24:
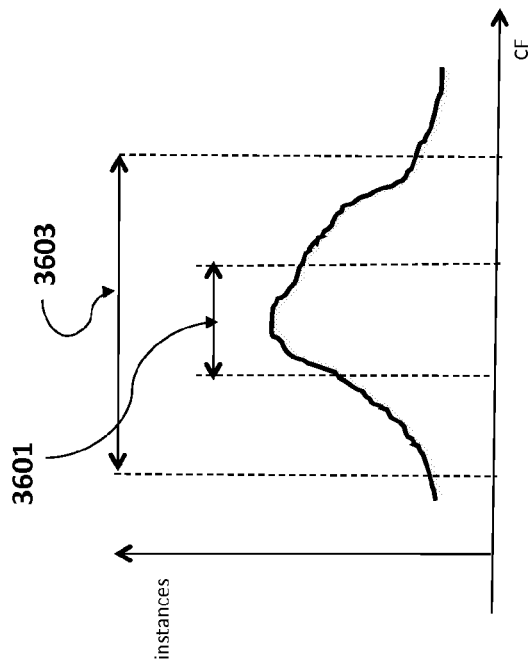

The difference between the local and the remote frequency results in a sloped distribution of TSP (Dn−An, An) events 222 on the graph in FIG. 23. Due to quantization error, stripes of densities may occur for the perfect propagation delay conditions. We can determine the position of the stripe that will encompass the maximum number of events inside WS, if local and remote QE is known (FIG. 24). Calculate CF for each of the TSP where D(n)−D(n−1)=dDn>min_distance. Distribution stripes may result from the quantization error at source or at destination (especially from the MII bus running at 25 MHz). Elements within one stripe (here named group) will not be mixed with the other group in the subsequent computings.

First Group is necessary to filter the VTs: $-AT0<(1-(dDn/dAn))<AT0$.

Second Group is optional: $QEmin-AT0<(1-(dDn/dAn))<AT0+QEmax$, if $QEmax-QEmin<precision$.

Third Group is also optional: $-QEmax-AT0<(1-(dDn/dAn))<AT0-QEmin$, if $QEmax-QEmin<precision$.

Where QE is the quantization error equal with the difference between the event time and the actual time stamp (QE is system dependent). Qemin=Qemax=40 nS for FE.

AT0 is an adaptive parameter proportional with the number of Valid Teons resulting from the search over the Teons analyzed during a cycle. The process can iteratively adjust AT0 to obtain a minimum number of VTs, subject to saturation. Also the pair of points for each factor dDn, dAn should be spaced in time by more than min_dist [S]=K/precision(ppB) [result is in Seconds], where "precision" is the sought accuracy of synchronization (ex: 10 ppB). K could be 2.

CF solution is CF_Fn=FCF_Fn=dDn/dAn that was determined during selection.

Determine the highest solution density area with Sum of Distances method.

Calculate Sum of distances associated with each Valid Teon n(SoDn) and sort them in ascending order.

$$SoD(n) = \sum_{s=1}^{PUC} f(FCF\_Fn, FCF\_Fs)$$

where in one example of embodiment the f is a distance function defined as:

$f(FCF\_Fn, FCF\_Fs) = Abs(FCF\_Fn - FCF\_Fs)$ or $f(FCF\_Fn, FCF\_Fs) = (FCF\_Fn - FCF\_Fs)^2$

Find FCF_Fmin as the FCF_Fn with the minimum SoD(n). Determine the number of adjacent FCF_Fs in a centered vicinity expanding left and right of FCF_Fmin by AT0*FVC (FVC=frequency vicinity constant—is a constant from .ini file. Default=1).

Count the Number of FCF_Fn within [FCF_Fmin−AT0*FVC, FCF_Fmin+AT0*FVC]=N_FCF_F1.

Preserve only the FCF_Fs within this vicinity. Discard all other FCF_Fn

Calculate the average of the selected FCF_Fs. This is the solution FCF_F1=CF_Fn.

$$FCF\_F1 = \sum_{s=1}^{N\_FCF\_F1} FCF\_Fs / N\_FCF\_F1$$

Determine SACF_F1 =

$$N\_FCF\_F1 == \frac{number\_of\_FCF\_Fs \subset FCF\_Fmin\_Vicinity}{K} = \frac{N(V)}{1} = N\_FCF\_F1$$

Calculate SACF1=ECF1*N_FCF_F1 where ECF1=scaling coefficient that normalized the SACF in a common range, for the next layer. A0 will completely disable the Duet F algorithm results from the final FCF_F.

Treon (Triplet Teon Structures) Frequency Algorithm Steps.

The same prefiltering process as discussed in the Duet section can optionally apply to decimate the number of TS to be considered and reduce computing load. The process would then run after a new set of TSPs associated with the interval used for the minimum PD extraction, was received, to allow identification of the TSP in the minimum delay vicinity of with PAW.

Without reducing from generality, consider the TSs indexes m<p<n, where the order is determined by time of arrival. The index n will indicate newly received packets.

$(D(p)-D(n))/(A(p)-A(n))=dDr/dAr<AT1$; $(D(m)-D(p))/(A(m)-A(p))=dDl/dAl<AT1$,

We used l for let and r for right denomination. First test Group: $-ST0<1000000000*((dDAl/dAl)/(dDr/dAr)-1)<ST0$ or $-ST1<1000000000*((dDl/dAl)-(dDr/dAr))<ST1$, Also, to reduce the solution aliasing caused by the frequency drift, we can add a restriction that the pair of points for each above comparison test (any of the factors dDn, dAn with n=l, r indexes) should be spaced in time by more then: (K/precision[ppB]), [result is in Seconds], where "precision" is the present accuracy of frequency synchronization (like 10 ppB). K could be 2.

Further pass each individual CF_Fn=dDn/dAn n=l,r to the histogram or SoD method to calculated CFS. Each CF_Fn can have an associated SACF_Fn relative to ST; For example SACF_Fn=(ST−1000000000*ABS*(dDl/dAl−dDr/dAr)).

ST is in ppB. Where l & r are the left and right intervals of the triplet n used to select and calculate FCF_Fn. The higher the SACF_Fn number, the lower the error of identification of PDV=0. SACF_Fn takes values in between ST and 1 if not normalized. For simplicity some systems can skip SACF_Fn computing and assign the same constant K=SACF_Fn (for instance K=1) for the weighted average.

Further step involves extraction of the CF_F associated with the set of analyzed time stamps (per direction and per link). For this purpose we ignore QE groups. We calculate SoD(n) where FCF_Fn=CF_F(n).

$$SoD(n) = \sum_{s=1}^{PUC} f(FCF\_Fn, FCF\_Fs)$$

SoD is the sum of absolute value, or the square of the difference value between each FCF_Fn solution generated by a valid teon to all the other FCF_Fs frequencies and perform the sum of those absolute (or squared) differences. Many other types of distances could be used (for example, replace power of 2 by power of 4).

Sort in descending order the SoD associated with each frequency. The smallest SoD indicates that the associated FCF_Fn has a vicinity with the highest density of correction factors and is most probable of being. To determine the final solution we will do a average of all the FCF_Fs=CF_Fs Valid Treon solutions within a vicinity of FCF_F1, weighted by the SoDs associated with every FCF_Fs. Teons.

$$FCF\_F = \sum_{s=1}^{N\_FCF\_F} SACF\_Fs * FCF\_FS \bigg/ \sum_{s=1}^{N\_FCF\_F} SACF\_Fs$$

The SACF could be the number of CF_Fs in a centered vicinity expanding left and right of CF_F2min by ST*FVC=number of FCF_Fk inside [FCF_F2min−ST*FVC, FCF_F2min+ST*FVC]=N_FCF_F2 (FVC=frequency vicinity constant. Default=1)

$$\frac{\text{number\_of\_FCF\_Fs} \subset \text{FCF\_Fmin\_Vicinity}}{K} = \frac{N(V)}{1} = \text{N\_FCF\_F2}$$

Consider the equivalent notation SACF_F2=N_FCFn_F2.
Calculate SACF2=ECF2*N_FCFn_F2 where ECF2=Enable Coefficient for scaling the Triplet based Frequency algorithm. ECF2=0 will completely disable Triplet F algorithm results from final FCF_F. ECF could be used to give higher weight to certain CFS.

NOTE: The Histogram function can be used instead of SoD.

The Quatron Process.

Accumulate minimum number of time stamps after the last NCOupdate—that is frequency_of_sourced_packets*minTdistance. Consider the time sequence: o<p<q<n the indexes of the four TS part of the Teon. Every new additional time stamp (eventually after applying the preselection), is used as a pivoting element or the Quarton, part of dAr, dD. As indicated in the Ntuplet description we can chose the minimum number of comparisons. Such a possible minimum combination can be defined for the indexes l=p,o; m=q,p; r=nq.

$((dDl/dAl)-(dDr/dAr))*10E9<ST1$ and $((dDl/dAl)-(dDr/dAr)))*10E9>-ST1$ and $((dDm/dAm)-(dDr/dAr)))*10E9<ST1$ and $((dDm/dAm)-(dDr/dAr)))*10E9>-ST1$ Calculate CF_Fl=dDl/dAl, CF_Fr=(dDr/dAr), CF_Fm=(dDm/dAm) for every l,m,r.

Determine confidence factor for each preserved FCF_Fn based on ST test, in each of the three groups of tests;

$SACF\_Fl=ST1-ABS(dDl/dAl-dDr/dAr)*10E9$ $SACF\_Fm=ST1-ABS(dDm/dAm-dDr/dAr)*10E9$ $SACF\_Fr=SACF\_Fm.$

Another more economic method would be to have only one SACF for all 3 CF_Fk, k=l,m,r by reusing already computed terms:

$SACF\_Fk=K*/3ST-1000000000*(Abs((dDl/dAl)-(dDr/dAr))+Abs((dDm/dAm)-(dDr/dAr))+Abs((dDl/dAl)-(dDm/dAm)))]$, where K is a scaling constant.

ST is in ppB. For simplicity some system can skip CF_Fn computing and assign the same constant K (for instance K=1) for the weighted average.

To determine the CF_F solution we can use as described before several solutions, among which are the histogram and SoD. For the purpose of this example we used SoD. Consider FCF_Fn=CF_Fn.

$$SoD(n) = \sum_{s=1}^{PUC} f(\text{FCF\_Fn, FCF\_Fs})$$

Determine the number of adjacent FCFs in a centered vicinity expanding left and right of FCF1 by ST*FVC (FVC=frequency vicinity constant—is a constant from .ini file. Default=1).

Count the Number of FCF_Fn within [FCF_Fmin−ST*FVC, FCF_Fmin+ST*FVC]=N_FCF_F3.

Preserve only the FCF_Fs within this vicinity. Discard all other FCF_Fn

Calculate weighted average FCF_F3:

$$CF\_F = \sum_{s=1}^{N\_FCF\_F} SACF\_Fs * CF\_Fs \Big/ \sum_{s=1}^{N\_FCF\_F} SACF\_Fs$$

Determine SACF_F3 = N_FCF_F3

$$\frac{\text{number\_of\_FCF\_Fs} \subset \text{FCF\_Fmin\_Vicinity}}{K} = \frac{N(V)}{1} = \text{N\_FCF\_F3}$$

Calculate CF3=ECF3*N_FCF_F3 where ECF3=Enable Coefficient for Quarton CFF.

A reduced complexity embodiment that searches for a valid Quatron (q,m,p,n) with every added TSP is described below. Latest TSP is the right pivot n of the loop. Once a VT is found CF and NCOupd are determined and a new cycle is started. This could be used to quickly synchronize to a level where a more complex algorithm can take over.

```
For( q = 0, q++, q<n − 3*min_dist) ;
For( m = min_dist, m++, m<n − 2*min_dist);
For (p = m+2*min_dist, p++, p< n − min_dist);
CF(q,m)=(D(q)-D(m)-A(q)+A(m))/ (A(q)-A(m))
CF(m,p)=(D(m)-D(p)-A(m)+A(p)) / (A(m)-A(p))
CF(n,p) =(D(n)-D(p)-A(n)+A(p))/ (A(n)-A(p))
SACF(q,m) = ST0−|CF(q,m)− CF(m,p)|;
SACF(p,m)= ST0−|CF(q,m)−CF(n,p)|
SACF(n,p)=ST0 −|CF(n,p) − CF(m,p)|;
If ( SACF(q,m)>0 &SACF(m,p)>0 & SACF(n,p)>0 ) then
CF0 = (SACF(q,m)*CF(q,m)+ SACF(m,p)*CF(m,p)+ SACF(n,p)*CF(n,p))/
(SACF(q,m)+SACF(m,p)+SACF(n,p))
NCOupd = NCOupd * ( 1+CF0);
End if
   end for; end for ; end for;
```

The |x−y|=x−y if x−y>0 else |x−y|=y−x is the absolute value function that returns a positive number.

L1 Slope F Process

The frequency drift between the reference and the follower clock counters can be represented as a slope in a rectangular coordinate system of slave time and difference between end points time. The angle of the slope indicates the magnitude of the drift between the follower and the reference frequencies that is the solution we seek. There could be several parallel functions that will compute the same solution starting from the same input variables but using different methods.

The slope histogram method will extracted from a histogram of slopes calculated from all or only a subset of all TSPs (for instance pairs of departure events that are spaced in time by a minimum interval of k/(sought precision in ppB, where k is a factor to be provided for each network, with a default of 5) the average of the slope values within the densest vicinity of the histogram. Generally this corresponds to the longest stable minimum PD within the window of capture. The vicinity size is defined function of the quantization error, accumulation interval and sought precision. An example it can be: vicinity size=max (v*quantization error[nS], k*sought precision [ppB]*accumulation interval[S]), where k and v are scaling constants. Such vicinity could include the slopes determined from the TSP associated with the minimum propagation delay packets. The slopes are determined by $(A(n)-D(n))/A(n)=dAD(n)/A(n)$ where D is departure TS, A is arrival TS. This formula shows there is an equivalence between the Duon and the Slope methods. Slope method can use several subsets of elements in a more geometrical approach.

Figure 33:
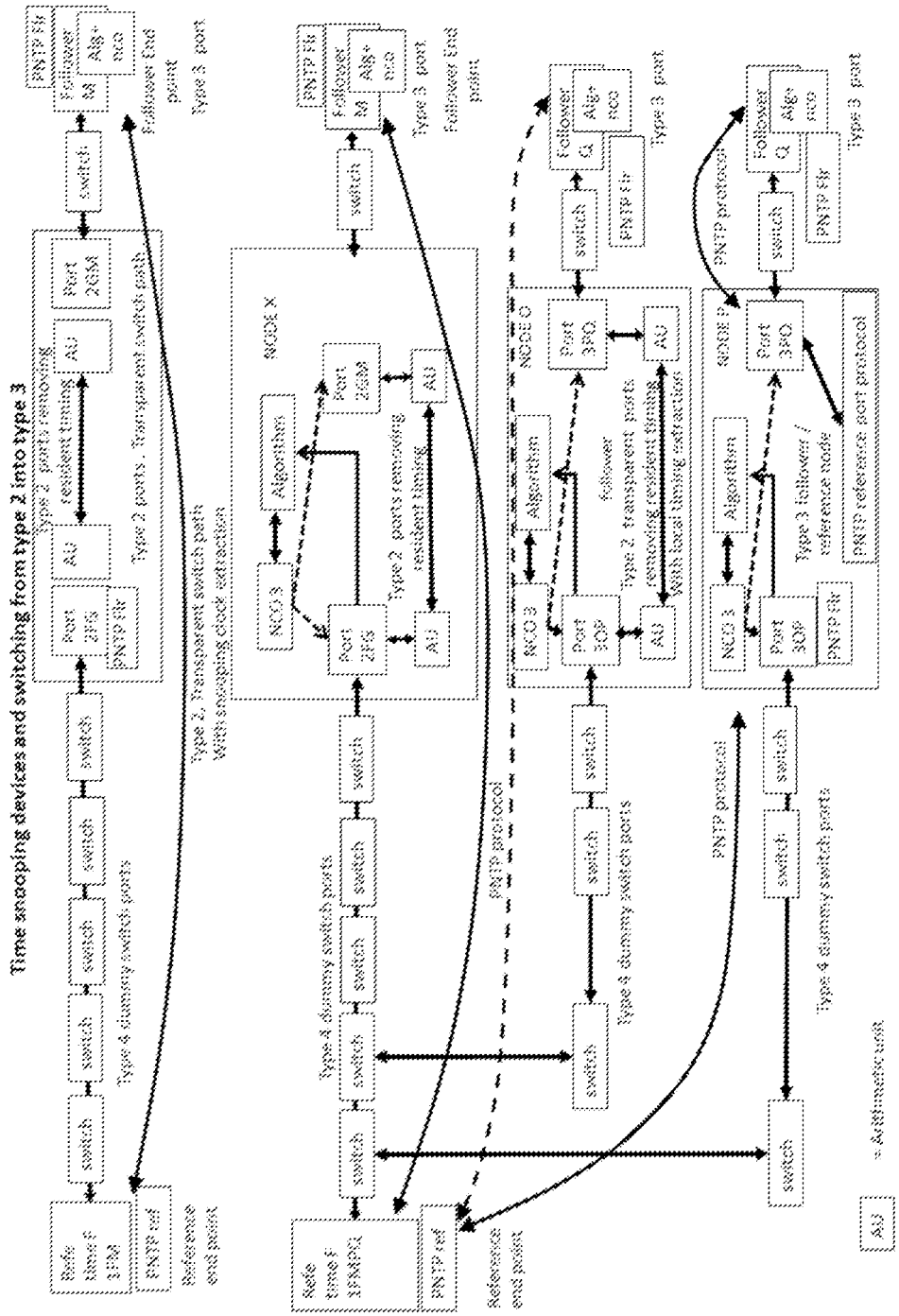
FIG. 33 is a graph depicting the selection of minimum propagation delay events in accordance with the present invention.
Figure 34:
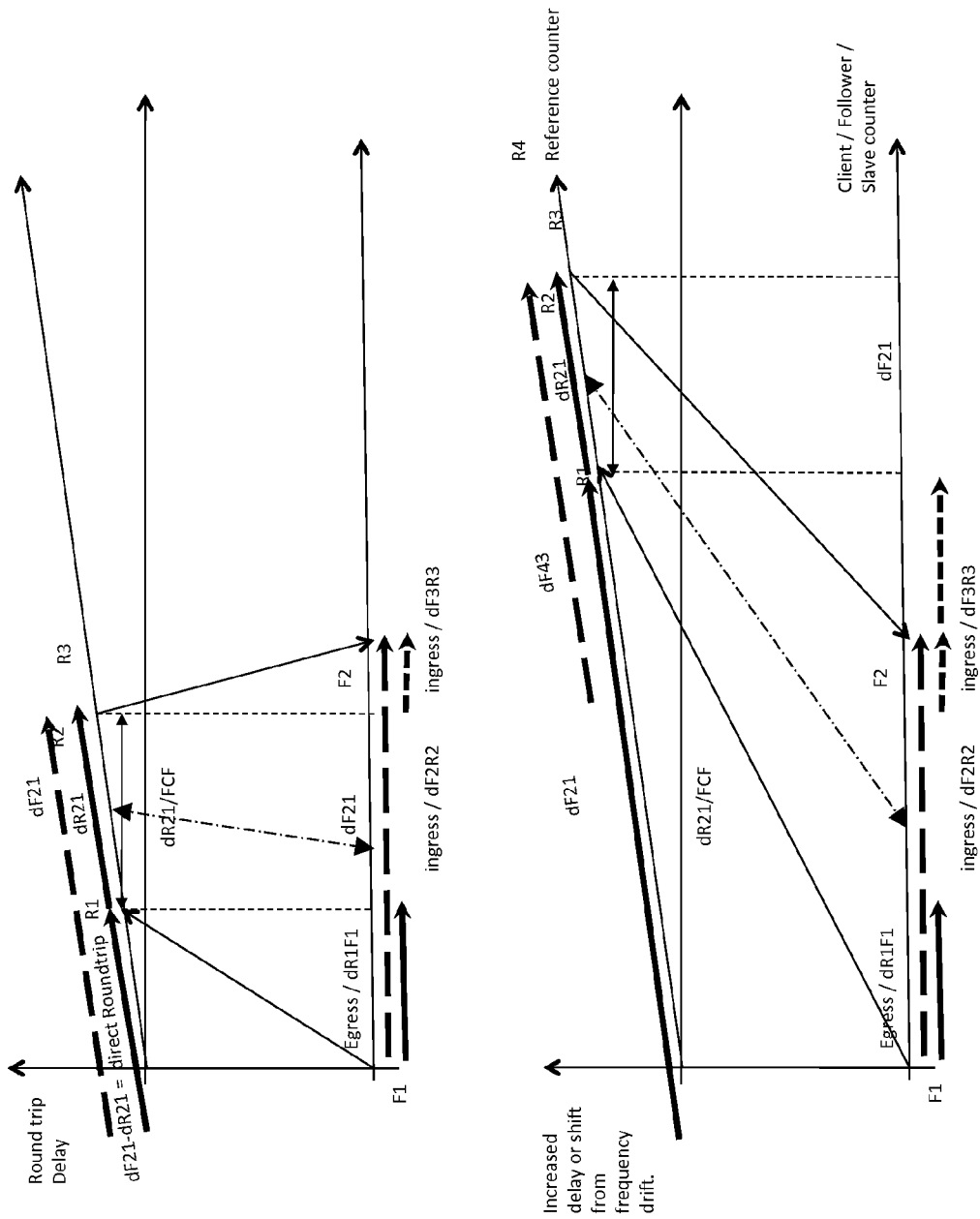

Extraction of the solution from the space of slopes uses several methods:

1. The sharpest density peak method uses a vertically sliding window 201 through the propagation delay events and counting the events within the window. See FIG. 33. Retain the maximum count of TDPs during the translation positions. Then repeat the process with a different slope window 203. The slope that will provide the maximum count is the solution. The SACF is determined for instance as a ratio between the number of selected points within the window versus all the points (or versus the points within a triple width window). An illustration of this process is found in FIG. 23. The stars on the graph are pairs of propagation delays difference of departure $D(n)$–Arrival $A(n)$ time stamps and the $A(n)$. Phase difference=$\Phi=D(n)-A(n)$=propagation delay+the error accumulated in time between the Tx and Rx counters because of difference in clocks. $\Phi=\Phi(PD)+\Phi(dF)$ $\Phi=\Phi(PD)+t(Rx)*(F(Tx)-F(Rx))/F(Rx)$; where $F(Tx)=$ clock frequency at transmit node.

$\Phi(PD)=-\Phi(dF)=\Phi-t(Rx)*(F(Tx)-F(Rx))/F(Rx)=>$the reference system needs to change the horizontal line with a sloped (tilted) abscise axis accounting for the difference in local clock speed. Propagation delay needs to be measured relative to this axis. For frequency determination purposes (F is a derivative of phase) the vertical translation of this Slope axis is arbitrary as the derivative of a constant is null. The Propagation Delay Density (PDD) solid curve left of vertical axis is a count of events in PD intervals delineated by the tilted lines. The "Slope" angle represents the shift between the Master and Slave clocks. Process needs to search for the angle of the selection window that maximizes the peak of the TSPs Density Curve. Dotted PDD graph 230 FIG. 23 on the vertical axis indicates a suboptimal angle. The search procedure: Starting with 0 degree Slope, perform vertical translations and determine the number of events in the window. Store the quality factor of the highest density peak. Change the Slope and redo the process. Select the slope that can capture the highest number of events within the WS.

The window size is proportional with the synchronization error. In some instances the quantization error will generate stripes in distribution of the TSPs. We can use a plurality of parallel windows as indicated in FIG. 24.

2. Slope calculation through interval fragmentation method splits the interval of collected time stamps in smaller time sections such that in each section assumes accumulated phase error is negligible compared with the width of the section. See FIG. 18. We can determine the highest density vicinity of the values inside the square window and associate a MaxDensSgment parallel with the horizontal axis. Slopes will be calculated between the middle points defined by the middle of the MaxDensSgment of said intervals. An average of such slopes would provide the final results. The ratio between the number of events inside the highest density vicinity of the interval over the total events in the interval could define the confidence factor for that point. After the function determines all the reference points for the whole interval it will select the ones with the highest confidence coefficient, within a predefined range, and determine all possible slopes defines by pairs of two of such reference points.

Further the program will determine the densest slope vicinity of determined slopes. The selection of slopes is a weighted average with the product of the confidence factors of the two determining points for each of them. The final confidence factor is the ratio of number of selected slopes in the densest vicinity over the total number of slopes.

3. The interval minimum PD point method uses the same segmentation procedure. It determines first the minimum PD point in every interval. Then it builds line segments defined by pairs of two of such points and the associated slope. The program further selects the slopes within the densest vicinity window and provides the CFS as their average. The SACF associated with the solution could be the ratio of selected slopes in the densest vicinity over the slopes within a triple window size.

4. An example of Slope Method through segmentation: A step by step illustration is as follows:

Consider the minimum Window Size Step (WSS) the interval determined by 8 adjacent time stamps. Consider the intervals LW=RW=WSS. EW=2*WSS Accumulate minimum number of time stamps after the last NCOupdate as LW+EW+RW=4*LW=4*WSS. For every additional WSS number of time stamps added to the buffer, perform the partial computing indicated next. Determine the minimum point minRS(LW) for each LW interval of the (LW, EW, RW) triplet, in steps where RW remains fixed as the right pivot and LW moves to the left, sliding WSS times stamps for each step until it reaches the oldest time stamp in the buffer. Calculate the slope between minRS(LW) and minRS(RW) for each step. On the calculated slopes determine the vicinity with highest density of values using either the sum of distance (SoD) or the histogram method and extract the solution as the average. Also the SACF=(number of samples in selected vicinity)/(number of samples in enlarged (K times) vicinity). K=3 for example. SACF can take values from 1 to ⅓.

Normalization of SACF

In order to be compared, the CACF must be normalized An example would be to calculate CFP=ECP*(SACP–⅓) where ECP=is a scaling factor that could be 24. See FIG. 27

Figure 18:
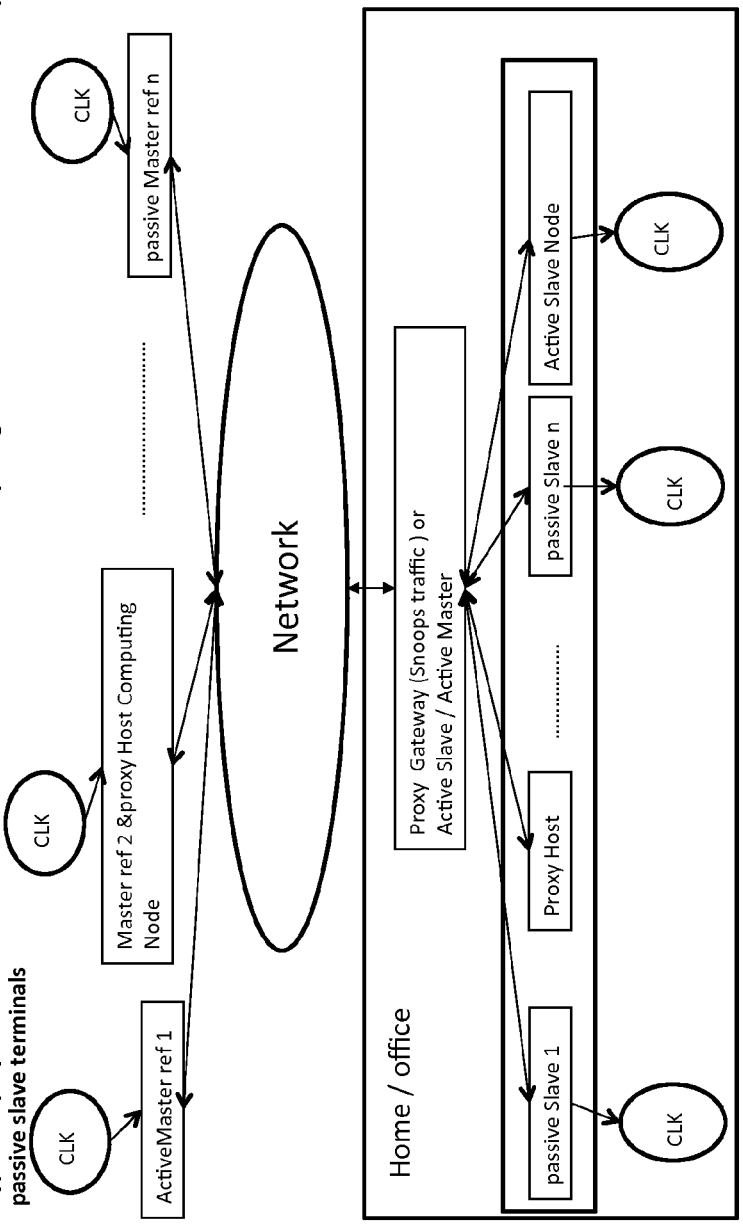

The slope can be calculated based on a sliding triple window frame (LW, EW, RW) (see FIG. 18).

The following parameters can be a working example:
Left window is LW samples=16 samples initially—it is a parameter that varies with the sampling rate.
Right window (RW) size=LW size=2*WSS=16
Expansion Window EW=4*WSS=32
Window Slide Step=WSS=8 time stamps initially
Program Update Cycle=SUI=128 time stamps (12 S for 10 SpS=samples per second)=
Phase 0=Reference Phase value locked al lock and subsequent change in delay floor events as the minimum dDA value in the right window=dDA(RWmin.)
RWmin=the sample number (relative to SUI interval) of the min dDA in the right window. Takes values [SUI−RW, SUI−1]
LWmin=sample number of the minimum dDA in the left window
N=last acquired (written) time stamp in the Accumulation Buffer (with SUI size) for F or a multiple of WSS acquired time stamps (8) for P process
SLW=coordinates of the left most time stamp of the LW
Slope Extraction Method 1
Consists of using blocks of 8 (also called WSS) and selecting the minimum TSP within each block. Accumulate at least 2*WSS+minimum_WSS_interval*WSS=6*WSS=48 TSPs. Construct a slope between the minimum dDA within the WSS separated by the minimum_WSS_interval. For any additional WSS TSPs that are received, we repeat the slope construction process between the minimum of the newly received WSS and all the other minimums previously determined that are spaced by at least the minimum_WSS_intervals to the left. Accordingly for the example: WSS=8, LW=RW=2*WSS; EW=4*WSS, SUI=16*WSS, the total number of slopes that can be extracted is 1+2+3+ . . . +10=11*5=55.

Slope Extraction Method 2

After an NCO update command the program waits until the minimum number of time stamps have been accumulated=16+32+16=64. (the number depends on the Master transit rate. Current example is for 64 to 128 ppS, SUI=512). Only one slope is extracted during this very first accumulated interval.

The Frame composed from the joined windows triplet (LW.EW.RW) forms a sliding/expanding frame (SF=LW+EW+RW). It will pivot on the right most (latest) RW and expand to the left within [0,wr_pts] in steps of WSS. The process will repeat until the frame size LW+EW+RW equals the size of the accumulated data. Program will wait another 8 cycles and repeat the process. For every frame size and position calculate the associated Slope based on the minimum dDA of the LW and RW windows, as indicated below. Retain the associated pairs: time Rn and amplitude (dSR) and insert them in the slope table, associated with the slope calculated from the formula:

$$tg = slope = (dDA(RWmin) - dDA(LWmin))/(R(RWmin) - R(LWmin)) = nS/nS$$

Where R(RWmin) is the time stamp Slave reception value of the minimum dDA recorded in the RW.

And R(LWmin) is the time stamp at Slave reception of the min dDA in the LW.

Slope Extraction Method 3

Use the TSP selected from F method as determining the most likely frequency correction factors and calculate the tg for all or a selection of TSP pairs.

$$tg = slope = (dDA(n) - dDA(m))/(R(n) - R(m)), \text{ where n,m are indexes within the group of selected TSP}$$

Pseudocode Implementation:

```
// swipe right to left for n advancement every WSS time stamps (=8)
For( SLW= N−2*LW − EWmin, SLW=SLW−WSS, SLW >=0)
    For (EW = EWmin; EW=EW+WSS; EW<n−2*LW+1)
        Slope (SLW, SLW+LW+EW); // The min points are already determined.
        SLopeCtr++
    End for
End for
```

Where Slope (SLW, SLW+LW+EW) is the slope between the min point of the interval [SLW, SLW+LW−1] and the min point of the interval [SLW+LW+EW, SLW+2*LW+EW−1]. Intervals consists of time stamped pairs (dDAn, dAn)

All indexes are the sample number within the SUI interval (like 0 . . . 511)

Slope Solution Through SoD Method

Several methods can be used to determine the solution:

Calculate the Sum of distances (SoDk) for the Slope k to all the other slopes SoDk=Sum[s] {(f(Slope(s)−Slope(k))} where f is (as an example) the square or the Absolute function and s indexes from 1 to the total_selected_slopes.

.(we use ABS or | . . . | notations interchangeably)

$$SoD(k) = Sum[s]\{|Slope(s)| - |Slope(k)|\} = (|Slope(1)| - |Slope(k)|) + \ldots + (|Slope(5)| - |Slope(k)|)$$

Ex2:

$$SoD(k) = Sum[s]((Slope(s)^2 - (Slope(k))^2)$$

Sort ascending the SoDk

Determine the minimum SoD end of the list. Mark it as SoD(1)

SoD1 is associated with Slope(1). Select all the Slope(k) that fall into a vicinity of K*AT0 of Slope(1), |Slope(k)−Slope(1)|<K*AT0 where K=1

Count selected Slopes into nr_Slopes_in_V_Slope(1)

Do the average of all the slope in the vicinity $$SLOPE = SUM(p)\{Slope(p)\}/nr\_Slopes\_in\_V\_Slope(1)$$

Where p will take values from 1 to nr_Slopes_in_V_Slope(1)

(the vicinity width may consider the white noise generated by time stamping error and other time quantization errors in the propagation path)

If either nr_Slopes_in_V_Slope(1) or total_selected_slopes could be null (no slope fall withing conditions). CF_P=0 will capture this situations so FCF_P will not be used in final calculations of FCF (note that the average can be weighted by the SoDk associated with each Slope(k))

$$SACF\_P = ECP*nr\_Slopes\_in\_V\_Slope(1)/nr\_Slopes\_in\_V3\_Slope(1);$$

where V3 is a vicinity 2 to 3 times larger than V. V3 can be asymmetrical to V.

Slope Solution Using Histogram Method.

Use the histogram method from the F section.

Proceed to the next step of the process to determine FCF_P.

Layer 1 Unidirectional Phase Synchronization Process

The Phase CFF locks the follower frequency to the reference frequency based on maintaining a minimal phase difference between the source phase counter and the destination phase counter.

The unidirectional process cannot determine the absolute phase difference equal with the actual propagation delay between the reference and the follower. The phase lock will be relative to an arbitrary constant for unidirectional version but will be sufficient to eliminate long term accumulation of phase error as required in CES or PWE applications.

The process traces a reference Phase (named phase_Zero) that is the difference between the Master and the Slave clock counters min within the last RW sub-interval of the last SUI interval at the moment the process was declared locked or when a phase_zero realignment due to a floor change of the total delay. As an example the Phase difference floor change could be declared, when for three consecutive algorithm cycles, the minim difference for each cycle=min(D(n)−A(n)) >Phase_zero+K. (K is a defined constant that could be for instance be 1 uS). Otherwise K could be dynamically calculated as: K=dispersion_of_min_dDA(SUI)_for_previous_cycles. The Method uses the Slope CFS or a conversion of the F CFS into Slope by formula CFS_Slope=1−CFS_F that is passed to the 8 corners table described infra that provides the final CFS_P solution for the next level.

Determine Step Delay and Reset Phase 0 (Phase Zero)

The phase errors are sourced from both slow accumulation of phase drift due to NCO offset and the sudden shift due to network congestion. The threshold for Phase_Zero update should be bigger than the worse possible accumulation of phase error due to the NCO inaccuracy. Assuming 8 Seconds between updates and 500 nS maximum drift=>threshold is 4 uS. After lock=SUI_seconds*2*NCO_precision. In a preferred embodiment the threshold should be adaptive function of the NCO_precision=CF dispersion of the past few cycles (ex: 3). NCO precision can be determined for instance as the max_NCO−min_NCO values over a determined period of time.

There are situations when traffic is rerouted or a simultaneous burst of data to the same output port, resulting in a permanent change of the average and minimum propagation delay or there a sudden increase of network load resulting in a step in propagation delay. Such difference in phase would determine the process to offset the local frequency relative to the Master frequency, in order to compensate for the network additional delay, to meet the minimum phase difference. This could or not be desirable. As a change in propagation pattern could involve loss of data it is probably more desirable to realign phase so that the frequency will not be biased due to tenuous reasons. To identify such step phase event we need to determine the min(dDA over SUI)=dDAmin(SUI) that is the min of all LWmin and RWmin previously calculated—also called SUI absolute minimum. It is the min of mindDA over all RW, LW, within the SUI interval. If this new minimum is shifted (in either direction) by more then Max_TIE=2500 nS (as example—this threshold can be adaptive based on the PDV envelope), for at least two consecutive SUI intervals, then PhaseZero=dDAmin(SUI)=absolute minimum over last SUI. A parameter should be read in a variable accessible by the external management system that would validate or invalidate this function. Default is validated.

Determination of Accumulated Phase Error

Consider the Ref_Phase=Phase_0=dDAmin(SUI) of the cycle in the proximity of declared lock. Define P_Err=dDAmin(SUI)−Phase_Zero. P_Err is an indication of the current accumulated Phase as the difference between the source and reception (master and slave) time counters since the last update of Phase_Zero.

Phase Solution

By determining the SLOPE we can find the actual ratio of the master/slave clocks and use it to correct the slave clock (by modifying the local frequency with the correction factor FCF_P)

Assume the graph of dDAn versus An in a situation with no PDV. Ideally dDAn should be constant in time.

If dDAn=Dn−An increases then the local frequency is lower then the source freq. FCF=dDn/dAn needs to be increased. An increasing accumulation of positive P_error (dDA>0) implies FCF_P<1.

Slope(r,l)=tg(r,l)=d(dDA)/dA=(dDAr−dDAl)/(Ar−Al)=
(Dr−Ar−Dl+Al)/(Ar−Al)=dD(r,l)/dA(r,l)−1=CF_
F(r,l)−1

Where Rr, Rl are the Received time stamps at the left (=beginning) and right (=end) of the slope segment. To correct the frequency offset we need to multiply the current frequency with a value that will cancel the slope. This value is the symmetrical of the Slope(r,l) that is 1/Slope(r,l)=(−1)*Slope(r,l) due to the small angle.

Slope=dDA/dA

Slope=1−CF_F [3]

FCF=1−Slope

P_Err(n)=dDAmin(SUI(n))−Phase( )

dminPUC=P_Err(n)−P_Err(n−1); //same variable uses in Phase_zero calculation

TABLE 1

Asymmetrical decision table (octal table) with 3 input variables and one output.

| Current_case | dminPUC | SLOPE | P_Err | FCF_P |
|---|---|---|---|---|
| 1 | >=0 | >=0 | >=0 | 1-slope − Over_comp |
| 2 | <0 | <0 | >=0 | 1 |
| 3 | >=0 | >=0 | <0 | 1 |
| 4 | <0 | <0 | <0 | 1-Slope + Over_comp |

For all other conditions not covered in the table, the solution is FCF_P=1 (unchanged). The table content and number of input variables is could be differ.

TABLE 2

Asymmetrical decision table (octal table) with 2 input variables and one output.

| Current_case | SLOPE | P_Err | FCF_P |
|---|---|---|---|
| 1 | >=0 | >=0 | 1-slope − Over_comp |
| 2 | <0 | >=0 | 1 |
| 3 | >=0 | <0 | 1 |
| 4 | <0 | <0 | 1-Slope + Over_comp |

EXAMPLE

Assume the initial Over_comp=10 ppB=0.000000010, which value is dynamically adjusted proportionally with the P_Err from the previous SUI cycle:

Over_comp=1+(P_Err>>K); where K=6 as an example but can be also adjusted during runtime. Over_comp saturates at a selectable value (ex: 20 ppB)

Note: Slope is dimensionless and should be less then 0.000000100 under normal conditions.)

[4] If P_Err>re-lock threshold (as example: 1 uS) then a more complex decision can be achieved by sending a warning message to the management system indicating major change in source clock or line noise. Management system should decide if necessary to switch to Transient status. Otherwise the Process will decide to reset the Phase_Zero.

Phase Correction Saturation

Phase correction can have important fluctuations due to change in floor that will determine unwanted frequency changes. To minimize the temporary impact of such fluctuations we will saturate the CF by limiting the overcompensation to +/−20 ppB for any cycle (This is a parameter that could fluctuate function of the local oscillator stability and the frequency of the TS events).

if (PhasCorrFactor<0.99999998)//mark it as a variable=min_FCF_P=0.999999980 PhasCorrFactor=0.999999998;

if (PhasCorrFactor>1.000000020)// max_FCF_P=1.000000020PhasCorrFactor=1.000000020.

Mirrored Unidirectional L1 Processes

Figure 25:
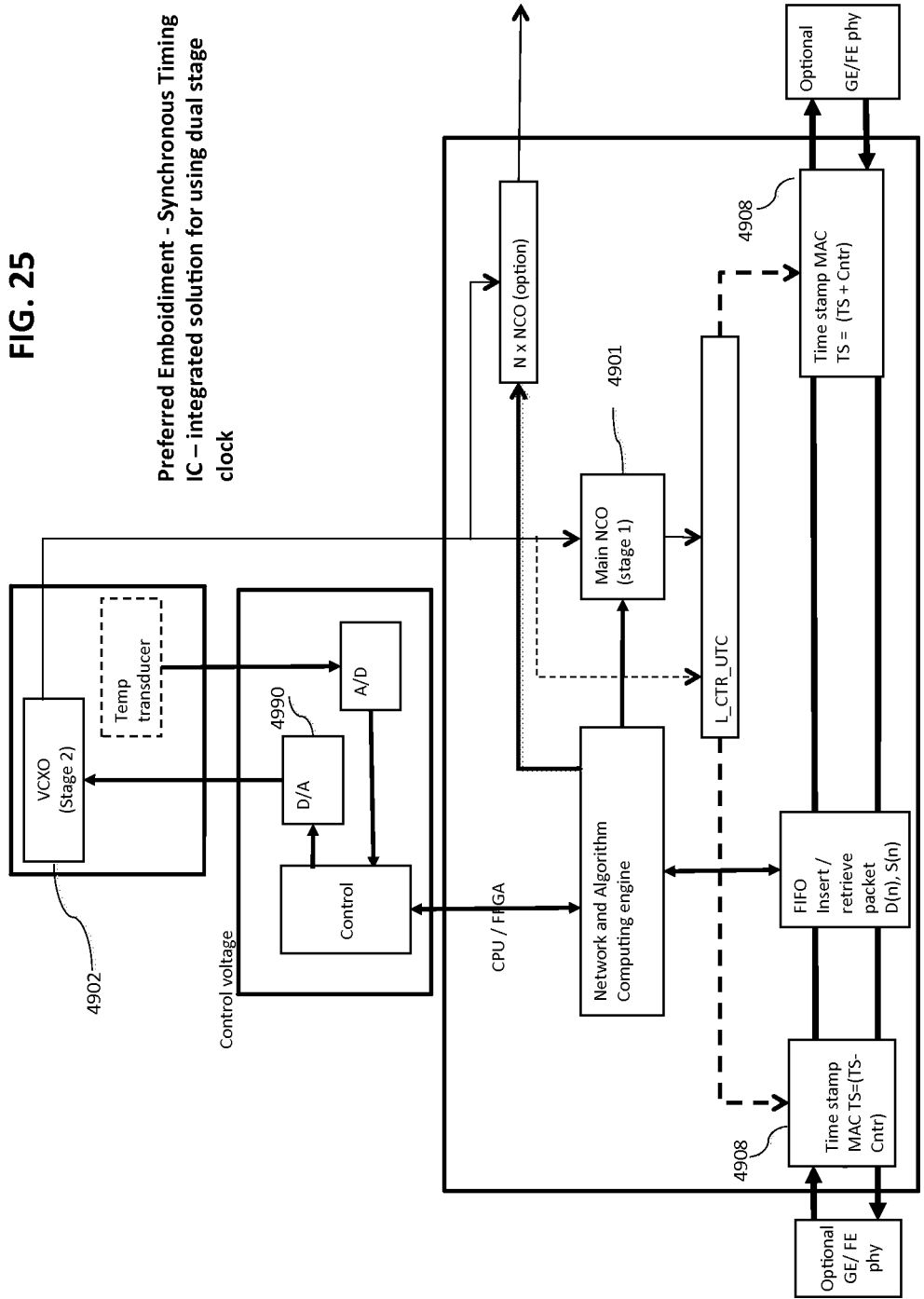
FIG. 25 is a flow chart depicting an exemplary embodiment of a Duet F Algorithm in accordance with the present invention.

The same unidirectional processes are run on data collected from both inbound and outbound direction. The Mirrored Process is different from the round trip delay calculation. Each direction is independently processed. The results are compared and the best solution is selected (the one with the highest SACF) or a weighted average based on SACF is performed if solutions are have close values SACF. See FIG. 25,26

The mirrored clock is calculated from data collected from the opposite propagation direction. The direct and mirrored solutions should be symmetrical for a lightly loaded network:

CFS_inbound=1/CFS_outbound and both need to be performed the same cycle of the algorithm to use the same local reference frequency. The accuracy of this equation increases SACF value for the layer 2 combined solution.

Especially for the access section of the network, that is tree shaped, the inbound and outbound directions are rarely symmetrical. The Muxing (inbound) direction has higher PDV resulting from the collision associated with the aggregation of traffic while the demuxing (outbound) section is less impacted by PDV. The system would automatically detect the best direction but some low cost implementations can assume a preferred direction. Generally the reference clock is towards the core of the network that favors the downstream outbound direction towards the network edges.

Layer 1 Round Trip Delay (RTD) Process

The Round Trip Process uses the minimum delay TSPs in both direction for RTD measurement that uses t1, t2, t3, t4 TS events. They don't have to be consecutive and the distance in time between such events needs to be short enough to prevent error accumulation due to the frequency offset but can be separated by many intermediate TSPs events.

Figure 29:
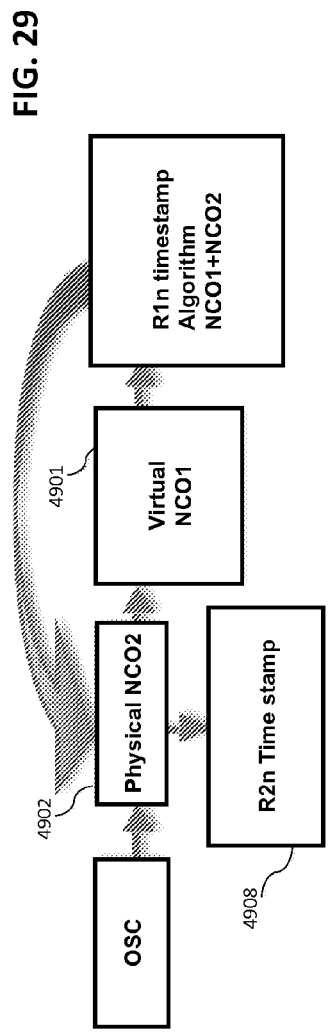
FIG. 29 is a graph depicting and exemplary embodiment of computing Round trip Propagation Delay, in accordance with the present invention.
Figure 30:
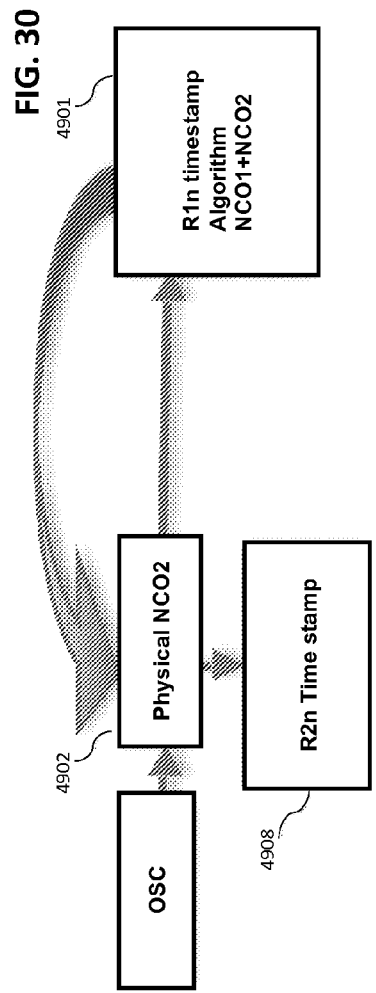
FIG. 30 is a graph depicting and exemplary embodiment of a predicted round trip message in accordance with the present invention.
Figure 31:
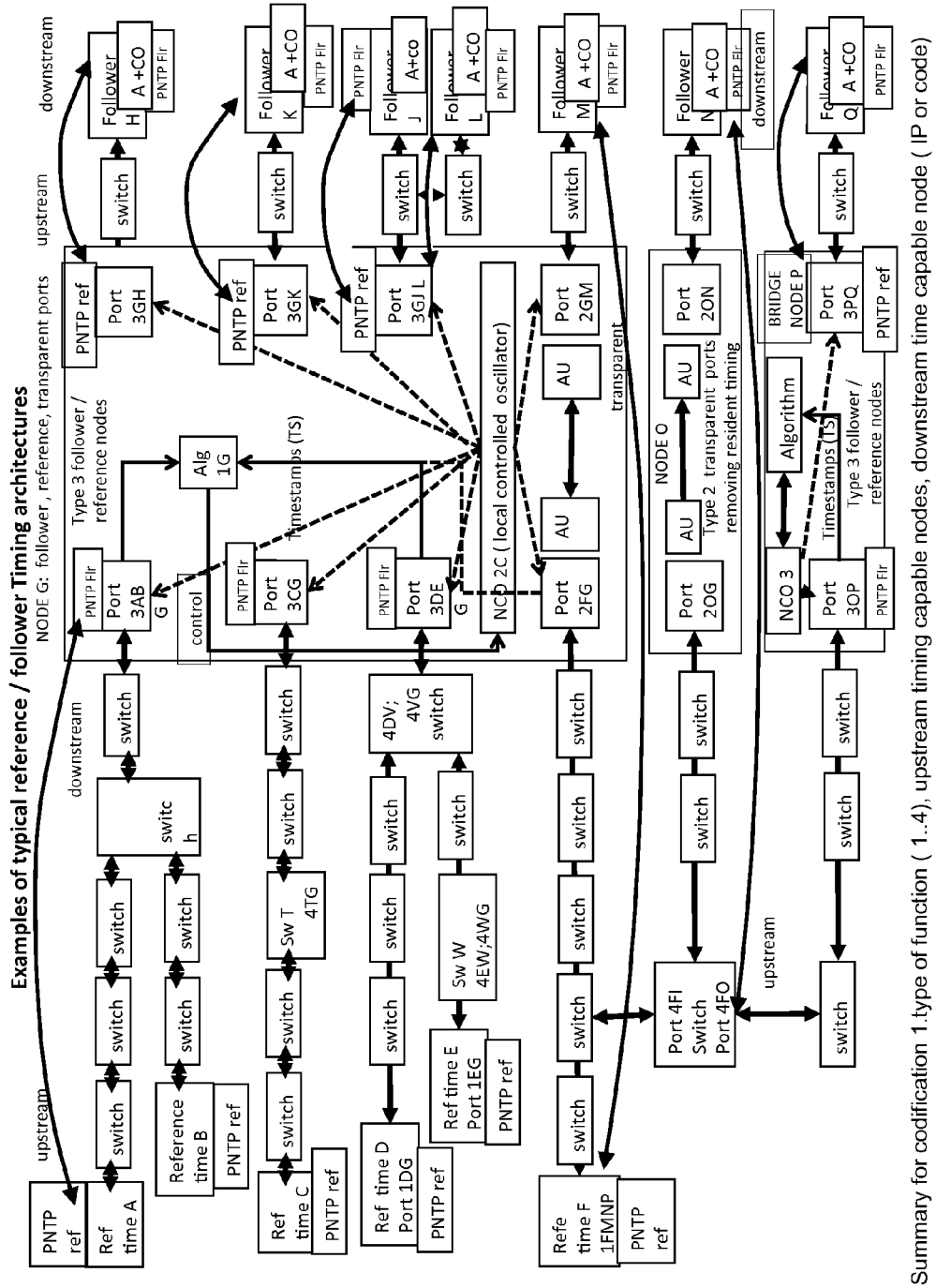
FIG. 31 is a graph depicting a representation of packet flow through multiple switch networks, in accordance with the present invention.
Figure 32:
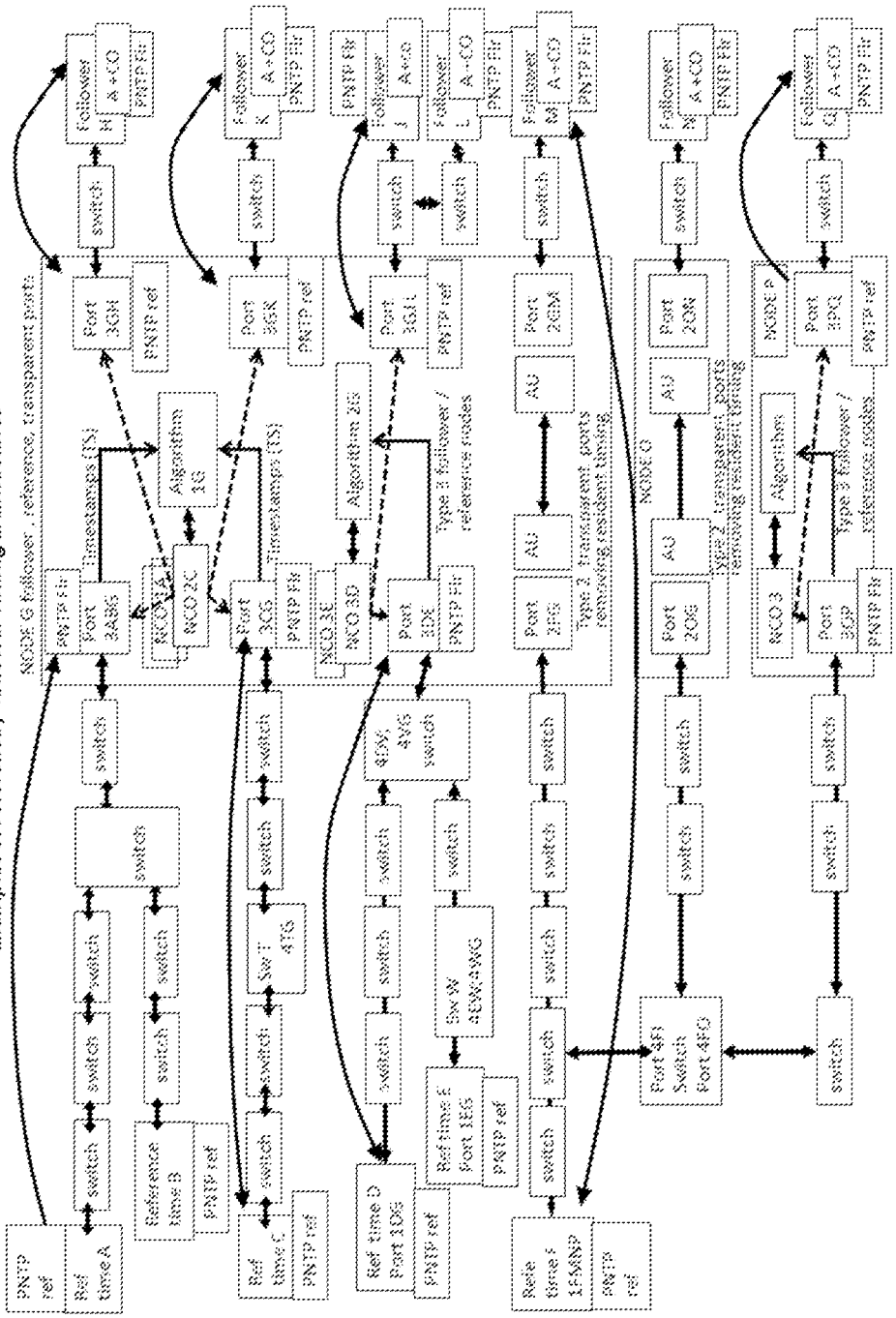
FIG. 32 is a graph depicting a packet flow through a network with intermediate switches that are not time synchronized for time stamping, in accordance with the present invention.

For example in FIGS. 29 and 30 M2F2 packet event can be t3, t4 when associated with F1M1 or they can be t1, t2 when associated with F4M4. The Follower initiated packet event has the reference time moments: F1, F2 as departure and arrival. The Reference receives the packets at its local reference time M1 and transmits it back at M2. Our marking convention is using letter F for follower and M for Master node (that is equivalent with the Reference node) while the ending digit indicates a packet identification. (ex: F1 and M1 must refer to the same packet #1. M2 and F2 also one packet #2. But M1, M2 are not necessarily sequential in time. There may be many several packets sent in between M1 and M2. Selection criteria is that F2−F1 and M2−M1 are local minimums of dDn−dAn=minim propagation delay+ Frequency_error*Max(dF, dM) where Max(dF, dM) is the maximum time span of the RTD measurement. The shorter RTD is, the more accurate the result is. See FIG. 29, 30. The tilted horizontal axes in FIG. 29,30 indicate the accumulation of phase error due to the offset between the clocks.

The Algorithm has the option to let the Follower anticipate the time the Master sends the TS message and sent its TS message at that predicted time with the idea that packet will almost cross each other when traveling on the network that would increase the chances for the PD symmetry. This mode of operation can be useful for network with low bandwidth, low frequency of timing protocol messages, high perturbations or long propagation delays.

Frequency Correction method using Roundtrip Process:
Considering dF n,n−1=F(n)−F(n−1) and dM n,n−1=M(n)−M(n−1), we can conclude that Round trip propagation delay PD(RTPD)=RTPD(Follower)=$dF21-dM21$/CF; (1)

where FCF is the ratio between reference and follower frequencies.

$dF21-dM21/CF=dM2F2+dF1M1$ $(dF21-dM2F2-dF1M1)/dM21=CF$; (3)

same procedure can be applied to:

RTPD(Master)=$dM43$/CF$-dF43$; (2)

$dF21-dM21/CF=dM43/CF-dF43$ from (1) and (2):

CF=$(dM43+dM21)/(dF43+dF21)=(M4-M3+M2-M1)/(F4-F3+F2-F1)$ if M2=M3 and F2=F3
CF=$(M4-M1)/(F4-F1)$ that is the unidirectional equation dA/dD in the mirrored direction.
This result demonstrates that frequency offset determination does not require the bidirectional flow
Unidirectional flow gives the advantage that we can chose the direction with the lowest PDV The Density Histogram Process Previous paragraph indicated generation of a CF solution associated with the events F1M1 and M2F2 that are in fact a bidirectional Duon. We used the equation (dF21−dM2F2−dF1M1)/dM21=CF(21) for the two TSPs associated with the events M1F1 and F2M1.

We further need to extract one CF solution distribution analysis by filling the CF histogram bins with the computed CFs then selecting the interval of the histogram with the highest number of solution Then we average the values within the interval to generate the final CF which is in fact the same histogram method we indicated in the previous solutions. Similarly the SACF will be derived from the shape of the CF histogram. If the histogram has a pronounced peak (high quality factor) the average of that vicinity would likely be the right correction. The higher the peak the higher the SACF that would increase the impact of current FCF relative to other FCF determined by other parallel methods. The CF can be determined as the ratio between the number of CFn falling within the densest vicinity and the number of CFn falling within extended vicinity (as example 3 times bigger or eventually total number of extracted CF). The size of the vicinity could be fixed or dependent on several parameters as example a function proportional with the precision of synchronization. The size of the window can be adapted based on several factors like the estimated computation error, the nature of PDV, the required precision, etc. In addition the SACF can be weighted with the delay in time between the TSP events used in the equation—the closer the events the higher the SACF.

Example of Histogram Function

The Histogram Function is used to determine the most probably CF from a set of CF solutions. It can be generally used by each of the layer 1 functions (CF_F, CF_Slope or CF_UTC).

We define a number of bins (as example raging from −255 to 255 or for smaller systems from −31 to 31). The range depends on factors like the QE, the local free oscillator drift range and the accuracy (precision) of solution. The histogram_index variable will be the index into the histogram table. The center of the histogram (Center_NCOupd) is a parameter that is updated when the current normalized NCOupd moved from the central position by more than a certain distance. (example 10% of the range) This is equivalent with panning the histogram such that the current NCOupd is in the central section. The Sum histogram and the array of archived histograms (AAH) used for smoothed solution need to be panned in identical manner. Similarly the current histogram the Sum and eventually the AAH need to use the same bin size.

As example consider the maximum initial CF=50 ppM (if the on board oscillator precision is 25 ppM). We could use a bin value of 128 ppB for a total of 512 bins. A CF range of 100 ppB indicates bin size of ¼ nS in our example.

The histogram_index=((CF+last_NCOupd−Center_NCOupd)/bin_size) is the index that identifies the bin position into the histogram table and we make the convention to indicate the actual correction value of the free running frequency=NCOupd. For panning, assume as an example that the Central_NCOupd is 1500 ppB and the bins size is 1 ppB. If the free running local oscillator drifts to a lower frequency by 120 ppB the new NCOupd will be 1620 ppB. This is more than the 50 ppB threshold we arbitrarily chose out of the 255 available bins in our example and we would decide to pan to the right by 120 ppB. The central_NCOupd bin with index 0 will then indicate the 1620 ppB. After finding the NCOupd from the current histogram solution as correction of the free running frequency, we can generate the relative CF solution=NCOupd−old_NCOupd as the correction of the local frequency used during the last cycle.

The NCOupd_histogram (histogram_index) bin accumulates all the instances of NCOupd that fall in the index range of the bin either by adding a one or adding the SACF associated with the CF (for instance a Valid Treon will have an associated SACF); Program could keep track of empty bins at the outer edges of the histogram to avoid scanning zero content bins outside of the range of possible NCOupd.

SACF for Histogram Solution.

Extract the SACF as the ratio between the number of instances inside the vicinity and the number in a symmetrically enlarged vicinity by a factor K, where k=3. SACF needs to be normalized to a range, (as an example: 0 to 15) to allow comparison of CFSs.

Dynamic Bin Size Histogram Function.

The Dynamic Bin Size Histogram Function adjusts the size of the histogram bins. As the algorithm achieves synchronization the range of CF narrows. If we have a fixed number of bins in the histogram we can dynamically change the bin size for optimal accuracy and range coverage. (Size change is preferably in power of 2 steps to reduce computing complexity as we do shifts on binary representations). The value inside the adjusted bins is scaled such as the sum of the bins content is the same for any range of bin values. As example if we have 2 ppB wide bins and the bin indexed by 1500 has the content 8, bin 1502 is 50 and bin 1504 is 100, if we perform a zoom from 2 ppB to 1 ppB width bins we obtain 6 bins with the following content: bin 1500=4, bin 1501=4, bin 1502=25, bin 1503=25, bin 1504=50, bin 1505=50. When zooming out, the content of two adjacent bins will add for the new double size bin content.

The Histogram Smoothing Function

The Histogram Smoothing Function performs smoothing for every bin in a smoothed histogram using past bin values. This could be a solution for some systems using non linear functions to determine the CF from the histogram. Performing smoothing of the intermediate solutions used in the final solution could provide better results than smoothing the final solution obtained from raw histogram solution, though would have the disadvantage of longer computing.

The bin size must be normalized (for instance at ¼ ppB). The solution returned by the frequency and phase (F and P) algorithms, CF_F is the correction relative to the latest local frequency that is NCOupd*FROF. We need to scale CF_F(n) by adding NCOupd before adding it to a NCOupd histogram that can be smoothed. CF_NCO(n)=CF_F(n)+NCOupd. Each bin of the smoothed histogram is averaging the past bin values. Each bin of the previous histograms was added to a SUM_CF(n) histogram bin:

SUM_CF(k)=SUM_CF(k)−SUM_CF(k)/(2^p)+CF(k)// where k is the current cycle and 2^p=N is the depth of the average that can optionally be adaptive.

The smoothed CF solution will be the solution of the SUM_CF(k) histogram. Alternatively bins are stored in a circular histogram array that is then averaged for every bin is calculated for a similar smooth_CF(k) histogram, from which we extract the solution.

$$SUM\_CF(k) = \sum_{s=1}^{N\_FCF\_F2} SACF\_F(s,k) * CF\_F(s,k) \bigg/ \sum_{s=1}^{N\_FCF\_F2} SACF\_F(s,k)$$

Any other equivalent function or filtering polynomial known in the art could be used for smoothing the bins before finding the solution.

Histogram Sliding Window Method

The final solution is extracted from the NCOupd histogram by determining the highest density vicinity of the histogram that is a window of adjacent bins with the highest content. To identify the highest density vicinity several method known to the art can be used. As an example we slide a window of N bins through the histogram and select the position where the sum of the bin content inside the window is maximal. We chose N to be equivalent with a frequency range=k*ST0. A possible value can be N=40 for an average loaded network. We calculated the CFS solution as the average of the bin indexes CF(n) inside the window, weighted by the bin value hist(CF(n)).

As a practical example for the histogram process consider the leftmost bin index with non null content (hist(CF) #0) as LeftEdge and the right most bin index with non null content as Right Edge.

Consider window_size=number of bins in the sliding window
Energy_sum=sum of the contents of all the bins in the sliding window
hist(CF(n))=the content of the bin with index CF

---

Energy_sum = Sum( hist(CF(n))) ;// where CF(n) takes all the values of the bins inside the current position of the window that is left most ;
Max_energy_sum= Energy_sum;
Left_wall = Left_edge ;// the left margin of the highest density window
For (k= LeftEdge, k < (RightEdge − window_size), ++K);
{Energy_sum=Energy_sum − hist(CF(k)) + hist(CF(k+window_size));
If Max_energy_sum < Energy_sum then
    {Max_energy_sum = Energy_sum;
    Left_wall = k;};
    }
Endif;};
}
// Calculation of the solution
Sum=0;
For k=Left_Wall, k< Left_Wall+ window_size k++
{Sum= Sum + CF(k) * hist(CF(k)); }
End for;
CF = Sum / Max_energy_sum.

---

The SACF will be derived from the shape of the FCF histogram. If the histogram has a pronounced peak (high quality factor) the average of that vicinity would likely provide a good solution. The higher the peak the higher the SACF that would increase the impact of current FCF relative to other FCF determined by other parallel methods. The SACF can be determined as 24*(Max_Energy_sum/Max_Enery_sum(3×w)−⅓) where Max_Enery_sum(3×w) is calculated from a vicinity 3 times bigger and symmetrically expanding left and right of the sliding window.

Panning Histogram Function

The index of the central bin of the histogram does not necessarily match the solution of every cycles. As a result we need to re-center the histogram when the center and the solution are significantly apart, by panning the indexes of all bins such that central bin matches the solution.

UTC Roundtrip Delay Algorithm (RTD)

The UTC synchronization Methodology is based evaluates the error between the Follower UTC counter and the Reference UTC counter and maintains an F_Offset_UTC variable that indicates the absolute offset of the time counters. To achieve this goal the method actively looks for symmetrical PD between the two directions of the link. Follower UTC is synchronized by selecting local minimums of the PD events (N) and pairing such minimums from one direction with minimums from the other direction (M), in a rage from 1 to N×M according to each embodiment capacity to search for the optimal solution, finding the best estimated absolute minimum and determining the absolute propagation delay in relation to the contemporaneous UTC at both ends with the formulas described in this section. This provides the solution estimating the error of the UTC of the Follower. We consider the error introduced by the clock offset during any measurement, order of magnitudes smaller than the PDV asymmetry. For instance the frequency unidirectional method can synchronize clocks within 25 ppB that will introduce an error of 25/1=12.5 nS for events spaced within one second.

Method: The follower UTC timing, F_UTC is a counter F_CTR_UTC clocked by the follower frequency synchronized with the reference frequency and offset by a value F_Offset_UTC determined by the CFF associated with UTC synchronization. The CFS_UTC=(F_Offset_UTC, SACF_UTC). Under ideal conditions when the clocks are perfectly synchronized and the ingress propagation delay iPD=iD(n)−iA(n) is identical with the egress propagation delay ePD=eD(m)−eA(m) (1), then eD(m)+iA(n)=iD(n)+eA(m), (2), where n identifies the event generated at the Reference node and time stamped with iD(n) value and received at the follower node and time stamped with iA(n) value.

Analog notation is used for egress. If the local F_CTR_UTC has an offset from the reference UTC, then the iD(n) and the eA(m) time stamps will each be shifted by that offset F_Offset_UTC from the ideally synchronized time stamp. Ideal_iA(n)=iA(n)+F_Offset_UTC and F_UTC−F_Offset_UTC=F_CTR_UTC, (3). Results from (2) that F_Offset_UTC=(eD(m)+iA(n)−iD(n)−eA(m))/2. Once we determine the F_Offset_UTC we can property synchronize the F_UTC=F_CTR_UTC+F_Offset_UTC. For that we will need to find symmetrical PD situations. Most likely this will be during the minimum propagation delay in each direction, unless there is a different return route or load in the intermediate switches. Consequently we search for the local PD minimums of ingress_min(n)=ABS(iD(n)−iA(n)) for ingress direction and, minimums of egress_min(m)=ABS(eD(m)−eA(m)) for egress directions. Where iD(n)=ingress departure TS of event n, iA(n)=ingress arrival TS of event n, eD(m)=egress departure TS of event m, eA(m)=egress arrival time of event m. The minimums are collected within an interval proportional with the precision sought, for instance=2*AT0. Then we calculate the absolute minimum propagation delay from combinations of n,m local minimums points, minPD=min((ingress_min(n)+egress_min(m))/2). We do not place restrictions on ordering which of the directions is first in time, either ingress or egress. The follower UTC calculated through the roundtrip method is F_RTD_UTC=iD(n)+PD=eA(m)−PD. The local F_CTR_UTC keeps the follower timing by counting the local frequency oscillator starting from an arbitrary value. Its initial offset is F_Offset_UTC=F_RTD_UTC−F_CTR_UTC. After power up, once the frequency is synchronized, the system need to update the F_CTR_UTC=F_RTD_UTC. If this cannot be done in HW then Phase_Zero can absorb the difference and further correct the time stamps: Phase_Zero=F_Offset_UTC and F_UTC=F_CTR_UTC+Phase_Zero can replace F_CRT_UTC for time stamping and UTC function purpose. Phase_Zero is usually frozen at the point system is synchronized. Further differences Err_UTC=Phase_Zero−F_Offset_UTC would provide CF for the local clock. An embodiment would consider CF=Err_UTC>>k and CF<Sk, where Err_UTC is in nS, CF is in ppB, k could be 7 and Sk could be 10 ppB. Another embodiment could use the Err_UTC in the Phase algorithm replacing P_Err. Yet other embodiment could use an averaging of Err_UTC or a low pass filter to replace the Err_UTC in the two previous examples.

Numerical Processing Elements for Layer 1 Functions

Numerical Computing Optimization for Increased Speed and Performance.

Multiplication and division on variables that take values in a narrow vicinity of 1 can be replaced with additions and subtraction on associated distance between the variable and the neutral element, number 1. For the purpose of the algorithm the variables were considered to be in a vicinity size of (1−50 ppM, 1+50 ppM).

The division of factors that are in a close proximity to each other (within ppM) generate quotient result in a narrow vicinity of 1 which vicinity size could usually be represented on less than 16 bits (for +/−32 ppM).

Making parameters and variables used in operations of selection that are not directly part of the final computation, take values as powers of 2 allows division and multiplication can be replaced by shifting.

We replaced the averaging by a fading sum process as described later that replaces storage and addition of N depth variables with only one variable and 3 addition and shifting operations.

Example of division generating quotiend in vicinity of 1 within 1000 ppB. We can replace the 4 bytes=10 decimal digits (seconds·nanoseconds) division dD/dA with 1+(dD−dA)/dA, which is a less than 3 decimal digit (or 10 bits) by less then 10 decimal digits (32 bits as nS) division. The dD−dA is represented in nS and can be represented within k=10 bits number, as a nS integer and dA is also represented as a 32 bits nS integer. We can multiply both factors by 2^(32+k+m) and divide the divisor by 2^30 for a (dD−dA)/dA result that is represented in ppB:

((dD−dA)<<(k+m))/(dA>>(30−k−m)) which is an integer fixed point division of k+m bits that will take a fraction of the time a regular 32 floating point division is performed. The errors are less than 2^(−m+1) ppB that result from truncating dA to k+m digits for the nS part.

For a fixed point representation result with LDB representing ¼ nS, the equation becomes:

$$((dD-dA)<<(k+m+2))/(dA>>(30k-m))$$

Layer 1 Merged Process

The Layer 1 Merged Process combines F and Slope solutions into a merged Slope that is further entered together with P_Err and dminPUC into the octal table at the last stage of the P process, by performing in essence a layer 2 function at layer 1 before applying the asymmetrical Octal Table lookup. Other similar tables using more or less variables could be used.

$$Merged\_Slope=(SACF\_F*(1-FCF\_F)+SACF\_P*Slope)/(SACF\_F+SACF\_P)$$

A simplified implementation example could consider this solution as the final solution FCF=FCF_M.

Layer 2

Upper layers combine the plurality of Layer 1 solutions according to several dimensions: direction, link, network, time.

Combines the two unidirectional instances, direct and mirrored of each type of process into one bidirectional solution.

If the network load and the associated PDV is significantly different for the two directions, the CFS associated with the lowest PDV direction will be passed to the next layer. The prevailing direction can be identified by its significantly bigger SACF. Otherwise the weighted average is performed between the CF solution of each direction. The SACF passed to the Layer 3 could be calculated for example with the formula:

$$SACF = (ST0 - 1000000000 * Abs(1 - FCFm * FCFs)) * K;$$
where $K = 15/AT0$ is a normalizing parameter

Layer 3

Combines all the solutions generated from the data associated with one Reference node into one CFS. It is a weighted average of the F, P Processes that generates the CFS solution using the formula or an equivalent thereof:

$$CF\_F = \sum_{s=1}^{N\_FCF\_F} SACF\_Fs * CF\_Fs \Big/ \sum_{s=1}^{N\_FCF\_F} SACF\_Fs$$

Layer 4

Fusing Multiple Reference Clock Sources

A node may have links to multiple time reference sources through the same or different ports. Precision timing can become very different and could be available independently from multiple sources. Multiple layer 4 instances of the algorithm can each use a specific plurality of reference timing sources and will return independent CFS for both frequency and UTC.

Dual Controlled Oscillators Hierarchy

Implements two cascaded oscillators. The control is either physical or virtual. This method improves the stability of the follower frequency and reduces the impact of erroneous solutions due to excessive PDV.

Hierarchical Dual Stage Clock Generation Architecture (Review)

This method delivers the low pass filtered, high stability physical frequency for the system (generated by NCO2) while maintaining the time stamping by a counter controlled by a frequency adjusted according to the last frequency correction provided by the algorithm (CF). A second NCO1 (virtual or real) is place downstream of NCO2 and is controlled through the equation CF1=CF−OCF2=CF−E(CF), where E(CF)=CF2 is the average of CF that is the frequency solution provided by the algorithm. In a preferred embodiment the first, NCO1 can be a Numerically Controlled Oscillator (FIG. 51) or a virtual oscillator (FIG. 52) while the second can be of VC_TCXO, VCXO type. See FIG. 48, 49, 50.

An implementation example can use two types of filters for E(NCO): variable and fixed. An example of variable filter is: E(CF2)=E(CF2)+CF−E(CF2)/CN where CN is system specific and can be for instance 128, and CF is the latest frequency correction determined by the algorithm. An example of fixed filter can be a simple average of $2^7=128$ terms. The NCO1 clocks the counter used for time stamp. If the NCO1 is virtual then the time stamp counter is clocked by NCO2 and numerical corrections are applied to the TS to adjust the count relative to the last NCO update, by the actual CF1 difference in frequency.

Implementation of the Virtual Controlled Oscillator.

The variable depth averaging can smooth the CFS in the presence of PDV. An alternative way is to create a multiple stage frequency correction (dual in our example) where the algorithm will be able to see time stamps performed according to its latest solution correction while the system receives a stable frequency resulting from the average of the corrections. This may be useful especially for nonlinear algorithms.

EXAMPLE

Avg(CF) = CF2 ( average over the last $2^{\wedge}$avg_depth = $2^{\wedge}4$) = SUM(CF)/ ($2^{\wedge}4$) = (Sum(CF) − Sum(CF)>>4 + CF)$2^{\wedge}4$.
The initial SUM(CF) = $2^{\wedge}$avg_depth * initial value. Initial value = 1 for now. CF = CF1 + CF2
  CF1 = CF−CF2 ( CF1 virtual oscillator is slower by CF2 relative to algorithm's correction = CF)
Time stamped use NCO2 clock. The algorithm expects a time stamp correction of CF−CF2 to match its intent.
CF2= CF−CF1 for the purpose of time stamp.
Consider the real R2n and the virtual R1n time stamps at NCO2 and NCO1. The average of R1n should match average of R2n.
There will be a slight error as we cannot determine a relation between the moment of NCO2 update and that of the arrival time stamps.
At power up R1.0= R2,0
1) The initial SUM(NCO) = $2^{\wedge}$avg_depth * initial value. Initial value = 1
    R1,0= R2,0
2) NCO2 ( average over the last $2^{\wedge}$avg_depth = $2^{\wedge}4$) = SUM(NCO)/ ($2^{\wedge}4$) = (Sum(NCO) − Sum(NCO)>>4 + NCO)/$2^{\wedge}4$.
3) R1,n= prev_R1,256 + [ dA2,n − prev_R2,256 ] *( NCO − average_of_NCO_corrections)/1000,000,000.
//WE mark as prev_R1,256 the last time stamp for the previous cycle of the algorithm
NCOs are in vicinity of 1 and they are within E-7. This determines the approximation made later

```
NCO2 = average_of_NCO
NCO = NCO2+NCO1 = what actually the algorithm computes.
    dt * NCO = dA // process of sampling with a counter smapshot.
dA2,n / NCO2= dA1,n / NCO1 // same dt time interval for both modules
dA1,n = dA2,n * (NCO-NCO2) /NCO2 =
dA1,n = dA2,n • (NCO-NCO2) // approximation - a second order of magnitude error = E-14
Hence:
    R1,n = prev_R1,256+ dA1,n =
= prev_R1,256+ [dA(2,n)] *( NCO – average_of_NCO_corrections)/1000,000,000. //
assuming time stamps are expressed in nS.
dA(2,n) = dA2,n – prev_R2,256
R1,n= prev_R1,256 + [ dA2,n – prev_R2,256 ] *( NCO –
average_of_NCO_corrections)/1000,000,000.
```

The closed loop will inherently correct the error resulting from the NCOregister updating being done randomly, somewhere (probably by the end) between prev_R2,256=the last time stamp of the old cycle and R2,0=the first time stamp of the new SUI cycle. The queue must be flushed after NCOupd.

High Stability Oscillator Methodology

Synchronization algorithms can determine the relative drift between the reference and the follower oscillators. Consequently, synchronization performance is highly dependent on the stability of the local oscillator, as these algorithm provide its solutions at discrete time intervals during which it is assumed the local clock is perfectly stable. Current open controlled crystal oscillators (OCXOs) provide stability but at high cost and significantly higher power consumption. Oscillator frequency is dependent on environmental conditions (EC): temperature, power rail voltage, pressure etc. There are techniques used to stabilize a free running oscillator but they were missing a few elements essential to reach the high stability required in precision timing measurement and the accuracy of self learning. For instance, the algorithm determines the frequency correction during and after the local clock frequency fluctuations, thus the correction itself will have inherent errors because the reference was not stable while the correction is relative. In an embodiment of the present invention a shift between the moment the temperature is determined and the temperature of determination of the frequency is associated with.

Other embodiments of the present invention can include a methodology that builds a table with records indicating the local clock corrections (CF), over time, resulting from the process of synchronization and the discrete values of the environmental parameters (ECOCA). The table is updated only with solutions presenting self assessment confidence factors higher than a chosen threshold that is proportional with the precision of synchronization. If an environmental condition falls in between reliable table records interpolation is applied. An embodiment of interpolation would determine the CF associated with the EEC determined for the past SUI cycle from the equation: $CF(EC(t(n)))=CF(EEC(k-1))+(CF(EEC(k))-CF(EEC(k-1)))*(EC(t(n))-EEC(k-1))/(EEC(k)-EEC(k-1))$, where $EEC(k-1)$ and $EEC(k)$ are the closest ECOCA indexes to EEC and $EEC(k-1)<EC(t(n))<EEC(k)$.

Example of factors considered for self confidence determination, in accordance with the present invention: the dispersion of algorithm correction factors within the past correction cycles (the depth of the history can be adaptively modified function of the historical values of SACF), the relation between correction dispersion returned by the different correction functions, the fluctuation of the EC during the SUI cycle.

Other embodiments of the present invention can work with a pre configured ECOCA for lower precision results. Other embodiments will permanently execute a dynamic update of the ECOCA In other aspects of the present invention, the environment conditions (EC) are measured, especially the temperature, while performing synchronization over SUI, to find the equivalent EC (EEC), which is a constant EC under which the oscillator will generate the same number of oscillations as counted during the measured SUI cycle under fluctuating EC, and perform IIR filtering for CF(EEC) having the same EEC index, in an array (ECOCA), we can construct a frequency correction array based on EC variations. EC could be temperature and any other physical condition that has an impact on oscillator frequency, like voltage and pressure. The granularity of the indexes depends on the precision of the measurement, the available memory space and the covered range of fluctuation. Usually one to two bytes would be sufficient for ppP accuracy of ECOCA. As an example, roughly less than 10 KB should cover a commercial temperature range. Other embodiments would use interpolation to convert measured EC and the extracted EEC into the available ECOCA indexes.

In an exemplary embodiment of the present invention the integration of a newly determined value CF(EEC) into ECOCA could be conditioned by having SACF or the new CF(EEC) above a certain threshold. Then the CF is weighted by its associated SACF and averaged with the ECOCA(EEC) content corresponding to the same value of EEC index, with a time constant K (usually $K=2^n$). For a simplified average example consider $sum\_CF(EC)=sum\_CF(EC)-sum\_CF(EC)/K+CFn(ECn)$. The actual normalized CF will be sum_CF(EC)/K. Storing the sum_CF instead of the average CF increased numerical accuracy due to increased number of digits but also increases the size of the table up to 100%.

During runtime EC are measured in short time cycles, sufficient to detect frequency changes in the range of sought precision. The EC are the read indexes for finding CF into the ECOCA. CF is the ratio between the correct frequency and the oscillator free running frequency for the specific EC.

This mechanism stabilizes the oscillator by compensating the effect of temperature variations in between the corrections from the algorithm. If the accurate EC index is not available in ECOCA interpolation could be applied to neighboring ECs to determine the CF for the current EC. The iterative ECOCA update process increases the correction accuracy. Performance is dependent on the accuracy of EC measurement. Generally the sync algorithm will provide CFs with a null average once all the EC factors impacting the free running frequency are considered and compensated for. This will also improve the holdover performance of the system. The environmental parameters can be measured directly (through accurate temperature sensors) or sometimes indirectly for lower precision applications. As example of lower precision indirect measurement are historical data, based on the time of the day, combined with the period of the year. Another indirect measurement example would be the measuring the ratio between the synchronized oscillator and another oscillator in its vicinity subject to the same EC. The difference in their characteristic could be used to identify a temperature measurement curve.

The size of EC gradient during the cycle of the synchronization of the algorithm impacts on decision to update ECOCA and the value of an associated EC_SACF or T_SACF. The EC fluctuations change the local oscillator free running frequency that impacts on the accuracy of the relative frequency correction computed by the algorithm that will be further transferred into ECOCA. The CF inherently integrates fluctuations of the local frequency during the period of the cycle. We compensate for this error by computing an equivalent (EEC) that is a stable value of EC that would generate the same count of oscillations as measured during the SUI cycle of the algorithm by dividing the integration of EC The equation can be applied to any EC and determine the equivalent stable environmental condition, $$ESEC = \int_{t(n-1)}^{t(n)} EC(t)\,dt \Big/ \int_{t(n-1)}^{t(n)} dt$$

For the temperature measurement during the cycle by the time of measurement. Equivalent Environmental Temperature (EET)=

$$\text{Equivalent Environmental Temperature } (EET) = \frac{\int_{t\_start}^{t\_end} Temp(t)\,dt}{\int_{t\_start}^{t\_end} dt}$$

In an exemplary embodiment, without reducing from generality, we consider temperature as the only EC factor impacting the oscillator frequency variations. If the temperature increased linearly from T1 to T1+0.4 F, with an average of T1+0.2 F the actual CF should be associated with the EEC of T1+0.2 F. The temperature Variation=TV=Max(Temp(t))−min(Temp(t)) during the measurement interval (MI)=t_end−t_start. TV determines the Temperature stability self assessed confidence factor T_SACF that is the expression of the system confidence in considering this temperature measurement cycle in updating the ECOCA content. The bigger the fluctuation range the lower the confidence factor. A T_SACF implementation example could use an exponential function and a TV threshold (TVT): T_SACF=2^(Int(M*(TVT−TV)/TVT)). where M=Max_SACF could be 16. The temperature self assessed confidence factor (T_SACF) is combined with the frequency CF_SACF to obtain the final SACF to be used in updating the temperature in the ECOCA. For instance: SACF=(T_SACF*W+CF_SACF*V)/2. where W and V are scaling or normalizing factors. The update of the ECOCA coefficient can be done with a weighted function exemplified by:

SUM_CF=(SUM_CF−((1−Max_SACF+SACF)
*SUM_CF/K)+SACF*CF]/Max_SACF; CF is
the actual value returned by the algorithm.

During power up the reference oscillator is subject to a sharp gradient in temperature and frequency. Normal temperature control devices like OCXO will take significant time to stabilize. The ECOCA(EC) method of compensation provides the accurate clock immediately, even before the sync algorithm starts returning CF. Present method can be applied in different topologies as indicated below:

1) to a physical clock oscillator (VCXO, VC_TCXO) see FIG. 49, by adjusting the control voltage (CV) (4990 FIG. 48). Such a topology can be: VC_CXO (CV)->output clock->physical counter->physical time stamp->packet time stamp. The system would iteratively construct the Voltage correction factors (VCF) associated with each (ESEC, CF) pair from ECOCA, as the frequency versus voltage characteristic of the VCXO may need calibration and may not be perfectly linear. At least two determinations of the (oscillator frequency, control voltage) parameters measured at the same temperature are needed to estimate the VCFs.

2) to a physical NCO by adjusting the division factor as indicated by CF. Such a topology can be:

OCXO->NCO (CF)–output clock->physical counter->physical time stamp->packet time stamp (see FIG. 51)

3) to a virtual NCO by applying numerical corrections on the raw time stamps collected from an uncontrolled oscillator. See FIG. 50. Such a topology can be:

OCXO->physical counter->physical time stamp->virtual correction of time stamp (CF)->packet time stamp.

This process can be applied to the EC=Power Voltage. Similarly with the previous temperature example a low SACF, V_SACF will prevent ECOCA update. A two dimensional ECOCA table will be constructed for EC considering both temperature and voltage. As the voltage characteristic tends to be more linear and the voltage fluctuations are much lower, higher distance between the Voltage indexes could be used in conjunction with interpolation, both during reading and writing in the table.

An embodiment of a Virtual Oscillator will correct the Time Stamps (VTS) captured with a fixed oscillator topology This embodiment example includes only temperature as part of EC. The system measures temperatures Tn and T(n+1) at time moments t(n) for TS(n) and t(n+1) for TS(n+1) where TS are readings of the local counter. We adjust the TS value by the temperature correction factor ECOCA(T(n)), to compensate for the change in count rate due to temperature fluctuation and generate the virtual TS, marked as V_TS.

V_TS(n+1)=V_TS(n)+(TS(n+1)−TS(n))*fl(CF(T(n)),CF (T(n+1))); // Where: CF(T(n))=ECOCA(T(n)) is the Frequency correction from ECOCA indexed by T(n) and fl is either a simple average: fl(x,y)=(x+y)/2 or a more elaborated integration function.

Green Integrated Precision Oscillator Device.

A device comprising a controlled oscillator, generally a Voltage controlled oscillator (any technology including quarts and mems), a precision D/A converter for the oscillator control, a temperature sensor, an A/D converter for the numerical conversion of the temperature, a memory to store the ECOCA, a control unit performing the temperature reading and indexing it in the ECOCA, retrieving the CF, writing it to the D/A converter. In such embodiment the device has the ECOCA fixed and calibrated by the factory. Another embodiment may include a data link (generally serial, for example I2C) to the unit running a synchronization algorithm which link provides the CF, SACF at the end of the synchronization cycle to let the internal controller update the records on ECOCA. Another embodiment may provide to the external processor running the synchronization protocol the temperature readings that allows the external construction and maintenance of the ECOCA data. External processor can either write section of the table in the vicinity of the current temperature or the entire table back into the oscillator local memory. Yet another embodiment would maintain and update inside the device just the section of the ECOCA in the vicinity of the current temperature and swap in and out sections as temperature fluctuates with the external device that has more memory storage space. According to the embodiment the device would have at least one power, one Gnd, one Clock Output and optionally one I2C serial active pins. Internal precision voltage regulators may be included for higher precision. Additional A/D converters may measure the voltage of the power rail to be included in the ECOCA records. The internal memory of the device can be permanent (Flash for example) or volatile, ex: RAM). The size can also differ and as discussed could store the entire ECOCA or just a part of it. As the temperature gradient is limited under practical conditions, the internal memory can be reduced to the practical size necessary to cover for fastest temperature changes while swap is in progress. The memory size needs to be inversely proportional with the speed the system can update the content of the ECOCA local on the device from the external processor or storage space. Every one degree of temperature will have an associated amount of bytes in the ECOCA. The equation: (amount of ECOCA information per degree of temperature)*(Max temp gradient)*(min_interval+maximum system delay in response)=(speed of the link)*(min_interval+maximum system delay in response)=maximum data bytes to be transferred during the ECOCA update action. The determination of the min_interval required for continuous operation of the device under the worse temperature fluctuations permits calculation of the minimum size of the internal memory=min_interval*(speed of the serial link).

Calibration

Optionally a thermostat or TEC device can be placed in the nearest possible proximity of the oscillator to induce temperature fluctuations necessary to calibrate the system when good synchronization can be achieved as when the system is connected through a low PDV link to a high precision timing reference. ECOCA locations will be update with reliable CF in the range of temperature.

Another Bidirectional Embodiment Example

Algorithm starts with a few cycles performing first Slope based mirrored F synchronization. Each cycle will end when a valid Quatron is identified. The frequency is corrected. Initial AT0 prefiltering parameters will tighten to the actual Sum of the lasat|CF[ppB]|. Slope method would be used for VT identification, which would check three inequalities. AT0 will be adapted to obtain at least one VT (Quatron) within a limited time interval, which we chose to be 1 S. For a better covering solution for high PDV situations 3 instances of the same function would run in parallel with AT0.3=8 nS, AT0.5=32 nS and AT0.7=128 nS. The first solution for AT0.3 within 1 S will be considered, otherwise the Average of the AT0.5 solutions and if none, lastly the average of AT0.7 solutions. Once the Sum of the past 3|CF| is within 200, we initialize Phase_Zero and declare the process locked. Then we use SUI cycle of 2 Seconds expandable to 4 if no VTs are found and use Duon for Slope search and histogram mode for the solution. The UTC is enabled and further provides the Phase Zero.

Method for Synchronization of Multiple Clock Domains Using One Network Port (Independent T1 Timing).

Some applications require a point to point synchronization of independent pairs of free running timing references and followers in order to preserve data integrity. This is a typical application for PWE services that do not use a common network timing. More there is no explicit departure time stamp but the departure time from the source can be constructed from the functional specifications.

This method determines the arrival time stamps based on different time domain clocks while physically using a single time stamping local clock. An embodiment applies to multiple E1/T1 streams clocked by independent free running remote oscillators, for instance in SAToP or Pseudowire, while there is only one time stamping clock available (RNCO) for all received packets regardless of source.

The method is based on performing periodic, simultaneous synchronous time stamps on all the counters marked as kNCO associated with each time source and interpolation of kNCOn=PTP arrival time stamping event by using the RNCOn relative position within the [RNCOm, RNCOm+1] interval.

We define RNCOn=PTP traffic time stamp at the arrival time. The RNCOn,n,m+1 are passed to the kNCO associated with that PTP.

Independently, at regular time intervals (0.1 S to 1 mS function of desired accuracy) all the kNCO (and the RNCO (Reference NCO)) are time-stamped precisely at the same time. For each packet the RNCOn is linked with corresponding kNCOm, kNCOm+1.

Assuming the system is linear we extrapolate kNCOn=kNCOm+1+(RNCOn−RNCOm)*(kNCOm−kNCOm+1)/(RNCOm+1−RNCOm).

Note 1: Actually the ratio (kNCOm−kNCOm+1)/(RNCOm+1−RNCOm) is known to the system as being the kcNCOupd/RNCOupd values if both kNCO and RNCO are sourced from the same master clock Note 2: the accumulated error between the kNCO and RNCO during the 1 mS interval is not even measurable for clock differences smaller than 1000 ppB. In certain situations, where lower precision is acceptable, extrapolation may not be necessary at all, resulting in a shorter formula: kNCOn=kNCOm (latest system synchronous local time stamp)

Implementation: The kNCO will be implemented into a remote FPGA. Regardless of the timing source, all the PTP are time stamped by RNCO content. At fixed time intervals a signal will indicate to both the kNCO and RNCO to do an immediate time stamp. Those intervals need to be sufficiently long to allow the system to bind the RNCOm with kRNCOm. Local counters can be maintained to do the association. Counters can be resynchronized by a noticeable shorter or longer interval between the synchronous time stamping events (half or double), or simply by providing another counter sync signal. It is not necessary that the Synchronous time stamp be related to any event. The purpose of this technique is to be able to use current hardware that has not direct data communication in between the RNCO and kNCO, where k is the PTP stream number.

An alternative way is to extrapolate the received time stamp within the periodic time stamp interval [tm, tm+1] (HW controlled).

The method time stamps all local kNCO available for this purpose at regular time intervals (as an example: 0.1 S to 1 mS function of desired accuracy).

Whether it is sampled by kNCO or RNCO, the event will have the same relative position within RNCO and kNCO windows (delimited by m and m+1 sequence)—See previous page figure Assuming the system is linear we extrapolate kNCOn=kNCOm+(kNCOm+1−kNCOm)*(RNCOn−RNCOm)/(RNCOm+1−RNCOm)

Or expressed in time events: $(t(n)-t(m))/(t(m+1)-t(m))$— where $t(x)$ are time stamping events NOTE: the system should be able to transfer the kNCO values to the CPU for computation of extrapolation. The common NCO clock is either free running or locked to a high stability source (using 1588 or similar protocol)

Algorithm Application in SaTop and Constant Bit Rate (CBR) PWE Applications

Algorithm applied to recover clock for CBR links transported over switched packet networks without the 1588 protocol. See FIG. 39, 40, 41

The application needs to meet the following criteria:

Have a fixed packet size (M)

That encapsulates a fixed number of CBR bits (N)

Have a Packed Identification Sequence Number (IDn) sufficiently long to account for lost packets For instance multiple of ALL1 cells could have a constructed time stamped (TS) associated with the departure time that is implicitly known to the system. In general, the Sn construction is a function of CBR frequency and the number of CBR bits included in the packet. It is a multiple of the ideal packet transmit rate.

Sn=IDn*N/F, where F is the source CBR frequency, M>N and the link speed is bigger than (M+N)*CBR/N The received packets are time stamped with Rn using the local Slave CBR clock. The packet ID is used to generate the Sn as indicated previously. When IDn wraps up the maximum IDn is added to the present IDn value after wrap to ensure a continuous Sn sequence. Locally the Sn is represented on more bits that in the packet header. (As an alternative solution a proprietary Master running the Phoenix Labs protocol can provide the clock to all Slave Terminals)

II. The PNTP Protocol

The Protocol and Network Topology

A major aspect of precision timing synchronization is the network architecture and communication protocol. We differ from IEEE 1588 and NTP existing solutions through the symmetry of the client and server, the capability to switch the server with client functions for each individual port, the simultaneous use of multiple servers for better synchronization results and the availability of complete visibility of all time stamp information to intermediate nodes that allows distribution of the synchronization processing.

The server/client dynamic allocation process is triggered either through signaling or by cognitive methods. The network quality connecting a client to a server fluctuates in time. It is essential for clients to synchronize with the servers that exhibit the best combination of a low PDV link and a high quality reference clock. This combination changes dynamically. Therefore, each individual node can decide the quality of its source and recovered timing. Another issue of the timing distribution architecture is the server fan-out i.e. associated clients that are directly served. A hierarchy of time reference nodes, or a message broadcast strategy, needs to be implemented for each individual case. For instance, the nodes with high fan out need to be type 3 to reduce the upstream network load due to multiple messages.

PNTP is a symmetrical protocol that coveys time stamp information between end nodes for the purpose of precision timing synchronization. The transmitted packet contains both the arrival time of latest receive packet and the transmission time (either for the current or the previously transmitted package according to the one or two steps versions of the protocol) and a packet ID that consists of a bit selection from the transmission time on the packet received from the remote node.

In unidirectional mode only the transmit field has meaningful data. In bidirectional mode both Master and Slave as well as intermediate nodes of the path have access to the same TS data. Both ends of the link and the intermediate nodes can potentially calculate the necessary correction for the Slave frequency The reference node can generate broadcast messages in parallel with point to point messages.

Packet Payload

The objectives guiding the design of our proprietary protocol were symmetry, simplicity, and cost. Other information that is not time critical for the synchronization process but is required for the management of the time synchronization could be carried through regular packets for instance as management application level at a much lower cost and with higher security. Thus, we split the time critical data required by the synchronization process from the management information.

An embodiment of the packet payload is described in Tab 2. Each packet includes the latest departure TS and arrival TS relative to the node. For identification of the response packets and TS matching we use either a 16 bit field selection from the time stamp or packet ID sequence. The time of the day (UTC) synchronization requires availability of 4 time stamps at the node performing the determination (IEEE 1588 defines them as t1, t2, t3, and t4). The time stamps coded as 32-bits are a fixed-point representation where nanoseconds are stored in bits 29 to 0 (representing the decimal 0 to 999,999,999) and seconds in bits 30 and 31. The MSB of UTC starting from seconds can be transmitted if necessary once every 4 seconds through the control field or thorough management channels allowing new follower client nodes to synchronize with UTC. This way we eliminate redundancy of including the entire UTC in every time stamp and every packet. Optionally the Follower can request through the command field to have only the arrival or the departure time stamped returned, while the MSB 32 bits are used for the seconds representation. (See Tab 3 for the return of departure time in 63 bits formant). MSB 32 bits represent multiples of 4 S.

The PNTP performing only frequency and phase synchronization have lower minimum time stamp bit representation requirements. Versions of the packet format can be specified for each application according to precision and frequency of packets.

TABLE 2

Example of proprietary protocol carrying a typical double time stamp, ID and control field

| # | Bits | Unit . event | Local/Remote capture | Description |
|---|---|---|---|---|
| 1 | 2 | Seconds, local Departure | L | Previous packet - Local Departure |
| 2 | 30 | nS, local Departure | L | |
| 5 | 2 | Seconds, Local Arrival | L | Local arrival of the latest packet received |
| 6 | 30 | nS, local Arrival | L | |
| 4 | 16 | remote Departure TS >> 16 | R | LSB ID or Sequence ID |
| 7 | 16 | Control | | Control data |

Another embodiment of the protocol packets would follow the IEEE 1588 sync packet structure and will simple append the latest arrival time stamp:
Reference node (master) generates only Sync type of messages (not follow up)

| offset | content |
| --- | --- |
| 0 | 1588 header |
| 36 | t1 (latest departed from the node (here is master)) |
| 44 | t4 (latest arrival to the node (here is master) |

Follower node generates a symmetrical Sync message.

| offset | content |
| --- | --- |
| 0 | 1588 header |
| 36 | t2 (latest departed from the node (here is slave)) |
| 44 | t3 (latest arrival to the node (here is slave)) | where t1, t3, t4, t2 are time stamps represented as 32b Sec, 32 b nS.

Symmetry allows both ends of the link to run basically the same simple stack for the transport of time stamps. A reference timing port can very easily switch into a time follower port. As an example of practical benefits, imagine a network connected to different clock sources at geographically different locations, marked node A and B. If the clock reference for A is functional within specified parameters while the one for B is not, then A is the server for timing reference while B, as a client, gets its synchronization across the local network from A. If A is deprived from the reference clock source while B has this source available than B becomes the network reference server and A would collect its timing from B through the local network as a client. Both A and B can become timing reference servers at the same time and feed the rest of the network through the other ports. Any timing reference server needs to send broadcast timing messages every second to let other nodes know of their availability. The PNTP could use the management and control layers of the IEEE 1588.

Protocol Deployment Topology

Deployment of our precision clock distribution system concerns the path topology of the reference, the intermediate and the followers nodes. In addition, separation of the computing load from the nodes where the synchronization is required makes possible a more efficient utilization of a network resources and creation of simpler, less expensive follower nodes with virtually no computing capability (beneficial for simple wireless sensor networks, audio speakers). Another aspect is that timing synchronization functionality is distributed per port rather than per node. Our system adds the concept of link quality to the precision of the timing provided by the reference node. Topology wise every PNTP protocol path has an upstream timing reference and a downstream timing follower. Other intermediate switches may exist in between the end points as part of the path. We have two groups of ports: End ports of type 1 and type 3 and Intermediate ports of type 2 and type 4:

Type 1) Absolute Reference port—that uses a local high precision timing source (generally all ports of such node would act as upstream reference), Type 2) Time Transparent or resident time aware port (RTA) (for both the upstream and downstream ports). Functionally the time the packet is resident on the switch is added to the time stamp data field. In a typical implementation the local arrival time of the downstream port is subtracted from the packet time stamp. The local departure time is added to the same time stamp at the departure port. An Arithmetical Unit (AU) performs the operations that are equivalent with addition of the resident time (departure−arrival) to the original departure time from the reference time port (type 1 or 3). Both ports of the intermediate node (type 2) have the same local time reference. The time stamps collected at these ports can be used an instance of the Algorithm to maintain a local precision timing for increased accuracy of the resident time measurement. If the ports do not have NCO capabilities, virtual Oscillator can be maintained as indicated infra.

Type 3) synchronized (follower) port. Can be both an Upstream and a Downstream port. 3.1) The downstream port is the end point of the PNTP. It interprets the data from packets generated on the time reference port after crossing agnostic (type 4) and RTA (type 2) network nodes. Time stamps collected here are used to synchronize a local oscillator resident in that node (eventually associated with the port). If the node does not act as a reference for any other downstream nodes it is the equivalent of a 1588 ordinary clock. If it is used as a reference it uses the algorithm recovered timing and acts as a bridge timing reference equivalent with a IEEE 1588 boundary clock. In both cases, a type 3 downstream port runs an instance of the algorithm and an instance of the PNTP stack. 3.2) The port that uses the recovered timing as a reference for other downstream ports must run an instance of the PNTP protocol. See FIG. 54, 55.

Type 4) Agnostic ports. They do not understand the protocol and take no action related to time or time packets. Simply they pass the PNTP packets and induce PDV.

The Protocol Standard Ports Codification for PNTP (See FIG. 54, 55, 56)

To codify ports we use the first digit as the type of timing function performed on that port as indicated in the previous paragraph. The second field specifies the upstream reference nodes ID. If current node is a reference code it will represent its own ID. Otherwise it will include all the reference nodes running PNTP used for synchronization by the current downstream port. Third field is the downstream nodes ID. If the current port is a follower node (type 3) then its ID will be ending the stream of IDs. Note that one port can dynamically switch its type as a function of the network conditions. See FIG. 56 nodes O and P that both have type 2 and type 3 capabilities on the relevant ports. For instance if Node O is connected to a Reference Node F through a very good connection with virtually no PDV then it will work in RTA mode=type2. Otherwise if the connection is very bad, the downstream port will recover the clock locally and will become a synchronized port terminating the TFGP protocol as on node P. In other topologies see FIG. 55. Node G can be connected to multiple reference nodes A, B, C and to other synchronized ports H,J,K,L. If Node C losses its reference clock due to a failure for instance, the port on node G becomes upstream for the C, practically a reverse of the roles. Such switch can be induced either by signaling through management channels or by the algorithm.

III. Deployment Method for the Timing Transport System Over PSN

Proxy Deployment

Special applications may require special deployment architectures such as having a Proxy Gateway (SPG) perform the computing for the follower nodes. Passive followers could be wireless sensors. A Proxy with access to the time stamps the reference and follower are generating can run an instance of the algorithm for each passive follower then send the correction factor for each follower local oscillators. Proxy can be typically located in the last high fan out switch acting as a 1588 boundary clock or a PNTP type 3 reference node. Otherwise the Proxy can be placed anywhere in the network provided a way to receive TSP collected by the follower. PNTP protocol allows full visibility of all the TSPs. Any intermediate node can snoop the traffic, perform the algorithm and provide the solution to the follower.

Advantages of proxy deployment: reduces overall system costs allowing less complex or dummy Followers, reduce flow through traffic for type 3 local gateways (office or home), global view of the network timing for the proxy that has more information and can do a better timing correction then each individual follower.

Timing Bypass Box Method of Retrofitting the Intermediate Network Switches for IEEE 1588, NTP and PNTP Protocol.

Allows elimination or reduction of PDV by retrofitting obsolete switches that introduce high PDV in the path of IEEE 1588, NTP or PNTP. One embodiment would use a four port device and will be inserted between the line and the switch ports in both inbound and outbound directions as a horse shoe. The switch introduced PDV is in fact the time the packet was resident on that switch. It is the difference between the line departure and line arrival time. If the resident time is added to the time stamp embedded in the departure time stamp, then the PDV inserted by the switch is removed transparently for both end points. If all the switches of a link would have this capability there will be very little if any distortion of the end points synchronization. Each direction will keep separate TSP and packet ID variables for each link crossing that switch to avoid interference. Adding the resident delay has the equivalent of a delay of the departure time.

Another embodiment uses two identical devices each with two interface ports one for the line and one for the switch. Two such devices will be inserted between the line and the switch port, one for inbound one for outbound directions. The two devices will be timed synchronized to each other either through another Ethernet, BITS or proprietary connection. The inbound device will subtract local arrival time stamps from the packet embedded Reference node departure time stamp. The outbound device will add its local departure time stamp to the same packet embedded Reference node departure time stamps.

Not all the intermediate switches have to have this feature. Addition of one such timing pass through device in the middle of a 10 switch chain can dramatically reduce the PDV of the original end to end path.

EXAMPLE

Consider the topology: Master end, two intermediated switches: SW1, SW2 and Slave Reception (SR).

Master departure Time stamp=MT. Slave reception time stamp=SR

SR(n)=MT(n)+PDV1(n)+PDV2(n)+constant_PDV, where n is the sequence ID and MT(n) is the master departure time stamp. The first switch SW1 will replace MT(n) by MT(n)+PDV1(n). The second switch SW2 will replace the received embedded time stamp (MT(n)+PDV1(n)) by MT(n)+PDV1(n)+PDV2(n).

The slave would determine the propagation delay=SR(n)−[MT(n)+PDV1(n)+PDV2(n)]=
=MT(n)+PDV1(n)+PDV2(n)+constant_PDV−[MT(n)+PDV1(n)+PDV2(n)]=
=constant_PDV.

In real life there are also variable delays at physical link layer (here marked as constant_PDV) but overall this protocol will improve significantly—by orders of magnitude—the accuracy of timing calculations.

IV. Method and Apparatus for Simulation, Test and Debug Software Simulation Test Bench Our Algorithm receives time stamps from the protocol stack running on a network node and controls the local timing parameters (frequency and UTC). The Algorithm can be simulated by replacing the real network, time reference node, and the local time stamping and clock oscillators by a System Model Program (SMP) that reads the PDV from a pre-recorded Stimulus file or from a program that generates the PDV in real time then generates the Time Stamps in same way a read HW system would and deliver them to the Algorithm. The algorithm processes the time stamps and produce the CFS that are sent to the SMP.

SMP updates its timing parameters from the new CFS. Newly generated departure and arrival time stamps would use the updated timing.

An example of SMP implementation: Without losing generality we can consider our real network has a minimum propagation delay as 0. We mark Sn as the Reference node departure time stamps and Rn as the Follower node arrival time stamps at time n.

Sn are generated with a chosen frequency as requested by application, typically for 0.5 to 1024 ppS:

SMP generates R(n)=arrival time stamps:

$$Rn=R(NCOupd)+(Sn-S(NCOupd)+(PDV(n)-PDV(NCOupd)))*F(NCOupd)$$

Where: R(NCOupd) is the arrival TS generated at the last update of the local timing parameters with frequency correction factor=CF provided by the algorithm.

F(NCOupd) is the normalized frequency for the board free running oscillator relative to an ideal absolute value (normalized in vicinity of 1). Example if our free running F is 1.00001 and our current F is 1.00002 then CF is ~1.00001

F(n)=F(n−1)*CF(n)//(n) is the index for the algorithm cycle, delineated by NCO update events.

CF(n) is normalized in vicinity of 1 and indicates how much the frequency will change relative to the old value.

Program start with default F(0) that depends on the application. Typically 1.00005 can be used to show an offset of 50 ppM.

Rn must reflect the sampling error due to the discrete period of the CPU and the PHY device and GMII/SGMII bus clock versus the analog arrival time that is the sum of those sampling clocks period (Ex: 8 nS (GE)+5 nS for a 200 MHz CPU clock=13 nS). We need to reduce the accuracy of R(n) by 13 nS.

For FE, Generated_Rn=Rn−Mod(Rn, 40 nS)

Simulation

Generation of Stimulus PDV File

A Stimulus file contains records with the PDV generated by the network and collected by one of our systems or another off the shelf test set.

We can also generate the file. We divided the stimulus file in several sections. Each section contains a specific type of noise or a combination of those types. This has the purpose to test and compare the performance of the algorithm under different network conditions and the transition response. We used an excel Spreadsheet to generate the Stimulus File. A set of parameters specify adjustable characteristics for each type of PDV type like amplitude and period. Random variables generate PDV parameters and values. We finally sum of all the PDV types and create the final stimulus file. The SMP program reads it and generates the Follower received time stamped events that are passed to the Algorithm together with associated Reference departure time stamps that replicates the runtime situation.

Stimulus File Construction for Multiple Network Switches

Once we have PDV data collected in the lab from a network test bench or from field measurements including one or multiple switches we can synthesize PDV files representing test configurations equivalent to multiple replicated instances of recorded configuration. We can produce PDV files for simulation and test without having to create the test bench in the lab. We add the same instance of the PDV file sifted in phase and with different amplitudes. Every new sample is the result of addition of a number of samples equal with the number of instances. For instance considering Switches SWTn the total PDV=SUM(PDV(SWTn(t+Tn)) where Tn is the relative delay of the traffic and propagation delay between the Switch n and the reference switch. Same processing can be done by any other program or tool.

TIE Determination in Simulation

Simulation has access to both source and recovered clock. TIE and MTIE can be accurately determined in SW. Reason is that simulation knows at any time both the Master and the Slave frequencies. The process does the correction of the slave frequency by multiplying current Fs value, that is the correction of the free running local oscillator frequency with a correction factor FCF (u)=frequency correction factor calculated at the NCO update moment u. FCF is a number in the vicinity of 1. Fs is basically the mirroring of Fm through the process.

Consider Fs(0)=Free running frequency at Slave node (=1.000,050,000

$Fs(1)=Fs(0)*CF(1)$ $Fs(2)=Fs(1)*CF(2)$

...

$Fs(u)=Fs(u-1)*CF(u)$ where u is the latest NCO update event

The Master source frequency is considered by default fixed. The Fs is the slave frequency relative to Fm. We use a normal representation (divide all frequencies by Fm for generality). The master frequency Fm=1 and Fs is represented as the ratio between the actual local frequency and master frequency. Fs is a ratio in the vicinity of 1. The accumulated phase error (MTIE) is the differences between the Fm and Fs accumulated over a period of time, that we divide in smaller intervals between NCOupdates.

$MTIE(n)=(1-Fs(NCOupd))*(S(NCOupd)-Sn)+MTIE(NCOupd-1)$

Fs (NCOupd)=Fs(NCOupd−1)*CF(NCOupd) is the value currently written in the NCO, and MTIE(NCOupd−1) is the previous values at the previous NCOupd moment (previous line in the NCOupd file).

For the NCOupd file, that captures only the NCOupdate events, here is the formula using data from 2 consecutive lines, u and u−1:

$MTIE(u)=(1-Fs(u-1))*(R(u)-R(u-1))+MTIE(u-1)$ or can replace R by S due to second order error $MTIE(u)=(1-Fs(u-1))*(S(u)-S(u-1))+MTIE(u-1)$ Where u is the NCO update event.
Network Timing Test Equipment (NTTE)
Test System
The development and optimization of the algorithm is done with a set of test mechanisms: test devices and simulation. The novel test device reproduce the network cloud as seen by a follower device to be synchronized. It includes a plurality of instances of reference nodes running a communication protocol, reference timing sources and network impairment generators. Such test equipment is connected directly to the equipment under test. The network impairment is simulated by altering the time stamps with the virtual propagation delay variations between the nodes that is provided from PDV file. This file can either be recorded in lab, in a runtime network or can be generated manually or automatically. A direct connection between the test set and the tested equipment makes communication practically instantaneous. If the packet is actually received at the same time it is sent but the embedded time stamp value is purposely decreased by PDV, it will be equivalent with a packet being sent PDVn nS earlier and then delayed by the network with the same PDVn nS. The receiver will place the same time stamp in both cases resulting into an equivalent situation. Receiver will receive the packets at the same time in both situations and a difference between the source and the destination counters will indicate the PDVn. The downstream node will interpret the arrival packets, as they would be crossing a network with a PDVn sequence read from the stimulus file. Calculating the network impairment function and the time reference node eliminates the external synchronization connection (see FIG. 42) and the cost of either the master or the impairment equipment. Feeding the recovered clock into the test equipment we can measure MTBF and compare instant frequencies, provide their evolution in time and other qualifications. For the outbound direction (relative to the tested follower equipment) the outbound PDVn is retrieved from the outbound file, added to the arrival time stamp and returned to the follower through the protocol. this will be equivalent with the presence of a PDV in the network. The PDV file would have the propagation delay embedded in the PDV value.

The fact that we can generate real packets with PDV read from files allow us to create complex PDV patterns from simple networks or lab configurations. For instance we can setup only one switch with cross traffic replicating the 8261 pattern. Then we can superimpose using a variety of techniques several instances of the same file (example: ten instances), with different degrees of synchronization between the cross traffic running on each individual switch. This reduces the time and the costs associated with the test.

Network Cloud Timing Emulator

The NTTE emulates the real network cloud including several masters, running any major protocol and any path PDV and propagation delay. NTTE generates packets that will have the same effect on the equipment under test as if they would be received from the real network being emulated. The Follower would not be able to see any difference. NTTE can create test conditions and situations that are extremely difficult and expensive if not impracticable to setup in the lab NTTE can measure the synchronization performance by getting back from the equipment under test the physical timing and compare with internal reference. Any reference frequency generated by the equipment under test (for instance the 1 S pulse, 2.048 MHz or 10 MHz) can be analyzed as the entire system is numerical and would determine and record in time the actual ratio between any reference and follower frequencies. NTTE can be programmed to generate any Synchronization protocol and PDV. NTTE cuts the costs of using both the timing Reference and another PDV insertion equipment as the packet generation and PDV insertion functions are performed by the NTTE.

As example it can generate IEEE 1588, NTP, PNTP or a combination of them associated with an undetermined number of network Masters or Reference nodes. The PDV associated with each path from the Reference nodes can be generated in real time or played back from files. The files could be collected from real networks, collected from lab test benches, synthesized or processed from such collections, generated or a combination thereof. The PDV collection can be done by the NTTE (see FIG. 42) or any other commercial PDV test/measuring system. For test purpose, the PDV file is loaded into NTTE and it is used to alter the relation between the actual packets departure time and the transmitted departure time. The PDV file is completely loaded into NTTE or it is transferred periodically from a PDV file server. The actual PDV is simulated by altering the departure time or the embedded time stamps of the packet.

In an embodiment the NTTE, that is directly connected to the follower (for instance through a GE link), generates packets at a rate=constant_rate_T+PDVn, where n is the sequence of the time stamped packet. An associated departure time Dn=n*T is transferred to the Follower. This will force the Follower to interpret a virtual PDVn even if the reference is directly connected to the Follower. In another preferred embodiment for situations when the Source can only generate packets at fixed interval rates, then the departure time passed to the Follower will be the actual departure time minus PDVn. Dn=Dn−PDVn. Similarly the Slave that received the packet instantly at Dn and will interpret a propagation delay of PDVn.

Note that the same rate (ppS) should be normally used for both collection and test (generation) systems. If not possible, interpolation is possible to generate PDVn for a packets generated at a different rate in real life collection than during the emulation.

In a bidirectional situation the incoming time stamp is altered by the master with the addition of the R_PDVn that is similarly preloaded or periodically transferred from the PDV server.

Master arrival time stamp for Delay Request is: M_Rn=M_Rn+PDVn

An alternative approach is to change the departure time stamp from the Slave (delay Request) by subtracting the PDVn. Slave departure time S_Sn=S_Sn−PDVn.

To test timing over synchronous transport links, the PDV is substituted by jitter and wander while the protocol is replaced by a direct data transfer process. As example a T1 link (or BITS) would pass the jitter and wonder as read from files or generated in real time. In another example the numerical values of jitter and wander are inserted in an IP packet and delivered to the Follower.

Simulation of Change in Distance Between Network Nodes

The positioning or distance between network nodes that is measured through timing methods can be virtually modified by addition to the time stamp of a constant equal with the variation of the propagation delay. For example the arrival TS_A over a link L1 that was modified by a distance X1 corresponding to a modification of delay by Y1 (both X1 and Y1 are signed) should produce new_TS_A_L1 =TS_A_L1+Y1. Considering PD_L1 as the propagation delay over link 1, the PD is PD_L1 +Y1. If there are multiple links to one node, each link with a corresponding wireless or wired propagation delay then the simulator would have to identify the source and associate. A central data base would maintain all the real Xn and simulated Yn propagation delay time between each pair of nodes associated with the link Ln such that every actual arrival time stamp TS_A_Ln will be incremented by the signed Yn.

For physical point to point links an alternative way to simulate a change in distance by applying changes only at one end and leaving the time stamps processed by the remote node unmodified is to decrement the departure time stamp by the signed Y in order for the remote node to see an increased propagation delay by Y.

Movement Simulation

Simulation of a moving network element (mobile wireless) can be achieved by recalculating Yn(t) at the time of time stamp, as Yn fluctuates as result of the movement. Usually a predefined trajectory for one or multiple nodes and the associated functions for each node would be determined ahead of the experiment.

Noise Simulation

Additional PDV(n,t) can be added to the Yn(t) or Yn either from preloaded tables, from generating functions or from a combination of those.

Test to Compare Accuracy of the Test Equipment:

The traffic generated by the NTTE can be recaptured by another NTTE acting as a Follower evaluation device and compared back with the original file. For better results both NTTE need to have the same system clock.

Reverse Positioning Method

Traditionally mobile wireless mobile receivers establish their position by measuring the propagation delay to multiple base stations with known position (as example from their GPS connection) and applying triangularization methods. A reverse mechanism can be used to determine the position of the fixed base station or Femtocell that do not have GPS by determining the minimum propagation delay to a plurality of mobile cell phone while they are located in a plurality of different positions and applying similar triangularization procedures. The data for triangularization can be accumulated in time, as the node is fixed. For instance a single GPS phone that takes multiple positions in time would gradually improve location of the base station. The cell phones could use our synchronization algorithm to improve the GPS sync accuracy. More, the algorithm will deliver the associated SACF that would be transferred to the base station and used in weighting the quality of timing and of the positioning information. Similarly once a few intrabuilding wireless witches have their positioned determined, the same method can be further applied for the other witches.

It will be apparent to those skilled in the art that various modifications and variations can be made in the system and processes of the present invention without departing from the spirit or the scope of the invention. Thus it is intended that the present invention cover the modification sand variations of this invention provided that they come within the scope of the appended claims and their equivalents. In this context, equivalents means each and every implementation for carrying out the functions recited in the claims even if not explicitly described herein.

What is claimed is:

1. A physical layer independent method for timing synchronization comprising the steps:

generating one or more Correction Factor Solutions (CFSs) by applying one or more Correction Factor Functions (CFFs) to a set of Time Stamp Pairs (TSPs) wherein the Time Stamps Pairs are associated with propagation events on one direction to a reference timing node;

Generating an Integrated Correction Factor Solution, ICFS by applying an Integrating Correction Factor Function, ICFF to a plurality of Correction Factor Solutions (CFSs) calculated from sets of Time Stamp Pairs associated with one or multiple reference nodes; and using the Integrated Correction Factor Solution to synchronize the timing.

2. The method of claim 1 further comprising the steps:
calculating $CFSz_d$ as the difference —between the arrival and departure time $(A(z_d)-D(z_d))$ of a propagation event $z_d$, wherein d is i for ingress direction or d is e for egress direction;
determining a $CFSx_d$ as local minimum for the absolute $CFSz_d$ values for each direction, $CFSx_d=\min(ABS(CFSz_d))$;
determining a Time offset between a Reference node Time and a Follower node Time, offset_UTC($CFSx_i$, $CFSx_e$) as the half of the difference between $CFSx_i$ and $CFSx_e$; and
using the offset_UTC to synchronize timing.

3. An article of manufacture comprising machine readable medium having stored thereon one or more programs capable of executing the method of claim 2.

4. An article of manufacture comprising machine readable medium having stored thereon one or more programs capable of executing the method of claim 1.

5. A physical layer independent method for timing synchronization comprising the steps:
Time stamping N propagation events between the reference and the follower system during a measuring time interval and creating a Time Stamp Pair n, TSPn for each propagation event n wherein TSPn consists of an arrival time n, ATn and
a departure time n, DTn
wherein n takes values between 1 and N;
calculating a set of Correction Factors, $CF_{ij}$S wherein each $CF_{ij}$, is calculated from any two different Time Stamp Pairs, TSPi and TSPj within a measuring time interval by dividing the difference between an arrival time interval $(AT_j-AT_i)$ and a departure time interval $(DT_j-DT_i)$ by the arrival time interval or by calculating the $CF_{ij}$ with any other equivalent formula, wherein the arrival time interval is equal with the arrival time of the propagation event j minus the arrival time of the propagation event i and wherein the departure time interval is equal with the departure time of the propagation event j, $DT_j$ and the departure time of the propagation event i, $DT_i$;
calculating the Correction Factor Solution (CFS) from a set of Correction Factors, $CF_{ij}$ included in a vicinity with the highest density of values; and
Using the Correction Factor Solution to synchronize timing.

6. A physical layer independent method for timing synchronization as recited by claim 5, wherein the calculation of the correction factor solution (CFS) further comprises the steps:
calculating Correction Factors, $CF_{ij}$ from combinations of time stamp pairs, TSPi and TSPj;
calculating the minimum sum of distances (SoD) between a $CF_{ij}$ and the N closest $CF_{fg}$ wherein i, j, f, g are indexes of the Time Stamp Pairs within the measuring time interval and N is a natural number;
Sorting the SoD;
Selecting the smallest SoD and the associated $CF_{ij}$;
calculating the Correction Factor CF
as an average of the N closest $CF_{fg}$ relative to the smallest SoD or
as a weighted average of the N closest $CF_{fg}$ relative to the smallest SoD wherein the weight of the $CF_{fg}$ is the proximity to the $CF_{ig}$; and
using the Correction Factor to synchronize the timing.

7. An article of manufacture comprising machine readable medium having stored thereon one or more programs capable of executing the method of claim 6.

8. A physical layer independent method for timing synchronization as recited by claim 5, wherein the calculation the correction factor solution (CFS) further comprises the steps:
creating a histogram for the $CF_k$ values;
assigning to each bin the number of $CF_k$ instances within the range of the bin;
sliding a window with a width of SVWidth bins over the histogram wherein the SVWidth is a number dependent on the quantization error of the time stamping or on the quantization error of the hop by hop transmission over the communication path or on the Self Assessed Confidence Factor or is a pre-established design constant;
summing the content of the histogram bins within the sliding window during the sliding process;
determining a Solution Vicinity ("SV") as a range of SVWidth bins that provide the highest sum of the bins content; and
calculating the Correction Factor Solution
as an average of the $CF_k$ in the Solution Vicinity or
as a weighted average as the division of the sum of the products between the $CF_k$ associated with the bin and the bin content by the sum of the content of the bins within the Solution Vicinity or
as the weighted average after applying a weighting window or
as a combination thereof.

9. An article of manufacture comprising machine readable medium having stored thereon one or more programs capable of executing the method of claim 8.

10. An article of manufacture comprising machine readable medium having stored thereon one or more programs capable of executing the method of claim 5.

11. A physical layer independent method for timing synchronization comprising the steps:
creating groups of time stamps wherein each group k is associated with
a path to a time reference node during a measuring time interval or
a direction of a path during a measuring time interval;
generating a Correction Factor Solution k, $CFS_k$ from the timestamps in the group "k", wherein $CFS_k$ comprises a Correction Factor k, $CF_k$ and a Self Assessed Confidence Factor k, $SACF_k$ indicating the reliability of the Correction Factor k;
generating an Integrated Correction Factor, ICF with an Integrating Correction Factor Function, ICFF by integrating one of several $CF_k$ weighted by the associated $SACF_k$ or
by generating the Integrated Correction Factor by integrating only the $CF_k$ with the associated $SACF_k$ higher than a threshold; and
using the Integrated Correction Factor to synchronize timing.

12. An article of manufacture comprising machine readable medium having stored thereon one or more programs capable of executing the method of claim 11.

13. A physical layer independent method for timing synchronization comprising the steps:
calculating from a set of departure and arrival timestamps associated with telecommunication events between a reference and a follower systems a Correction Factor, CF indicating the offset between the follower timing and the reference timing during a measuring time interval;

calculating a Self Assessed Confidence Factor ("SACF") indicating a self assessed reliability of the Correction Factor, CF; and using the Correction Factor weighted by the Self Assessed Confidence Factor to synchronize timing.

14. The method of claim 13 wherein the size of the measuring time interval is dynamically increased until the Self Assessed Confidence Factor is higher than a minimum threshold.

15. An article of manufacture comprising machine readable medium having stored thereon one or more programs capable of executing the method of claim 14.

16. The method of claim 13 wherein the Self Assessed Confidence Factor is calculated as the product of a scaling factor S and the ratio of
a CFn corresponding to a histogram bin containing the highest number of CFn instances (maxCFnCnt)
divided by a difference between two Correction Factors (CFn) corresponding to the two closest bins with the content less than the division by P of the maximum number of CFn instances (factionCFnCnt) wherein P is a natural number and S is a scaling factor for SACF normalization or as the product of a scaling factor S and the ratio between
a number of terms within a Sliding Vicinity, SV satisfying the relation $|CFn(x,y)-CFn(v,w)|=AT_0 SACF_n < AT_0$ and
another number of terms within an Extended Sliding Vicinity, ESV satisfying the relation $|CFn(x,y)-CFn(v,w)|=AT_0 SACF_n < K*AT_0$, wherein
$AT_0$ is proportional with the precision sought for the synchronization or
$AT_0$ is proportional with the Propagation Delay Variation (PDV) of the direction and the path associated with the Time Stamp Pairs (x,y) used for the calculation of CFn(x,y) and the Time Stamp Pairs (v,w) used for the calculation of CFn(v,w), or
$AT_0$ is a design constant, and
wherein K is a design constant.

17. An article of manufacture comprising machine readable medium having stored thereon one or more programs capable of executing the method of claim 9.

18. An article of manufacture comprising machine readable medium having stored thereon one or more programs capable of executing the method of claim 13.

19. A physical layer independent method for timing synchronization of comprising the steps:

creating a histogram of Correction Factors (CFn) calculated from time stamp pairs, TSPn associated with propagation events;

calculating a Self Assessed Confidence Factor (SACF) that is directly dependent on the sharpness of the shape of the CFn histogram; and using the Correction Factor and the Self Assessed Confidence Factor to synchronize timing.

20. A method for synchronizing timing of a follower system to a reference system as recited by claim 19, wherein the histogram bin size is directly dependent on the magnitude of the Propagation Delay Variation (PDV) noise associated with the Time Stamp Pairs (TSP) used to calculate the Correction Factors (CFn) or is inversely dependent on the Self Assessed Confidence Factor (SACF).

21. An article of manufacture comprising machine readable medium having stored thereon one or more programs capable of executing the method of claim 20.

22. An article of manufacture comprising machine readable medium having stored thereon one or more programs capable of executing the method of claim 19.

23. A physical layer independent method for synchronizing timing comprising the steps:

generating actual timestamps TS(n) relative to the local oscillator for the propagation events between the reference and the follower timing nodes;

generating virtual Time Stamps, V_TS(n+1) from actual time stamps TS(n+1) by multiplying the actual time stamp intervals (TS(n+1)−TS(n)) with a Correction Factor (CF), according to the formula: V_TS(n+1)=V_TS(n)+(TS(n+1)−TS(n))*CF; and using the Virtual Time Stamps to calculate the Correction Factor.

24. An article of manufacture comprising machine readable medium having stored thereon one or more programs capable of executing the method of claim 23.

25. A physical layer independent method for synchronizing timing comprising the steps:

synchronizing a main follower timing to a main reference timing;

time stamping periodically the main follower timing (time stamp=represented as RNCOm) and the secondary follower timing (time stamp=represented as kNCOm) within a constant delay interval;

time stamping reception or transmission events associated with the secondary follower (RNCOn) using the main follower timing;

calculating a virtual secondary time stamps, kNCOn associated with the secondary follower timing from the time stamps performed with the main timing (RNCOn) by using the formula kNCOn=kNCOm+(kNCOm+1−kNCOm)*(RNCOn−RNCOm)/(RNCOm+1−RNCOm);

calculating a virtual correction factor relative to the main follower timing from the virtual secondary time stamps (kNCOn); and synchronizing the secondary follower timing to the secondary reference timing by applying the victual correction factor to the main follower timing.

26. An article of manufacture comprising machine readable medium having stored thereon one or more programs capable of executing the method of claim 25.

27. A system that measure the environmental conditions ("EC") comprising a device transmitting messages ("TxSensor") containing the departure time stamp of said massages wherein the time stamp is a reading of a counter at the time the message is transmitted and said counter has sufficient stages to prevent wraparound in between transmission time, and the clock is provided by a local oscillator which frequency fluctuates mostly due to the environmental condition that is measured;

a device ("RxBase") that receives said time stamped messages and time stamps the arrival time of said messages with a high stability clock wherein the time stamp is the reading of a counter driven by the high stability clock at the moment said packet is received and said counter has sufficient stages to prevent wraparound in between receive events;

means to determine the frequency offset between the TxSensor and the RxBase; and means to extract the EC by interpreting the frequency offset.

28. An article of manufacture comprising machine readable medium having stored thereon one or more programs capable of executing the method of claim 27.

29. A method to correct the frequency of a free running oscillator comprising the steps of:
  sampling the environmental conditions ("EC") at a rate sufficient to capture measurable changes that will determine modifications of the frequency;
  calculating an interpolated value CF(EC) corresponding to the environmental conditions sample EC from a CF(EEC(k−1)) and a CF(EEC(k)) wherein:
    CF(EEC(k−1)) and CF(EEC(k)) are elements of a multidimensional array of correction factors CF indexed on equivalent environmental conditions EEC (ECOCA),
    EEC(k−1) is the closest index in the ECOCA array that is smaller than EC,
    EEC(k) is the closest index in the ECOCA array that is greater than EC, and
    t(n) is the time of measurement of the EC; and
  applying the CF(EC) correction to the oscillator.

30. A method to correct the frequency of a free funning oscillator as recited by claim 29, further comprising the steps of:
  sampling the environmental conditions EC(k) during a synchronization update interval ("SUI") cycle, at a rate sufficient to capture measurable changes that will determine modifications of the frequency;
  calculating an equivalent environment condition (EEC (SUI)) over said SUI wherein EEC is a constant EC under which the oscillator will generate the same number of oscillations as counted during the measured SUI cycle under fluctuating EC;
  Interpolating the CF(EEC(m)) from the CF(EEC(SUI)) that is provided by the synchronization methodology at the end of the current SUI cycle with the CF(EEC(previous_SUI)) that was provided by the synchronization methodology at the end of the previous SUI cycle wherein,
    EEC(m) is the closest index in the table to both the EEC(SUI) and EEC(previous_SUI)); and
  integrating the interpolated CF(EEC(m)) into the content of location indexed by EEC(m) of the ECOCA.

31. An article of manufacture comprising machine readable medium having stored thereon one or more programs capable of executing the method of claim 30.

32. An article of manufacture comprising machine readable medium having stored thereon one or more programs capable of executing the method of claim 29.

33. A method for generating timestamps for a physical layer independent synchronization method comprising steps:
  generating timestamps of the local timing for the arrival and departure packet events;
  adding to each local arrival timestamp a value X read from a file or generated by a program; and
  subtracting from each departure timestamp packet a value Y read from a file or generated by a program; and
  using the timestamps to synchronize the timing.

34. The method recited by claim 33 further comprising the steps of:
  generating X or Y as a sequence of indexed propagation delays, PD(m) from a combination of sets of propagation delays events PDs(n) according to the formula: PD(m)=SUM$_k$(f$_{sk}$(PDs(n+g$_{sk}$))),
    wherein the sets of Propagation delay PDs(n) are measured from real networks or are generated by programs,
    is the identification index of a certain set of Propagation Delays,
    f$_{sk}$ is a function that modifies the amplitude of the Propagation Delay set s,
    g$_{sk}$ is a function that modifies the phase of the Propagation Delay set s,
    k is a natural number indicating the number of terms superposed for a combination made from the set s of Propagation Delays (PDs),
    f and g are real functions including identity and null function, as in f$_k$(x)=x g$_k$=0,
    n and m are indexes; and
  using the timestamps to synchronize the timing.

35. An article of manufacture comprising machine readable medium having stored thereon one or more programs capable of executing the method of claim 34.

36. The method of claim 33, wherein timestamps are used for creating Propagation Delay Variations or for creating virtual timing reference nodes with associated virtual communication paths and associated Propagation Delay Variations or for compensating propagation delay asymmetries of the communication path, or for pre-distorting the time stamps to simulate Doppler effects due to the relative movement between the reference and the follower nodes.

37. An article of manufacture comprising machine readable medium having stored thereon one or more programs capable of executing the method of claim 36.

38. An article of manufacture comprising machine readable medium having stored thereon one or more programs capable of executing the method of claim 33.

39. A telecommunication protocol for timing synchronization with identical message structure for both directions, comprising:
  an arrival time stamp A(n) and an associated sequence ID from a protocol packet received from the opposite end;
  a departure time stamp information D(m) of the previously transmitted packet; and
  a departure sequence ID, wherein the sequence ID of the packets transmitted by the follower node are only odd numbers and the sequence ID transmitted by the reference node are only even numbers.

40. An article of manufacture comprising machine readable medium having stored thereon one or more programs capable of executing the method of claim 39.

41. A telecommunication protocol for timing synchronization with a message structure comprising:
  an arrival time stamp, A(n) or a locally modified arrival time stamp, Amod(n) from a protocol packet received from the opposite end;
  an associated identification, IDrx(n) of the protocol packet received from the opposite end wherein the IDrx(n) is written by the opposite end;
  a departure time stamp information, D(m) or a locally modified departure time stamp, Dmod(m) of a protocol packet transmitted to the opposite end; and
  an associated identification, IDtx(m) of the protocol packet transmitted to the opposite end wherein the protocol packet actually departed at time D(m).

42. An article of manufacture comprising machine readable medium having stored thereon one or more programs capable of executing the method of claim 41.

43. A method for measuring the speed of a moving target comprising the steps:
  transmitting time stamped packets from a base node into a communication path;
  time stamping the packets reflected back by a passive target node in the communication path;
  performing a virtual synchronization of the base node timing as described in claim 23 by using the timestamps transmitted by the base node and the time stamps received by the base node from the target node;

determining the Doppler shift by dividing the frequency Correction Factor returned by the virtual synchronization method by two; and determining the speed of the target.

44. An article of manufacture comprising machine readable medium having stored thereon one or more programs capable of executing the method of claim 43.

45. A method for measuring the speed of an active moving target comprising the steps:

transmitting time stamped packets from an active target node;

time stamping the packets received at base node from the active target node;

synchronizing the base node timing to the active target node timing wherein the relative speed between the target and base nodes is known at the time of synchronization, performing a virtual synchronization of the main node timing as described in claim 23 by using the timestamps transmitted by the target node and the time stamps received from the target;

determining the Doppler shift as the frequency Correction Factor returned by the virtual synchronization method; and determining the speed of the target.

46. An article of manufacture comprising machine readable medium having stored thereon one or more programs capable of executing the method of claim 45.

47. A physical layer independent method for timing synchronization of a reference timing node and a follower timing node wherein the path between the nodes includes a segment delimited by an ingress boundary port and an egress boundary port comprising the steps:

time stamping arrival and departure times of the timing protocol packets on the ingress boundary port;

time stamping arrival and departure times of the timing protocol packets on the egress boundary port;

subtracting the local arrival time of a packet at the arrival, ingress or egress boundary port from the transmitting node departure time stamp embedded in the packet; and adding the local departure time of a packet at the departure, ingress or egress boundary port to the transmitting node departure time stamp embedded in the packet.

48. An article of manufacture comprising machine readable medium having stored thereon one or more programs capable of executing the method of claim 47.

49. A physical layer independent method for timing synchronization comprising the steps generating departure and arrival timestamps for the propagation events between the reference timing node and the follower timing node;

transferring the timestamps to a proxy node;

calculating a correction factor for timing synchronization by the proxy node;

transferring the correction factor to the follower node; and using the correction factor to synchronize the follower node.

50. An article of manufacture comprising machine readable medium having stored thereon one or more programs capable of executing the method of claim 49.

51. A physical layer independent method for synchronizing Absolute Time, UTC timing of a follower system to a reference system comprising the steps of:

synchronizing the follower system frequency to the reference system frequency to a precision sufficient for a reliable UTC calculation wherein the frequency error accumulated as phase error during the measuring interval should be less than the precision sought for UTC synchronization;

calculating an inbound propagation delay equal with the difference between the arrival and departure time for propagation events in the inbound direction, $PD_i(x)=(A_i(x)-D_i(x))$, wherein x is the identification of an inbound propagation event out of the total N inbound propagation events observed during a measured time interval, $A_i(x)$ is the arrival timestamp of the inbound event x, and $D_i(x)$ is the departure timestamp of the inbound event x;

finding the highest density of inbound propagation delays, $maxdPD_i$ where the propagation delays are taken as absolute values, $ABS(PD_i(x))$, $x=1 \ldots N$;

calculating an outbound propagation delay equal with the difference between the arrival and departure time for propagation events in the outbound direction, $PD_e(y)=(A_e(y)-D_e(y))$, wherein y is an identification number of an outbound propagation event out of the total M outbound propagation events observed during a measured time interval, $A_e(y)$ is the arrival timestamp of the outbound event y, and $D_e(y)$ is the departure timestamp of the outbound event y;

finding the maximum density vicinity of the absolute outbound propagation delays, $maxdPD_e$ of $ABS(PD_e(y))$, $y=1 \ldots M$;

determining an offset (offset_UTC), between the Reference UTC and the Follower node local time UTC by calculating an offset_UTC as a function of $maxdPD_i$ and $maxdPD_e$; and calculating an UTC Frequency Correction Factor from the Offset_UTC wherein the UTC Frequency Correction Factor modifies local frequency in the direction that compensates the UTC phase error or calculating an UTC Phase Correction Factor from the Offset_UTC wherein the UTC Phase Correction Factor compensates directly the UTC phase error.

52. The method of claim 51 further comprising the steps:

transmitting time stamped packets from a base node into a communication path;

time stamping the packets reflected back by a passive target node in the communication path;

determining the Offset_UTC; and calculating the distance to the target by multiplying the Offset_UTC with the speed of the signal in the communication path and dividing by two.

53. An article of manufacture comprising machine readable medium having stored thereon one or more programs capable of executing the method of claim 52.

54. An article of manufacture comprising machine readable medium having stored thereon one or more programs capable of executing the method of claim 51.

55. A physical layer independent method of synchronization comprising the steps:

recording the Correction Factor Solutions and the associated local time when the Correction Factor Solutions were generated;

creating an authentication signature from the sequence of Correction Factor Solutions; and using the timestamps or the authentication signature for security purposes.

56. An article of manufacture comprising machine readable medium having stored thereon one or more programs capable of executing the method of claim 55.

57. A physical layer independent timing synchronization method comprising the steps:

performing a timings synchronization of a follower node, Fk to a reference node, Rk wherein the position of Rk is known;

determining a distance between the Fk and Rk nodes by multiplying the speed of the signal in the communication path with a propagation delay returned by the timing synchronization method;

repeating the process and determining the distance between the node Fk and other N reference nodes Rk with a known position wherein k takes values between 1 and N and N is sufficiently big for geometrical positioning;

or performing timing synchronization of M follower nodes Fm, m=1 ... M with a known position with a reference node RM, determining distances between each of the Fm nodes and RM by multiplying each propagation delay returned by the synchronization method with the speed of the signal in the communication path linking each of the Fm to the RM wherein m is a number between 1 and M and wherein M is sufficient for geometrical positioning; and calculating the relative position of the nodes.

58. An article of manufacture comprising machine readable medium having stored thereon one or more programs capable of executing the method of claim 57.

59. A physical layer independent method for timing comprising the steps of:

selecting a direction to the reference node with the lowest Propagation Delay Variations; and using the timestamps associated with the direction with the lowest Propagation Delay Variation to synchronize timing.

60. An article of manufacture comprising machine readable medium having stored thereon one or more programs capable of executing the method of claim 59.

* * * * *